US012574974B2

(12) United States Patent
Seidel et al.

(10) Patent No.: US 12,574,974 B2
(45) Date of Patent: Mar. 10, 2026

(54) UE RACH RESOURCE CONFIGURATION SELECTION FUNCTION AND RESOURCE PRIORITIZATION TO SUPPORT SLICING

(71) Applicant: FRAUNHOFER-GESELLSCHAFT ZUR FOERDERUNG DER ANGEWANDTEN FORSCHUNG E.V., Munich (DE)

(72) Inventors: Eiko Seidel, Sauerlach (DE); Sarun Selvanesan, Berlin (DE); Thomas Wirth, Berlin (DE); Thomas Fehrenbach, Berlin (DE); Thomas Schierl, Berlin (DE); Cornelius Hellge, Berlin (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 353 days.

(21) Appl. No.: 18/059,762

(22) Filed: Nov. 29, 2022

(65) Prior Publication Data

US 2023/0180301 A1 Jun. 8, 2023

Related U.S. Application Data

(63) Continuation of application No. PCT/EP2021/064243, filed on May 27, 2021.

(30) Foreign Application Priority Data

May 29, 2020 (EP) .................................... 20177545

(51) Int. Cl.
*H04W 74/08* (2024.01)
*H04W 74/0833* (2024.01)
(Continued)

(52) U.S. Cl.
CPC .... *H04W 74/0833* (2013.01); *H04W 74/0836* (2024.01); *H04W 74/0838* (2024.01)

(58) Field of Classification Search
CPC ................................................ H04W 74/0833
See application file for complete search history.

(56) References Cited

U.S. PATENT DOCUMENTS 12,231,238 B2 2/2025 Jeon et al.
2017/0201968 A1* 7/2017 Nam .................... H04B 7/0452
(Continued)

FOREIGN PATENT DOCUMENTS

CN 106572516 A 4/2017
CN 107347202 A 11/2017
(Continued)

OTHER PUBLICATIONS

CMCC, "Second round email discussion for R17 proposals on slicing", 3GPP Draft; RP-192599, 3rd Generation Partnership Project (3GPP), vol. TSG RAN, No. 86. Sitges, Barcelona, Dec. 2019.
(Continued)

*Primary Examiner* — Brenda H Pham
(74) *Attorney, Agent, or Firm* — Perry + Currier

(57) ABSTRACT

A user device, UE, for a wireless communication network, is connectable to two or more of a plurality of network slices of the wireless communication network, wherein a slice specific random access channel, RACH, resource configuration is associated with one or more of the plurality of slices. Responsive to a first RACH event associated with a first slice, the UE is to determine whether there is an ongoing RACH procedure triggered by a second RACH event associated with a second slice. In case of an ongoing RACH procedure, the UE is to
prohibit an additional RACH procedure triggered by the first RACH event associated with the first slice, and/or
(Continued)

RACH recource
X RACH event suspend the additional RACH procedure for a certain time, and/or stop the ongoing RACH procedure and start the additional RACH procedure, and/or modify the ongoing RACH procedure, and/or modify the ongoing RACH procedure to start the additional RACH procedure.

20 Claims, 28 Drawing Sheets

(51) Int. Cl.

| | | |
|---|---|---|
| *H04W 74/0836* | (2024.01) | |
| *H04W 74/0838* | (2024.01) | |

(56) References Cited

U.S. PATENT DOCUMENTS

| | | | | |
|---|---|---|---|---|
| 2017/0367120 | A1 * | 12/2017 | Murray | H04B 7/0695 |
| 2018/0249441 | A1 | 8/2018 | Ryoo et al. | |
| 2018/0368179 | A1 | 12/2018 | He et al. | |
| 2019/0098672 | A1 | 3/2019 | Murray et al. | |
| 2019/0124561 | A1 | 4/2019 | Faccin et al. | |
| 2019/0174406 | A1 | 6/2019 | Hwang et al. | |
| 2019/0174536 | A1 | 6/2019 | Han et al. | |
| 2019/0215761 | A1 | 7/2019 | Hirata et al. | |
| 2019/0230584 | A1 | 7/2019 | Lou et al. | |
| 2019/0261185 | A1 * | 8/2019 | Velev | H04W 48/18 |
| 2019/0320467 | A1 | 10/2019 | Freda et al. | |
| 2019/0327663 | A1 | 10/2019 | Wirth et al. | |
| 2020/0059987 | A1 | 2/2020 | Hong et al. | |
| 2022/0295361 | A1 | 9/2022 | Naseer-Ul-Islam et al. | |
| 2023/0029004 | A1 | 1/2023 | Gao et al. | |

FOREIGN PATENT DOCUMENTS

| | | | |
|---|---|---|---|
| CN | 108811168 | A | 11/2018 |
| CN | 110383942 | A | 10/2019 |
| CN | 110741713 | A | 1/2020 |
| CN | 113678423 | A | 11/2021 |
| CN | 114946225 | A | 8/2022 |
| EP | 3457799 | A1 | 3/2019 |
| EP | 3598833 | A1 | 1/2020 |
| EP | 3641433 | A1 | 4/2020 |
| KR | 20190018170 | A | 2/2019 |
| KR | 20200049736 | A | 5/2020 |
| WO | WO-2018127505 | A1 | 7/2018 |
| WO | WO-2018175809 | A1 | 9/2018 |
| WO | WO-2018232259 | A1 | 12/2018 |
| WO | WO-2020190646 | A1 | 9/2020 |

OTHER PUBLICATIONS

3GPP, "NR and NG-RAN Overall Description; Stage 2 Rel. 16 ", TS 38.300, V16.0.0, 3gpp.org, Dec. 2019.

3GPP, "NR Medium Access Control (MAC) protocol specification", ETSI TS 138.321, V15.8.0, Release 15, etsi.org, Jan. 2020.

3GPP, "5G, NG-RAN; F1 Application Protocol (F1AP)", 3GPP TS 38.473, V15.8.0, Rel. 15, etsi.org, Jan. 2020.

3GPP, "Digital cellular telecommunications system (Phase 2+) (GSM); Universal Mobile Telecommunications System (UMTS); LTE; Numbering, addressing and identification", GPP TS 23.003, V15.8.0, Release 15, etsi.org, Sep. 2019.

OPPO, "Enhancements of 4-steps RACH in NR-U", vol. RAN WG2, No. Xi'an, China; Apr. 6, 2019-Apr. 12, 2019, (Apr. 6, 2019), 3GPP Draft; R2-1903283—RACH Enhancements in NR-U, 3rd Generation Partnership Project (3GPP).

Pantech, "Priority of execution the RA procedure", vol. RAN WG2, 3GPP Draft; R2-115185 Priority of Execution the RA Procedure, 3rd Generation Partnership Project (3GPP), 2011.

Xiaomi, "PRACH partitioning, access and congestion control Consideration for Network Slicing", vol. RAN WG2, No. 97, Athens, Greece; Feb. 13, 2017-Feb. 17, 2017, 3GPP Draft; R2-1700998 , 3rd Generation Partnership Project (3GPP).

Xiaomi, "Visibility of Slicing to UE", vol. RAN WG2, No. 97, Spokane, USA; Apr. 3, 2017-Apr. 7, 2017, 3GPP Draft; R2-1702529, 3rd Generation Partnership Project (3GPP).

3Gpp, "Non-Access-Stratum (NAS) protocol for 5G System (5GS); Stage 3", TS 24.501, V15.6.0, Release 15, etsi.org, Jan. 2020.

3GPP TSG RAN\tsg_ran Dec. 2, 2019 RP-192599 Report.

* cited by examiner 102  core network backhaul 114 external networks

100

RAN₁

RAN₂

RAN_n

108₁    108₂

UE₁    UE₂ gNBs                    core

ANT gNBs

116₂    gNB₂    114₂

106₂

112₂    108₃    112₁

IoT    UE₃    IoT gNBs                    core

110₂    110₁ gNB₄

116₄    114₄

106₄ gNB₁

116₁    114₁

106₁ gNBs gNB₅

116₅    114₅

106₅

RANn gNBs gNB₃

116₃    114₃

106₃

RACH recource A slice#1 MC-communication

RACH recource B slice#2 (eMBB)

slice#3 (IoT)

RACH recource

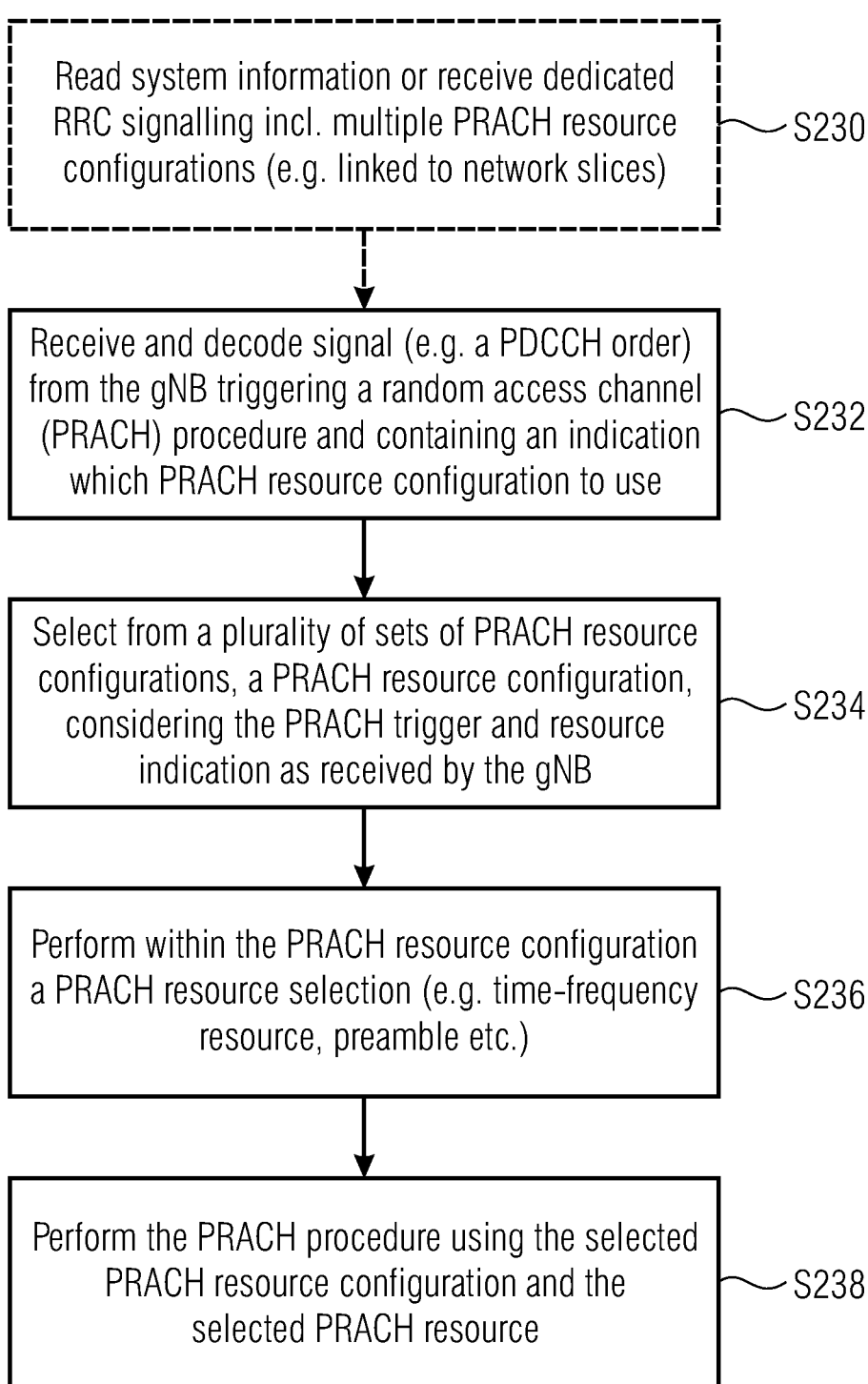

Read system information or receive dedicated RRC signalling incl. multiple PRACH resource configurations (e.g. linked to network slices) —S230

Receive and decode signal (e.g. a PDCCH order) from the gNB triggering a random access channel (PRACH) procedure and containing an indication which PRACH resource configuration to use —S232

Select from a plurality of sets of PRACH resource configurations, a PRACH resource configuration, considering the PRACH trigger and resource indication as received by the gNB —S234

Perform within the PRACH resource configuration a PRACH resource selection (e.g. time-frequency resource, preamble etc.) —S236

Perform the PRACH procedure using the selected PRACH resource configuration and the selected PRACH resource —S238

Fig. 13

UE RACH RESOURCE CONFIGURATION SELECTION FUNCTION AND RESOURCE PRIORITIZATION TO SUPPORT SLICING

CROSS-REFERENCE TO RELATED APPLICATIONS

This application is a continuation of copending International Application No. PCT/EP2021/064243, filed May 27, 2021, which is incorporated herein by reference in its entirety, and additionally claims priority from European Applications Nos. 20177545.9, filed May 29, 2020, which is also incorporated herein by reference in its entirety.

The present application concerns the field of wireless communication systems or networks, more specifically to a network architecture enabling the multiplexing of virtualized and independent logical networks on the same physical network infrastructure, also referred to as slicing or network slicing. Embodiments concern approaches supporting the slicing, for example approaches for selecting a slice-specific random-access channel, RACH, configuration by a user equipment, UE, e.g., using a UE RACH Resource Configuration Selection Function, and/or approaches for prioritizing random-access channel, RACH, resources by a user equipment, UE, and/or approaches for handling the connection of the UE to a base station via the plurality of slices based on a RACH event associated with a first slice.

BACKGROUND OF THE INVENTION

Conventionally, different services use a corresponding number of dedicated communication networks, each tailored to the respective service to be implemented. Instead of using a plurality of specifically designed networks, another approach, known as slicing or network slicing, may use a single network architecture, like a wireless communication network, for implementing a plurality of different services. FIG. 1 is a schematic representation of a system for implementing different services using the concept of network slices. The system includes physical resources, like a radio access network, RAN 100. The RAN 100 may include one or more base stations for communicating with respective users. Further, the physical resources may include a core network 102 having, e.g., respective gateways for connections to other networks, a mobile management entity, MME, and a home subscriber server, HSS. A plurality of slices #1 to #n, also referred to as network slices, logical networks or logical subsystems, are implemented using the physical resources depicted in FIG. 1. For example, a first slice #1 may provide a specific service to one or more users. A second slice #2 may provide for an ultra-low reliable low latency communication, URLLC, with users or equipment. A third slice #3 may provide general mobile broadband, MBB, services for mobile users. A fourth slice #4 may provide for a massive machine type communication, mMTC. A fifth slice #5 may provide health services. Yet further slices #n may be provided for implementing other services. The slices #1 to #n may be implemented at the network side by respective entities of the core network 102, and access of one or more users of the wireless communication system to a service involves the radio access network 100.

FIG. 2 is a schematic representation of an example of a terrestrial wireless network 100 including, as is shown in FIG. 2(a), the core network 102 and one or more radio access networks $RAN_1$, $RAN_2$, . . . $RAN_N$. FIG. 2(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 2(b) shows an exemplary view of five cells, however, the $RAN_n$ may include more or less such cells, and $RAN_n$ may also include only one base station. FIG. 2(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 2(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 2(b) by the arrows pointing to "core". The core network 102 may be connected to one or more external networks. The external network can be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 2(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, the physical downlink, uplink and sidelink control channels, PDCCH, PUCCH, PSSCH, carrying for example the down-link control information, DCI, the uplink control information, UCI, and the sidelink control information, SCI. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 2 may be a heterogeneous network having distinct overlaid networks, e.g., a network of macro cells with each macro cell including a macro base station, like base station $gNB_1$ to $gNB_5$, and a network of small cell base stations, not shown in FIG. 2, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 2, for example in accordance with the LTE-Advanced Pro standard or the 5G or NR, new radio, standard.

In mobile communication networks, for example in a network like that described above with reference to FIG. 2, like an LTE or 5G/NR network, there may be UEs that communicate directly with each other over one or more sidelink, SL, channels, e.g., using the PC5/PC3 interface or WiFi direct or a Bluetooth connection. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs can have functionalities of BS or of UEs, depending on the specific network configuration. Other UEs may not be vehicular related UEs and may comprise any of the above-mentioned devices. Such devices may also communicate directly with each other, D2D communication, using the SL channels.

It is noted that the information in the above section is only for enhancing the understanding of the background of the invention and therefore it may contain information that does not form conventional technology that is already known to a person of ordinary skill in the art.

SUMMARY

An embodiment may have a user device, UE, for a wireless communication network, wherein the UE is connectable to two or more of a plurality of network slices of the wireless communication network, wherein a slice specific random access channel, RACH, resource configuration is associated with one or more of the plurality of slices, wherein, responsive to a first RACH event associated with a first slice, the UE is to determine whether there is an ongoing RACH procedure triggered by a second RACH event associated with a second slice, and wherein, in case of an ongoing RACH procedure, the UE is to prohibit an additional RACH procedure triggered by the first RACH event associated with the first slice, and/or suspend the additional RACH procedure for a certain time, and/or stop the ongoing RACH procedure and start the additional RACH procedure, and/or modify the ongoing RACH procedure, and/or modify the ongoing RACH procedure to start the additional RACH procedure.

Another embodiment may have a user device, UE, for a wireless communication network, wherein the UE is connectable to two or more of a plurality of network slices of the wireless communication network, wherein a slice specific random access channel, RACH, configuration is associated with one or more of the plurality of slices, wherein the UE is configured or pre-configured to support two or more parallel ongoing RACH procedures, the ongoing RACH procedure being associated with different slices.

Another embodiment may have a base station, BS, for a wireless communication network, wherein the BS is to support one or more of a plurality of slices of the wireless communication network, wherein a slice specific random access channel, RACH, configuration is associated with one or more of the plurality of slices, wherein the BS is to configure one or more user devices, UEs, to enable or to disable parallel ongoing RACH procedures.

According to an embodiment, a wireless communication system may have: one or more inventive user devices, UEs, for a wireless communication network, and/or one or more inventive base stations, BSs, for a wireless communication network.

According to another embodiment, a method for operating a user device, UE, for a wireless communication network, wherein the UE is connectable to two or more of a plurality of network slices of the wireless communication network, wherein a slice specific random access channel, RACH, resource configuration is associated with one or more of the plurality of slices, may have the steps of: responsive to a first RACH event associated with a first slice, determining whether there is an ongoing RACH procedure triggered by a second RACH event associated with a second slice, and in case of an ongoing RACH procedure, prohibiting an additional RACH procedure triggered by the first RACH event associated with the first slice, and/or suspending the additional RACH procedure for a certain time, and/or stopping the ongoing RACH procedure and start the additional RACH procedure, and/or modifying the ongoing RACH procedure, and/or modifying the ongoing RACH procedure to start the additional RACH procedure.

According to another embodiment, a method for operating a user device, UE, for a wireless communication network, wherein the UE is connectable to two or more of a plurality of network slices of the wireless communication network, wherein a slice specific random access channel, RACH, configuration is associated with one or more of the plurality of slices, may have the step of: configuring or pre-configuring the UE to support two or more parallel ongoing RACH procedures, the ongoing RACH procedure being associated with different slices.

According to another embodiment, a method for operating a base station, BS, for a wireless communication network, wherein the BS is to support one or more of a plurality of slices of the wireless communication network, wherein a slice specific random access channel, RACH, configuration is associated with one or more of the plurality of slices, may have the step of: configuring one or more user devices, UEs, to enable or to disable parallel ongoing RACH procedures.

Another embodiment may have a non-transitory digital storage medium having a computer program stored thereon to perform the inventive method for operating a user device, UE, for a wireless communication network, when said computer program is run by a computer.

BRIEF DESCRIPTION OF THE DRAWINGS

Embodiments of the present invention will be detailed subsequently referring to the appended drawings, in which:

FIG. 12(*b*) illustrates a two-step Contention-Based Random Access, CBRA, procedure;

FIG. 12(*c*) illustrates an embodiment of a process performed at a base station and a UE in in case of downlink data arrival at the base station;

FIG. 13 illustrates the process for providing data from a base station to a UE of FIG. 12(*c*) from the UE's perspective;

DETAILED DESCRIPTION OF THE INVENTION

Figure 1:
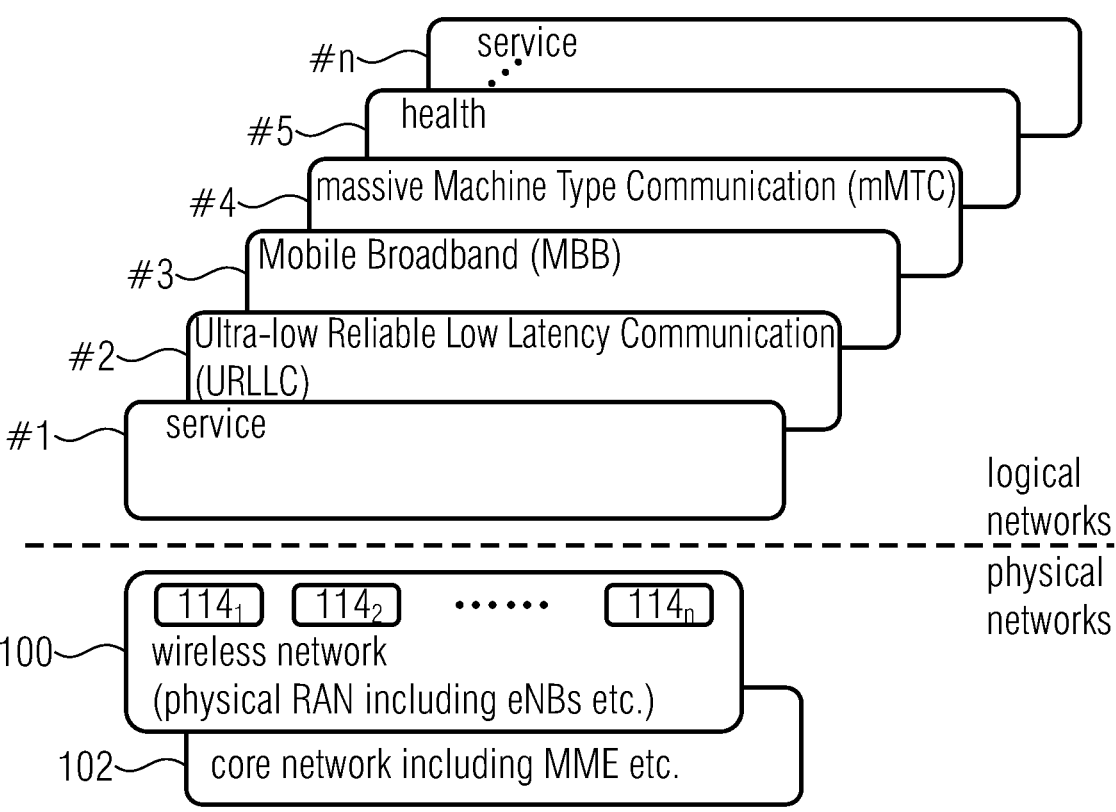
FIG. 1 is a schematic representation of a system for implementing different services using the concept of network slices.

Embodiments of the present invention are now described in more detail with reference to the accompanying drawings in which the same or similar elements have the same reference signs assigned.

In wireless communication systems or networks as described above, network slicing is a key function of the core network, like the 5G core network, 5GC, and the radio access network, like the 5G radio access network. A network slice delivers end-to-end, E2E, network behavior and is the basis for service level agreements and quality of service, QoS, support. A network slice is a complete logical network linked to a certain service or tenant that includes a core network part, CN part, and a radio access network part, RAN part, and that is mapped to the same cell or to different cells or carrier frequencies. In reference [1] the requirements and principles of slicing for a new generation radio access network, NG-RAN, are defined. A key principle IN NG-RAN is the resource isolation between slices, which is defined as follows: "The NG-RAN supports resource isolation between slices. NG-RAN resource isolation may be achieved by means of RRM policies and protection mechanisms that avoid that shortage of shared resources in one slice breaks the service level agreement for anther slice. It should be possible to fully dedicate NG-RAM resources to a certain slice. How NG-RAN supports resource isolation is implementation dependent".

Slice based scheduling for the PUSCH and for the PDSCH is enabled by slice-specific scheduling or a slice-specific radio bearer configuration. At RAN2 #99 a unified random-access channel, RACH, resource configuration across all slices was decided because RACH resource fragmentation was considered to cause inefficiencies and add to NR complexity and signaling overhead. The use of slicing in 5G networks is assumed to become more and more common, however, using a unified RACH resource configuration across all slices is likely to result in an overload of RACH resources so that a stable network operation or serving a needed QoS may not be guaranteed. For example, in case of massive IoT deployments, the RACH access to an IoT slice is not to have an impact on any of the other slices implemented in the network. Such IoT services may be moved to different carrier frequencies, however, this may also cause inefficiencies. As far as mission critical networks are concerned, it is assumed that such networks are operated in shared networks, for example, by existing commercial operators, at least on the radio-access network site. Such operators may be granted access to additional frequency bands, like the 700 MHz band, with the restriction that for public emergency and disaster events, mission critical customers are to be provided with network access under any circumstance. Slice-based access control may be a viable solution most of the time, even if access barring is a hard criterion and involves strict user management in rolling out the network. Blocking emergency calls of regular users in a shared network is not a desired behavior. On the other hand, if it is decided that emergency calls are allowed on a shared network, RACH resources may no longer be isolated. Consequently, this may hinder access to mission critical services in RACH overload conditions which may also be caused by users requesting services with lower priority, e.g., normal mobile broadband, MBB, services. Also, it may not be excluded that a huge number of users request to perform emergency calls during a disaster event which may overload an existing RACH resource.

To avoid such problems or issues, a slice-based or slice-specific RACH resource configuration is proposed in reference [3], WO2018127505A1, "Access control for network slices of a wireless communication system", which is hereby incorporated by reference. Multiple RACH resources may be configured by a gNB and associated with one or more different slices. For example, each slice may have its own RACH resources defined by the associated slice-specific RACH resource configuration, or two or more slices may share RACH resources defined by a slice-specific RACH resource configuration being associated with the two or more slices. Configuring different physical times/frequency resources on a per slice basis allows for a full isolation of the resources of the physical random-access channel, PRACH, also referred to as a full PRACH resource isolation, and the slice-specific RACH resource configuration may also be referred to as slice-specific PRACH resource configuration. The slice-specific RACH resource configurations may be broadcast by RRC signaling, or they may be signaled to the UE using a dedicated RRC signaling. The signaling of the slice-specific RACH resource configuration specifying the separate RACH resources may be done by extending the system information block 1, SIB-1, or by introducing a new system information block for slicing that may be referred to as SIB-Slice, SIBS. Reusing the SIB-1 may be beneficial because it is sent often and reliable. During mobility, a UE may read the SIB-1 of the neighboring cell to know the cell configuration and all parameters needed for a handover. Nevertheless, the message size of the SIB-1 is to be kept small, since the SIB-1 is read during cell selection or reselection and, therefore, increases UE processing requirements and, consequently, also the UE power consumption. When using the SIB-Slice, it may be provided to the UE by dedicated RRC signaling so as to configure at the UE a slice-specific RACH resource configuration.

A slice-specific RACH resource configuration may include the same or similar parameters as they are used in a conventional RACH or PRACH configuration. For example, among others, the parameters of the RRC protocol may include the PRACH configuration index, the kind of FDM multiplexing and precision, the power control parameters and power ramping parameters, the repetition parameter, the random-access window size, the number of configured preambles, the preamble split, the root sequences, the contention resolution timer and the like. Associating the separate RACH resources to slices may be realized in different ways.

Figure 3:
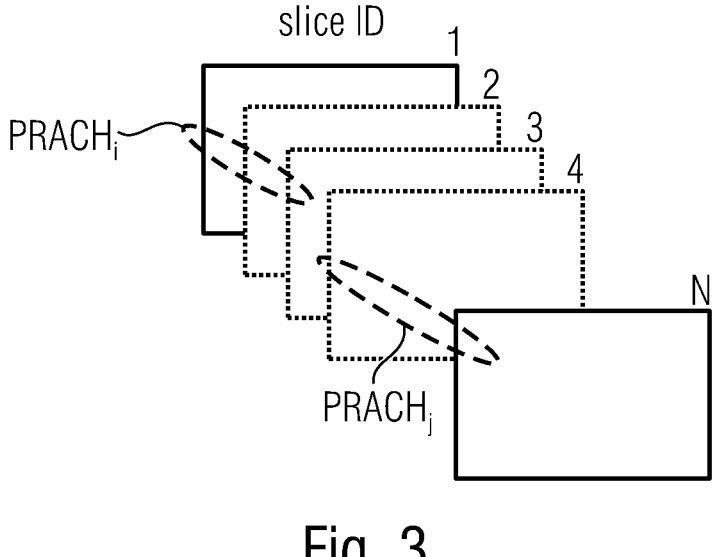
FIG. 3 illustrates an example for mapping of PRACH resources to network slice IDs.

FIG. 3 illustrates an example for mapping of PRACH resources to network slice IDs. FIG. 3 illustrates an example of a network that may configure N slices, like hundreds of slices, and a N:1 mapping of slices to RACH resources may be implemented. Currently, NR supports the simultaneous connection of a UE to up to eight network slices. As mentioned above, each slice may have associated its own slice-specific RACH resource configuration, or a number of slices may share a slice-specific RACH resource configuration. This may also depend on the center frequency used for a specific slice, e.g. slice 1 and slice 2 running in the frequency range (FR) 1 may share a slice-specific RACH configuration, and slice 3 and slice 4 operating in a cmWave or mmWave-band in FR2 may share a different slice-specific RACH configuration. FIG. 3 illustrates an example in which a network supports two slice-specific RACH resource configurations, $PRACH_i$ and $PRACH_j$. $PRACH_i$ is associated with the network slices having slice IDs 1, 2 and 3, whereas $PRACH_j$ is associated with the remaining slices having slice IDs 4 to N. Naturally any other mapping may be implemented and also more than the two depicted slice-specific RACH resource configurations may be used. This mapping may also be dynamic, for example, during an emergency case, the network may be reconfigured to support a new slice-specific RACH resource configuration that may be mapped to one or more slices. In case the mapping of the slice-specific RACH resource configuration to the network slices is not unique (as in FIG. 3), also referred to as a 1-to-many mapping, the UE may select from a group of network slices, like slices 1-3 or slices 4 to N in FIG. 3, associated with a slice-specific RACH resource configuration, like PRACH, or PRACH, in FIG. 3, the actual slice to be used based on one or more of the following:

a priority, e.g., depending on the priority of the UE's network traffic, rather than selecting a slice that is delay tolerant, a slice may be selected that for a fast, low latency transmission, randomly from the group of possible network slices associated with the given slice-specific RACH resource configuration, the load or the signal quality or the interference level in a slice.

In addition to slice-specific RACH resources defined by the slice-specific RACH resource configurations, also a common RACH resource may be provided. For example, slice selection may be initiated at the UE during the attach procedure or in case a new session is established. During the initial registration, before a specific slice is selected by a slice selection function, SSF, in the 5GC, a default network slice may be used. There may be a common or default RACH resource as long as the UE is not connected to a specific slice or is still connected to the default slice, as is described in more detail in reference [3].

Thus, in wireless communication systems or networks employing network slicing dedicated RACH resources, for example RACH resources defined by slice-specific RACH resource configurations, may be configured in the UE, for example together with a common RACH resource. Thus, every slice or some slices may have their own RACH resource to be used for the UE that is connected to the specific slice. The UE reads system information and is pre-configured or configured by a dedicated RRC signaling so as to know the RACH resources associated with a slice. Once the UE is registered with a slice, it knows which RACH resource to use in case of a RACH event.

Figure 4:
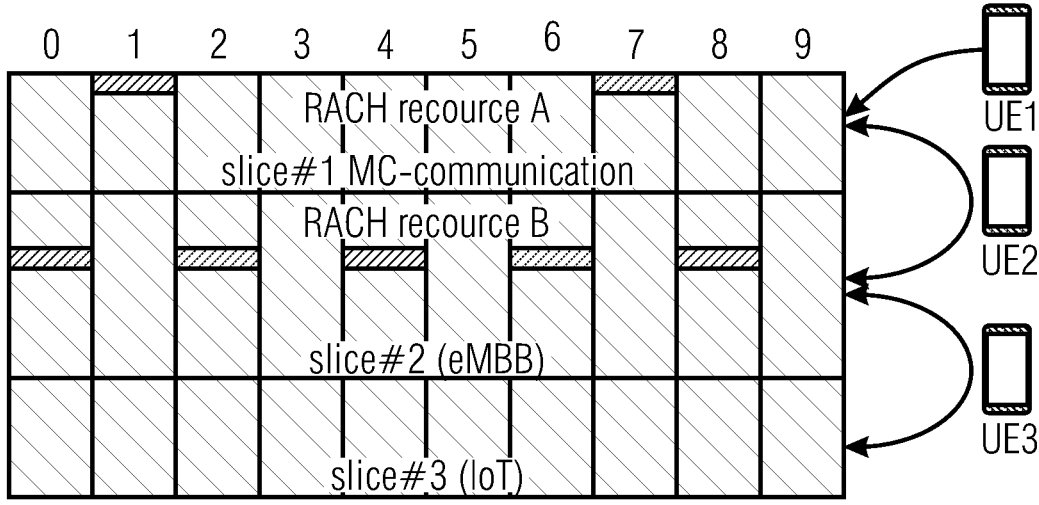
FIG. 4 illustrates an example of a network employing network slicing with multiple RACH resource configurations and UEs registered at multiple slices.

FIG. 4 illustrates an example of a network employing network slicing with multiple RACH resource configurations and UEs registered at multiple slices. FIG. 4 illustrates three slices, namely slice #1 for a mission critical communication, MC-communication, slice #2 for enhanced mobile broadband, eMBB, services, and slice #3 for IoT services. Slice #1 has the RACH resources for slice #1 that are defined by a first slice-specific RACH resource configuration associated with slice #1. For example, UE1 represents the population of MC-UEs that are only connected to the MC-slice or slice #1, and UE1 uses RACH resources A. FIG. 4 illustrates, as an example, a radio frame of 10 ms with RACH resources A provided in subframe 1 and in subframe 7. The eMBB slice, slice #2, and the IoT slice, slice #3, share a second slice-specific RACH resource configuration defining the RACH resources B that are provided in subframes 0, 2, 4, 6 and 8.

In systems or networks, like the one illustrated in FIG. 4, there may also be UEs, like UE2 or UE3, that have the capability to be connected to more than one slice in parallel. In other words, a UE may be connected to multiple slices in parallel, and the current NR specification allows a UE to be connected to up to 8 slices simultaneously. For example, UE3, may be connected at the same time to the eMBB slice and to the IoT slice which use the same RACH resources so that UE3 uses RACH resource B. On the other hand, there is UE2 that may be connected, at the same time, to slice #1 and slice #2, which use different RACH resources so that UE2 has to determine whether the RACH resources A of the RACH resource B are to be used.

The present invention addresses problems/drawbacks identified by the inventors when allowing a UE to be connected in parallel or simultaneously to a plurality of slices which use different RACH resources.

First Aspect

In accordance with a first aspect of the present invention, problems are addressed that occur for a UE, like UE2 in FIG. 4, that is simultaneously connected to a plurality of slices using different RACH resources, i.e., the UE is configured, via a plurality of different slice-specific RACH resource configurations, with multiple RACH resources. In such a situation, in case a random-access is triggered, the UE needs to decide which RACH resource needs to be selected. Therefore in accordance with the first aspect of the present invention, responsive to a certain RACH event, a UE that may be connected to a plurality of slices simultaneously and that is configured or preconfigured with a plurality of slice-specific RACH resource configurations, initially determines a slice that triggered and/or that is associated with a RACH event and then selects the slice-specific RACH resource configuration associated with the determined slice to be used for performing a RACH procedure. In accordance with embodiments, a UE-based slice-specific RACH resource configuration selection function, SSF, is provided for supporting RACH resource isolation by using a plurality of dedicated RACH resources that may be configured by the gNB or that may be preconfigured in the UE. Based on the configuration or pre-configuration, based on optional additional information provided by the system, like the gNB, and based on a specific event that triggered RACH, the UE selects the slice-specific RACH resource configuration, and from this configuration a specific RACH resource to be used for the RACH procedure is selected by the UE. The specific RACH resource may be selected from a pool of RACH resources that are indicated in the slice-specific RACH resource configuration.

Second Aspect

In accordance with a second aspect of the present invention, problems are addressed that occur in a system allowing a UE to be connected to a plurality of slices in parallel or simultaneously. RACH events may occur at the same time or with a small offset in different slices, so that the UE may start two or more RACH procedures which are then, at least partly, executed in parallel. For example, depending on the UE state, RACH triggering criteria and a type of data to be transmitted in the uplink or in the downlink, the UE may select a slice-specific RACH resource configuration to execute a RACH procedure, for example the UE may select parameters as defined by a slice-specific RACH resource configuration for performing a RACH procedure triggered by a certain slice. However, when being connected to a plurality of slices simultaneously or in parallel, two or more RACH procedures may occur, each associated with a different slice-specific RACH resource configuration, i.e., associated with a different network slice. The plurality of RACH procedures may be triggered at the same time or during the time an initial RACH procedure is still ongoing, i.e., is not yet completed. In other words, there may be a problem that a plurality of RACH procedures initiated in response to RACH events in different slices overlap, at least in part.

In accordance with the second aspect of the present invention, embodiments are provided for handling such situations in which multiple RACH procedures are triggered in a way that they are, at least partly, executed in parallel. In other words, embodiments of the second aspect of the present invention address the problem of potentially overlapping RACH procedures initiated by a UE being connected to a plurality of slices in parallel or simultaneously. Embodiments of the second aspect of the present invention solve the issue of overlapping RACH procedures when multiple RACH procedures are triggered at the same time or within a short time window and belong to different slices. It is noted that the embodiments refer to the handling of RACH procedures which are initiated or triggered by different slices, and the parameters for the respective RACH procedures are defined by the different slice-specific RACH resource configurations, e.g., slice-specific RACH resources. Embodiments of the second aspect do not relate to the handling of multiple RACH procedures on the same RACH resource which is still possible. For example, multiple RACH resources all originating from the same slice may be handled in a conventional way using the RACH resources as specified by the parameters of the slice-specific RACH resource configuration associated with the slice.

Third Aspect

In accordance with a third aspect of the present invention, problems are addressed that occur in a system allowing a UE to be connected to a plurality of slices in parallel or simultaneously and which performs two or more RACH procedures for different slices.

Although resource isolation may be important to ensure slice availability and resilience in case of an overload situation, i.e., to ensure that a RACH procedure may be performed for a certain slice using the slice-specific RACH resources specified by the slice-specific RACH resource configuration for this slice and is not influenced by what may happen on other slices. Nevertheless, also the radio efficiency and power efficiency are to be considered, and performing a plurality of or multiple RACH procedures for different slices may reduce the efficiency. The purpose of the RACH procedure is threefold, first getting uplink synchronized, second getting RRC connected, in case the RRC slice is not yet RRC connected, and third getting uplink resources to send a message or a data packet to the gNB or another network entity. In case the UE is already connected to the gNB on one slice, this means that the UE already completed a RACH procedure for this slice and, thereby, has already obtained the uplink synchronization with a gNB and is already RRC connected. It is also likely that the gNB configured an uplink control channel, such as the PUCCH, to provide the UE with means to send an uplink scheduling request. Therefore, despite the fact that slice-specific RACH resource configurations are provided for the different slices, it may be neither radio nor power efficient to perform another RACH procedure for a further or a second slice, in case the UE is already connected to the gNB on a first slice.

Embodiments of the third aspect of the present invention address the above-mentioned issues and provide a UE that is connectable to two or more of a plurality of network slices. A slice specific random access channel, RACH, configuration is associated with one or more of the plurality of slices, and the UE is connected, e.g., RRC connected, to a base station of the wireless communication network. The UE is connected to the base station responsive to a first RACH event associated with a first slice by performing a first RACH procedure using the slice specific RACH resource configuration associated with the first slice. Responsive to a second event associated with a second slice and causing a second RACH procedure, the UE is to skip the second RACH procedure using the slice specific RACH resource configuration associated with the second slice The UE may skip the second RACH procedure associated with the first slice, because it is already RRC connected to the base station so that the UE is kept connected by the first slice which allows data to be transmitted and received not only by the first slice but also by some or all of the other slices to which the UE is connectable. This aspect is advantageous as it provides for an improvement in terms of radio efficiency and power efficiency when operating the UE.

Figures 2A, 2B:
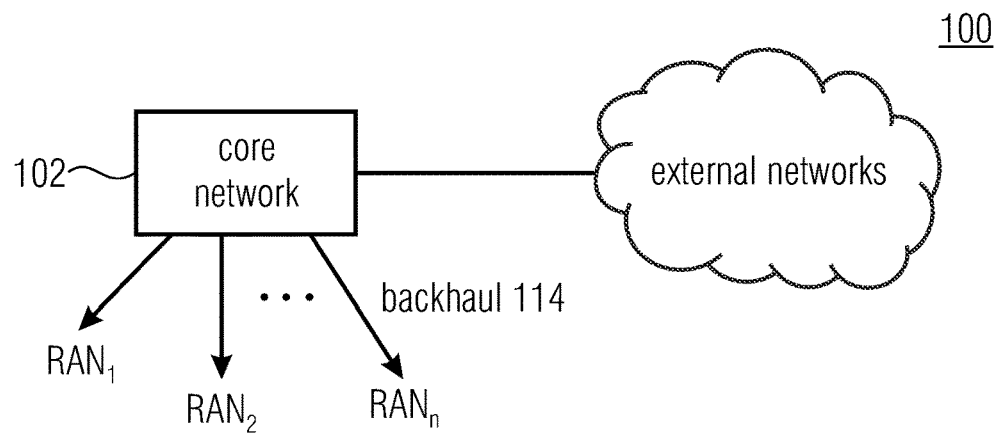
FIG. 2*a* is a schematic representation of an example of a terrestrial wireless network including a core network and one or more radio access networks.
FIG. 2*b* is a schematic representation of an example of a radio access network that may include one or more base stations each serving a specific area surrounding the base station by respective cells.
Figure 5:
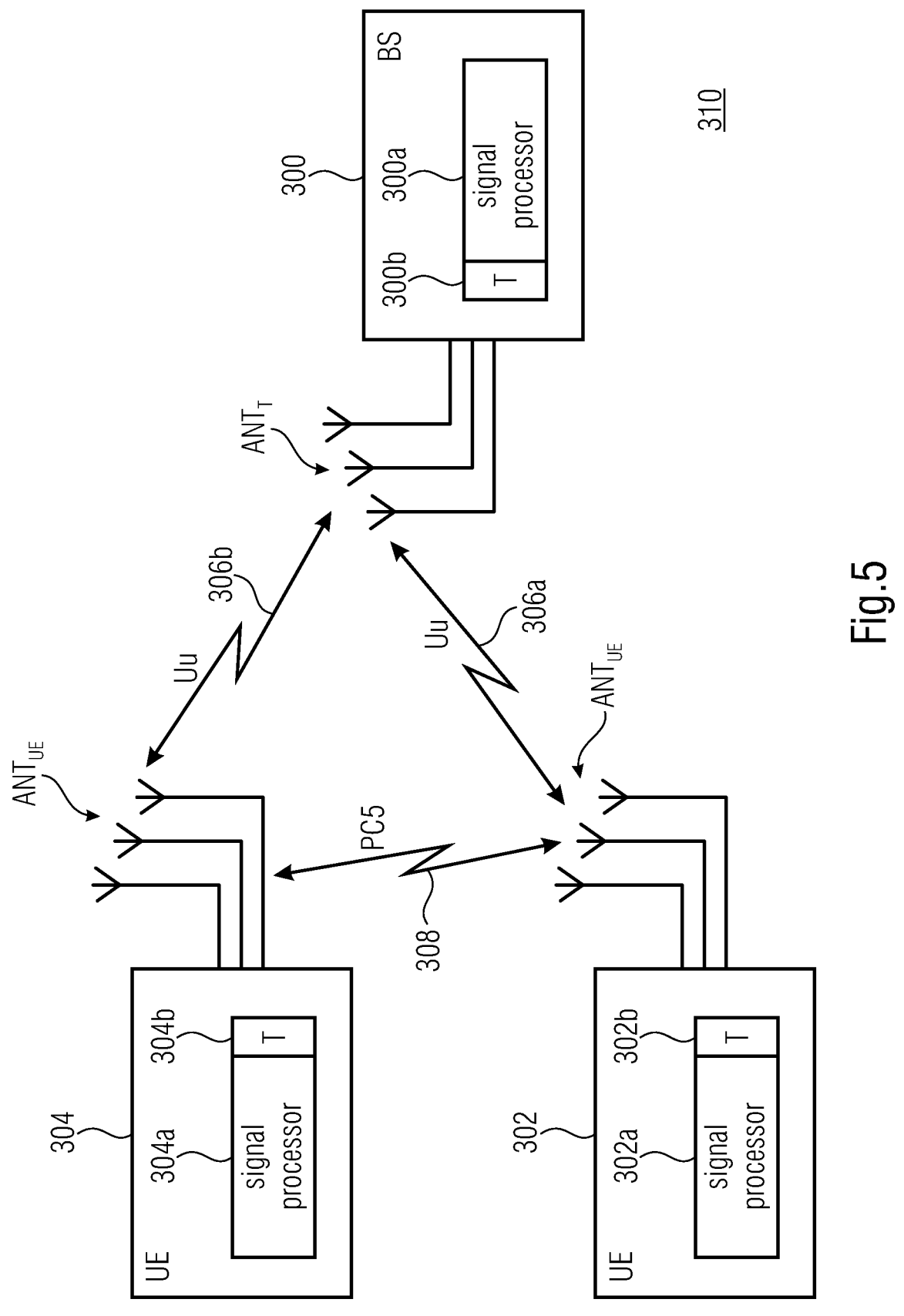
FIG. 5 is a schematic representation of a wireless communication system including a transmitter, like a base station, and one or more receivers, like user devices, UEs capable of operating in accordance with embodiments of the present invention.

The present invention provides approaches for implementing the above mentioned first, second and third aspects, and embodiments of the present invention may be implemented in a wireless communication system as depicted in FIG. 1 or FIG. 2 including base stations and users, like mobile terminals or IoT devices. FIG. 5 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 5, the one or more UEs 302, 304 of FIG. 5, and the base station 300 of FIG. 5 may operate in accordance with the inventive teachings described herein.

First Aspect

Embodiments of the first aspect of the present invention are now described.

UE

In accordance with the first aspect, the present invention provides a user device, UE, for a wireless communication network, wherein the UE is connectable to two or more of a plurality of network slices of the wireless communication network, wherein a slice specific random-access channel, RACH, resource configuration is associated with one or more of the plurality of slices, wherein the UE is configured or pre-configured with slice specific RACH resource configurations for some or all of the plurality of slices, wherein, responsive to a RACH event, the UE is to
determine a slice that triggered and/or that is associated with the RACH event,
select the slice specific RACH resource configuration associated with the determined slice to be used for performing a RACH procedure.

In accordance with embodiments of the first aspect,
the UE is to perform a RACH procedure using the selected slice specific RACH resource configuration, or
the UE is to forward the selected slice specific RACH resource configuration to a further device for performing a RACH procedure, the UE being directly connected to the further device, e.g., via a sidelink connection or a different radio access technology (RAT), e.g. Bluetooth connection.

In accordance with embodiments of the first aspect, the UE is connected to at least two of the plurality of network slices simultaneously.

In accordance with embodiments of the first aspect,
the UE includes one or more tables to hold the configured slice specific RACH resource configurations, or
the pre-configured slice specific RACH resource configurations are hardcoded, e.g., in the UE, or in a storage medium inserted into the UE, like a subscriber identification module, or in a modem firmware.

In accordance with embodiments of the first aspect, the UE is to be configured with the slice specific RACH resource configurations by
signaling RRC system information, or
a dedicated RRC signaling,
wherein the configured slice specific RACH resource configurations may be held in the RRC layer.

In accordance with embodiments of the first aspect, the UE is configured or pre-configured with a default or primary slice specific RACH resource configuration policy defining the slice specific RACH resource configurations.

In accordance with embodiments of the first aspect, the UE is to receive an updated or secondary slice specific RACH resource configuration policy from another entity of the wireless communication network, like a gNB or a sidelink UE or a relay, responsive to one or more criteria or responsive to a request of the UE, and the UE is to replace a current slice specific RACH resource configuration policy, like the default slice specific RACH resource configuration policy, by the updated or secondary slice specific RACH resource configuration policy.

In accordance with embodiments of the first aspect, responsive to a RACH event, the UE is to perform a slice specific RACH Resource Configuration Selection Function for determining the slice that triggered the RACH event, and for selecting the slice specific RACH resource configuration associated with the determined slice.

In accordance with embodiments of the first aspect, the slice specific UE RACH Resource Configuration Selection Function is located at any of the protocol layers, e.g., in the Radio Resource Protocol, RRC, layer or, in the Medium Access Control, MAC, layer.

In accordance with embodiments of the first aspect, the UE is to determine the slice that triggered the RACH event and to select the slice specific RACH resource configuration associated with the determined slice jointly with or after a successful admission or access control for the slice.

In accordance with embodiments of the first aspect, to perform the RACH procedure, the UE is to execute a general RACH Resource Selection Function selecting a specific physical RACH resource within the selected slice specific RACH resource configuration.

In accordance with embodiments of the first aspect, among the plurality of slices,
a slice has its own slice specific RACH resource configuration, and/or
two or more slices share a slice specific RACH resource configuration.

In accordance with embodiments of the first aspect, a slice specific RACH resource configuration is associated with the one or more slices using one or more of the following identities:
a slice identity, like a Network Slice Selection Assistance Information, NSSAI, identifier including, e.g., a Slice/Service Type, SST, and optionally a Slice Differentiator, SD,
a PDU session identity,
a data network identity,
a data network name,
a PLMN identity,
an access identity,
an access category,
a user device type or user equipment category,
a QoS flow identity,
a radio bearer identity,
logical channel identity,
a group or multicast identity.

In accordance with embodiments of the first aspect, to determine the slice that triggered the RACH event, the Non-Access Stratum protocol is to provide the identity of the slice to the Access Stratum, and/or the RRC layer is to provide the identity of the slice to the MAC layer.

In accordance with embodiments of the first aspect,
the UE is to perform the RACH procedure using the selected slice specific RACH resource configuration for a predefined number of RACH events and/or PRACH transmission attempts or during a predefined time period following an initial or first RACH event and/or initial or first PRACH transmission attempt, and
the UE, for the predefined number of RACH events and/or PRACH transmission attempts or during the predefined time period, is not expected to determine the slice that triggered the RACH event, and select a slice specific RACH resource configuration.

In accordance with embodiments of the first aspect, the UE includes
a counter to count the number of RACH events and/or PRACH transmission attempts, and/or
a timer to measure the predefined time period following an initial or first RACH event and/or initial or first PRACH transmission attempt.

In accordance with embodiments of the first aspect,
the UE is configured or pre-configured with a counter threshold and/or with a timer threshold,
the counter threshold indicates the number of RACH events and/or PRACH transmission attempts for which the selected slice specific RACH resource configuration is valid,
the timer threshold sets the predefined time period during which the selected slice specific RACH resource configuration is valid.

In accordance with embodiments of the first aspect, the pre-configured counter threshold and/or timer threshold may be hardcoded, e.g., in the UE, or in a storage medium inserted into the UE, like a subscriber identification module, or in a modem firmware.

In accordance with embodiments of the first aspect, in case the RACH procedure on a RACH resource fails, the UE is to repeat the RACH procedure using RACH resources of a configured or pre-configured fallback RACH resource configuration, or repeat the RACH procedure using RACH resources of the latest RACH resource configuration on which the RACH procedure was successful, or signal to another UE via SL a RACH failure event.

In accordance with embodiments of the first aspect, the RACH event includes one or more of the following:

a radio link failure, a beam failure, an uplink data arrival in the user plane, an uplink data arrival in the control plane, a scheduling request or scheduling request failure, a downlink data arrival with the UE being out of uplink synchronization, a handover procedure, a conditional handover procedure, an initial access, an RRC Connection Re-establishment, a response to a paging, a transition from the RRC IDLE state, a transition from the RRC INACTIVE state, a trigger received via a sidelink, SL, e.g. SCI or RRC signaling via the SL.

In accordance with embodiments of the first aspect, in case there is no ongoing uplink transmission on a PUSCH resource and/or no configured scheduling request, SR, on a PUCCH resource, for an uplink transmission of a data message from a certain application or service executed by the UE, the UE is to perform the RACH procedure using physical RACH resources of the RACH resource configuration that is associated with the slice that generated the user data, wherein the slice is identified by one or more of a slice identity, a PDU session identity, a data network identity, a data network name, a PLMN identity, an access identity, an access category, a QoS flow identity, a radio bearer or logical channel identity.

In accordance with embodiments of the first aspect, responsive to a failed PUCCH scheduling request to request resources for an uplink transmission on the PUSCH, for an uplink transmission of a data message from a certain application or service executed by the UE, the UE is to perform the RACH procedure using physical RACH resources of the RACH resource configuration that is associated with the slice that generated the user data, wherein the slice is identified by one or more of a slice identity, a PDU session identity, a data network identity, a data network name, a PLMN identity, an access identity, an access category, a QoS flow identity, a radio bearer or logical channel identity.

In accordance with embodiments of the first aspect, the certain application or service executed by the UE is to provide a packet of the uplink user data request to an uplink data queue together with an identification of the slice from which the packet originates, or to an uplink data queue associated with the slice from which the packet originates, responsive to determining that no uplink data transmission on PUSCH is ongoing and no scheduling request is possible on a pre-configured PUCCH, the MAC layer is to select the slice specific RACH resource configuration associated with the slice indicated by the identification or the uplink data queue, and perform the RACH procedure using physical RACH resources of the selected slice specific RACH resource configuration.

In accordance with embodiments of the first aspect, in case there is no slice specific RACH resource configuration associated with the slice from which the packet originates, the UE is to use physical RACH resources of a configured or pre-configured fallback RACH resource configuration, or the latest RACH resource configuration on which a RACH procedure was successful.

In accordance with embodiments of the first aspect, in case there is no ongoing uplink transmission on a PUSCH resource and/or no configured scheduling request, SR, on a PUCCH resource, for an uplink transmission of a control message the UE is to perform the RACH procedure using in case the control message includes information identifying the slice from which the uplink control data request originates, physical RACH resources of the slice specific RACH resource configuration that is associated with the slice that generated the uplink control data request, or physical RACH resources of a primary RACH resource configuration, with one or more of the slice specific RACH resource configurations being configured, e.g., by the wireless communication system, as the default or primary RACH resource configuration.

In accordance with embodiments of the first aspect, for receiving data, the UE is to receive from the sending network entity, like a gNB or a sidelink UE, a control message, like a DCI in the PDCCH or a SCI in the PSCCH, including a RACH request to initiate a RACH procedure, the control message including an identification, like a RACH Resource Configuration Index, of the slice from which the data originates, or an indication of a certain slice specific RACH resource configuration, or a specific physical RACH resource within an existing slice specific RACH resource configuration, and perform the RACH procedure using physical RACH resources of the slice specific RACH resource configuration indicated in the received control message.

In accordance with embodiments of the first aspect, the certain slice specific RACH resource configuration is selected from a subset of the available slice specific RACH resource configurations, e.g., by one or more bits in the control message.

In accordance with embodiments of the first aspect, during a handover procedure or a conditional handover procedure to handover from a source base station to a target base station, the UE is to receive, via the source base station's RRC signaling, from the target base station one or more of the slice specific RACH resource configurations and/or one or more physical RACH resources within a slice specific RACH resource configuration provided by the target base station to be used when connecting to the target base station with a RACH procedure.

In accordance with embodiments of the first aspect, within a certain area, like a tracking area, TA, the base stations provide the same slice specific RACH resource configurations for the one or more slices, and during a handover procedure or a conditional handover procedure to handover from a source base station to a target base station within the certain area, the UE is to receive, via the source base stations RRC signaling, from the target base station an indication of one or more of the slice specific RACH resource configurations and/or one or more physical RACH resources within a slice specific RACH resource configuration to be used when connecting to the target base station with a RACH procedure.

In accordance with embodiments of the first aspect, in case the RACH event includes an RRC Re-establishment, the UE is to use a predefined RACH resource configuration which is not associated with a specific slice, like default or primary RACH resources configuration or a prioritized RACH resource configuration.

In accordance with embodiments of the first aspect, in case the RACH event includes one of the radio link failure, the beam failure, the response to a paging, the transition from the IDLE state or the transition from the RRC INAC-TIVE state, the UE is to use resources of a specific RACH resource configuration the UE is pre-configured or configured with, e.g., by a gNB or a UE, or use resources of the latest RACH resource configuration on which the RACH procedure was successful.

In accordance with embodiments of the first aspect, responsive to a first RACH event associated with a first slice, the UE is to determine whether there is an ongoing RACH procedure triggered by a second RACH event associated with a second slice, and in case of an ongoing RACH procedure, the UE is to prohibit an additional RACH procedure triggered by the first RACH event associated with the first slice, and/or suspend the additional RACH procedure for a certain time, and/or stop the ongoing RACH procedure and start the additional RACH procedure, and/or modify the ongoing RACH procedure, and/or modify the ongoing RACH procedure to start the additional RACH procedure.

In accordance with embodiments of the first aspect, the UE is configured or pre-configured to support two or more parallel ongoing RACH procedures, the ongoing RACH procedures being associated with different slices.

BS

In accordance with the first aspect, the present invention provides a base station, BS, for a wireless communication network, wherein the BS is to support one or more of a plurality of slices of the wireless communication network, wherein a slice specific random-access channel, RACH, configuration is associated with one or more of the plurality of slices, wherein the BS is to configure one or more user devices, UEs, with slice specific RACH resource configurations for some or all of the plurality of slices to which a UE is capable to connect to.

In accordance with embodiments of the first aspect, responsive to receiving a RACH message, like a certain RACH preamble, from a UE, the BS is to determine a slice that triggered and/or that is associated with the RACH message, and perform one or more of the following:

respond to the RACH message according to a slice-specific function, create an event with slice-specific parameters, prioritize/deprioritize a RACH response according to the associated slice, select resources for a response according to the slice.

In accordance with embodiments of the first aspect, the BS is connected to a core network supporting one or more of a plurality of network slices, the core network being able to register one or more user devices, UEs, with the plurality of network slices, In accordance with embodiments of the first aspect, responsive to receiving data for to be transmitted to a certain UE, the BS is to determine the slice that triggered and/or is associated with the data transmission, select the slice-specific RACH resource configuration associated with the determined slice, and initiate, e.g., by a DCI in the PDCCH or a SCI in the PSCCH, a RACH procedure at the certain UE using the selected slice-specific RACH resource configuration.

In accordance with embodiments of the first aspect, in case the certain UE is considered to be out of uplink synchronization, the BS is to determine the slice from which a packet including the data originates, and provide to the UE a control message, like a DCI in the PDCCH or a SCI in the PSCCH, including a RACH request to initiate the RACH procedure in the UE, the control message including an identification, like a RACH Resource Configuration Index, of the slice from which the data originates, or an indication of a certain slice specific RACH resource configuration, or a specific RACH resource within an existing slice specific RACH resource configuration.

In accordance with embodiments of the first aspect, the certain slice specific RACH resource configuration is selected from a subset of the available slice specific RACH resource configurations, e.g., by one or more bits in the control message.

In accordance with embodiments of the first aspect, during a handover procedure or a conditional handover procedure from a source base station to a target base station, the BS is the target base station and sends to the source base station, one or more of the slice specific RACH resource configurations provided by the target base station to be used when the UE connects to the target base station with a RACH procedure.

In accordance with embodiments of the first aspect, during a handover procedure or a conditional handover procedure from a source base station to a target base station, the BS is the source base station, is to receive from the target base station one or more of the slice specific RACH resource configurations provided by the target base station to be used when the UE connects to the target base station with a RACH procedure, and to send to a UE the one or more received slice specific RACH resource configurations.

In accordance with embodiments of the first aspect, in case of a non-conditional handover, the one or more slice specific RACH resource configurations are signaled during a handover request signaling, and in case of a conditional handover, the one or more slice specific RACH resource configurations are signaled during a conditional handover configuration signaling.

In accordance with embodiments of the first aspect, the BS stores the slice specific RACH resource configurations for some or all of the plurality of slices and is to send the slice specific RACH resource configurations it stores to one or more neighboring base stations, and/or to receive and store slice specific RACH resource configurations of the one or more neighboring base stations.

In accordance with embodiments of the first aspect, the BS is to send and/or receive the slice specific RACH resource configurations via an inter-BS interface, e.g., the Xn interface, the X2 interface, the S1-MME interface, or the NG-C interface.

In accordance with embodiments of the first aspect, the BS is to send and/or receive the slice specific RACH resource configurations during a BS setup or update procedure.

In accordance with embodiments of the first aspect, the BS is to store the slice specific RACH resource configurations received from the one or more neighboring BSs in a neighbor cell list table.

In accordance with embodiments of the first aspect, during a handover procedure or a conditional handover procedure from a source base station to a target base station, the BS is the source base station and is to send to a UE one or more of the stored slice specific RACH resource configurations of a neighboring base station being the target base station.

In accordance with embodiments of the first aspect, within a certain area, like a tracking area, TA, the base stations provide the same slice specific RACH resource configurations for the one or more slices, and during a handover procedure or a conditional handover procedure from a source base station to a target base station within the certain area, the BS is the target base station and sends to a UE, via the source base station, an indication of one or more of the slice specific RACH resource configurations to be used when the UE connects to the target base station with a RACH procedure.

In accordance with embodiments of the first aspect, the BS is to configure one or more user devices, UEs, to enable or to disable parallel ongoing RACH procedures.

System

In accordance with the first aspect, the present invention provides a wireless communication system, comprising one or more of the inventive user devices, UEs, and/or one or more of the inventive base stations, BSs.

Methods

In accordance with the first aspect, the present invention provides a method for operating a user device, UE, for a wireless communication network, wherein the UE is connectable to two or more of a plurality of network slices of the wireless communication network, wherein a slice specific random-access channel, RACH, resource configuration is associated with one or more of the plurality of slices, and wherein the UE is configured or pre-configured with slice specific RACH resource configurations for some or all of the plurality of slices, the method comprising:

responsive to a RACH event, determining a slice that triggered and/or that is associated with the RACH event, and selecting the slice specific RACH resource configuration associated with the determined slice to be used for performing a RACH procedure.

In accordance with the first aspect, the present invention provides a method for operating a base station, BS, for a wireless communication network, wherein the BS is to support one or more of a plurality of slices of the wireless communication network, wherein a slice specific random-access channel, RACH, configuration is associated with one or more of the plurality of slices, the method comprising:

configuring one or more user devices, UEs, with slice specific RACH resource configurations for some or all of the plurality of slices to which a UE is capable to connect to.

Figure 6:
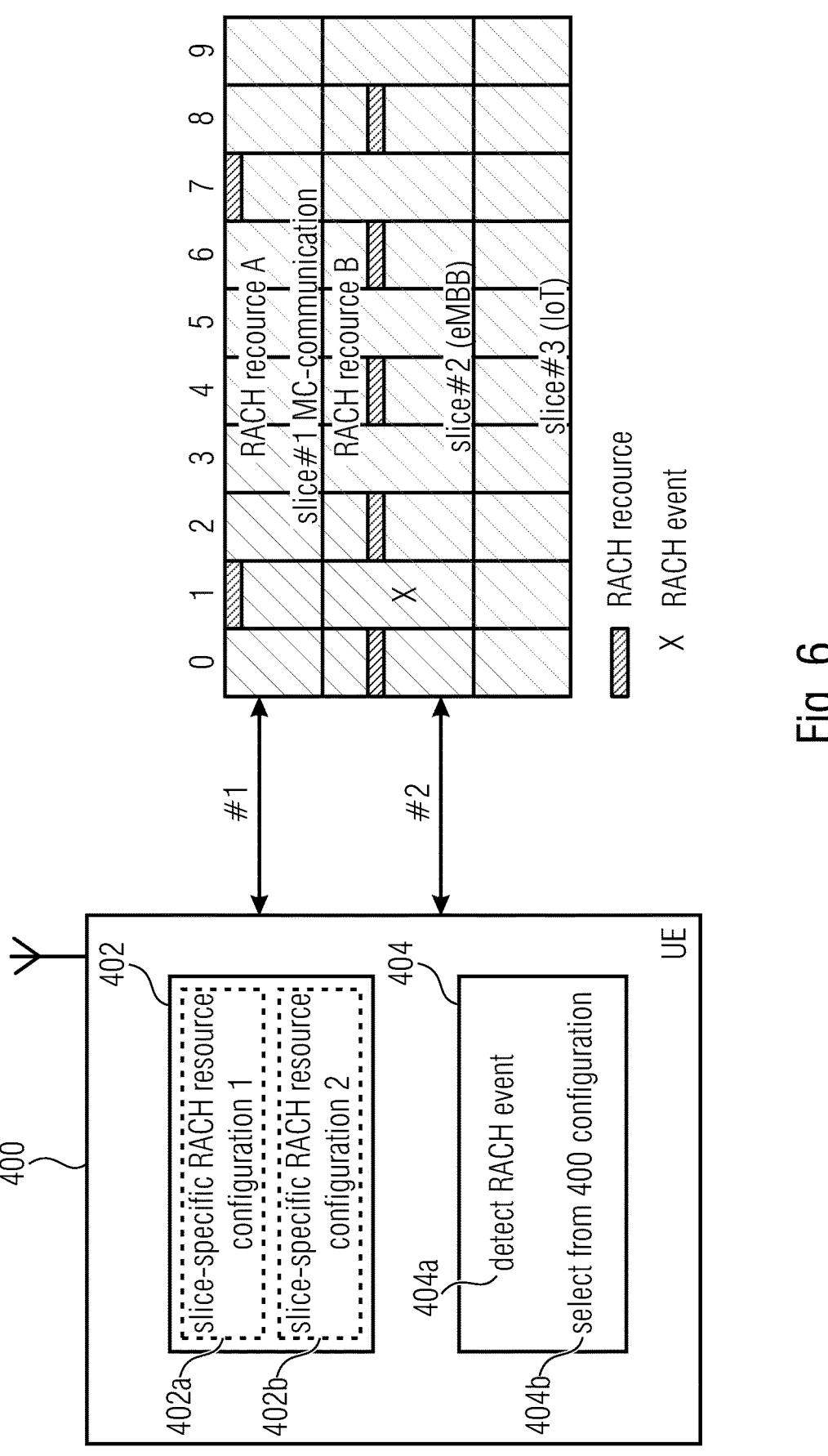
FIG. 6 illustrates a UE connectable to one or more slices and holding a list of slice-specific RACH resource configurations defining dedicated RACH resources for the slices in accordance with an embodiment of the first aspect of the present invention.

FIG. 6 illustrates an embodiment of a UE connectable to one or more slices and holding a list of slice-specific RACH resource configurations defining dedicated RACH resources for the slices. The UE, in case of a RACH event, is capable to determine the slice associated with the RACH event and to select the slice-specific RACH resource configuration from the list to be used for selecting the dedicated RACH resources associated with the slices. More specifically, FIG. 6 illustrates schematically a network using network slicing as described with reference to FIG. 4. The UE 400 is connected to slice #1 and to slice #2, as schematically illustrated by the double-headed arrows #1 and #2. The UE 400 includes the list 402 slice-specific RACH resource configurations 402a, 402b associated with slice #1 and slices #2 and #3. The slice-specific RACH resource configurations include or define, among other parameters, the RACH resources A and the RACH resources B, respectively, from which the UE 400 may select the RACH resources to be used responsive to a RACH event in slice #1 or in slice #2. In case of a RACH event, the UE, for example by means of a processor 404, is capable to detect the slice that triggered and/or is associated with the RACH event, as indicated at 404a, and to select the slice-specific RACH resource configuration, for example from a table or the list 402, that is associated with the determined slice to be used for performing a RACH procedure.

In the embodiment of FIG. 6, the UE is connected to two slices, however, the present invention is not limited to such embodiments, and the UE may be connected to more than two slices in parallel.

In FIG. 6, an example is illustrated in which a RACH event occurs in slice #2 in subframe 1. The UE, in accordance with embodiments of the present invention, responsive to the RACH event determines that this event originated from slice #2 and selects the slice-specific RACH resource configuration 402b from the list 402 for performing a RACH procedure responsive to the RACH event. For example, the UE may select RACH resources as defined by the slice-specific RACH resource configuration 402b for performing the RACH procedure, like a RACH resource B provided in subframe 2 or subframe 4.

The UE, in accordance with embodiments, may perform the RACH procedure itself using the selected slice-specific RACH resource configuration. In accordance with other embodiments, the UE may forward the selected slice-specific RACH resource configuration to another device for performing the RACH procedure. For example, the UE may be a wearable computer, like a smartwatch or the like, that is directly connected to another entity, like a mobile phone, for example by means of a sidelink connection or a different radio access technology, RAT, e.g., a Bluetooth connection, WIFI, Zigbee or any other IEEE or a proprietary wireless communication standard. For example, the smartwatch may not be able to connect to the network directly so that a RACH procedure may not be performed for obtaining UL resources for sending data in a certain slice. In this case, the smartwatch may forward the selected slice-specific RACH resource configuration or RACH trigger to the mobile phone to which it is connected. The RACH procedure may then be performed by the mobile phone having, e.g., more power available, and the obtained UL resources may be signaled to the wearable computer hat may then try to send its data using the UL resources.

In accordance with embodiments, the UE 400 may include one or more tables 402 holding the slice-specific RACH resource configurations 402a and 402b. The UE may be configured, for example by a gNB, with these slice-specific RACH resource configurations, for example when connecting to the network implementing the plurality of slices. In accordance with other embodiments, the UE may be preconfigured with the slice-specific RACH resource configurations, for example, by hardcoding them into the UE, or by inserting a storage medium into the UE holding the slice-specific RACH resource configurations. The storage medium may include a subscriber identification module, SIM, or electronic SIM, eSIM. In accordance with yet other embodiments, the slice-specific RACH resource configurations may be provided within the software or firmware of the UE, like the modem firmware. For example, the software or modem firmware of the cellular modem inside the UE, for example the firmware of the NR modem, may provide the slice-specific RACH resource configurations for the UE. The slice-specific RACH resource configurations may be updated, if needed, for example, in case a contract of a modem user changes or in case the network configuration changes and supports more or other features.

In accordance with embodiments, when employing configured slice-specific RACH resource configurations, they may be configured via system information or a dedicated RRC signaling. For example, the UE may be configured with the slice-specific RACH resource configurations by a signaling of system information or by a dedicated RRC signaling. The configured slice-specific RACH resource configurations may be held in the RRC layer. In other words, after receiving the signaling via system information or dedicated RRC signaling, the information may be held or stored in the RRC layer.

Thus, while a RACH resource selection function may be known in existing systems for a general RACH resource selection, embodiments of the first aspect of the present invention provide approaches allowing the UE to select a slice-specific RACH resource configuration in a system providing the UE with a possibility to be connected to a plurality of slices in parallel or simultaneously. The slices may use dedicated or isolated RACH resources as specified by the different slice-specific RACH resource configurations. It is noted that in existing systems, see for example reference [5], there is only one or a general RACH resource configuration, and the RACH resource configuration specifies the RACH resources that may be used by the UE for performing a RACH procedure. The general RACH resource configuration usually includes multiple RACH resources distributed over time and/or frequency as depicted in FIG. 4 and in FIG. 6. For example, there may be two RACH occasions in a radio frame distributed over time or two RACH occasions in a slot distributed in frequency. The number of RACH resources may be adapted according to a RACH load and during random-access, the UE selects from the selected slice-specific RACH resource configuration a specific resource and a specific preamble for sending the RACH in the uplink. Based on certain events, like a RACH trigger or a service request, different sets of PRACH parameters may be selected from the general RACH resource configuration. However, there is only a single general RACH resource configuration specifying a physical PRACH resource which usually includes multiple time-frequency resources to choose from.

Contrary to such existing systems, embodiments of the first aspect of the present invention provide a plurality of slice-specific RACH resource configuration, i.e., UE may select from different RACH resource configurations, each configuration including multiple time-frequency resources to choose from. In accordance with the first aspect of the present invention, once the slice-specific RACH resource configuration is selected, the UE may apply different PRACH or RACH parameters specified by the selected configuration for the random-access transmission.

Therefore, in accordance with embodiments of the first aspect of the present invention, initially, the UE selects from the plurality of or from the multiple slice-specific RACH resource configurations, also referred to as dedicated RACH resource configurations—in contrast to the general RACH resource configuration, the RACH resource configuration associated with the slice. For example, a slice-specific RACH resource configuration selection function may be employed. Then, the UE may run the general RACH resource selection function within the selected slice-specific RACH resource configuration. In the following description, reference is made to the slice-specific RACH resource configuration selection function, which is not to be confused with the general RACH resource selection function that is employed as well, once the slice-specific RACH resource configuration is selected so as to select the RACH resources to be actually used.

For example, when considering FIG. 6, in accordance with the first aspect of the present invention, the slice-specific RACH resource configurations 402a and 402b are configured or preconfigured in the UE 400. The first slice-specific RACH resource configuration 402a includes or specifies the RACH resources A for slice #1 as shown in FIG. 4 and FIG. 6, while the second slice-specific RACH resource configuration 402b includes or specifies the RACH resources B for slice #2 and #3. In accordance with embodiments of the first aspect of the present invention, initially a slice-specific RACH resource configuration selection function is performed for selecting among the configurations 402 the slice-specific RACH resource configuration for the slice from which the RACH event stems. In FIG. 6, this means that the slice-specific RACH resource configuration selection function selects the second slice-specific RACH resource configuration 402b associated with slice #2 as in this slice the RACH event is found. Following the slice-specific RACH resource configuration selection function, the general RACH resource selection function is employed so as to select among the available resources defined by the slice-specific RACH resource configuration 402b the actual resources the UE uses for the RACH procedure. In the embodiment of FIG. 6, this means that following the slice-specific RACH resource configuration selection function yielding the configuration 402b, the UE may employ the known RACH resource selection function for selecting from RACH resources B, for example, the resources provided in subframe 6 for performing or initiating the RACH procedure, e.g., for sending the first message of the RACH procedure to the gNB.

Figure 7:
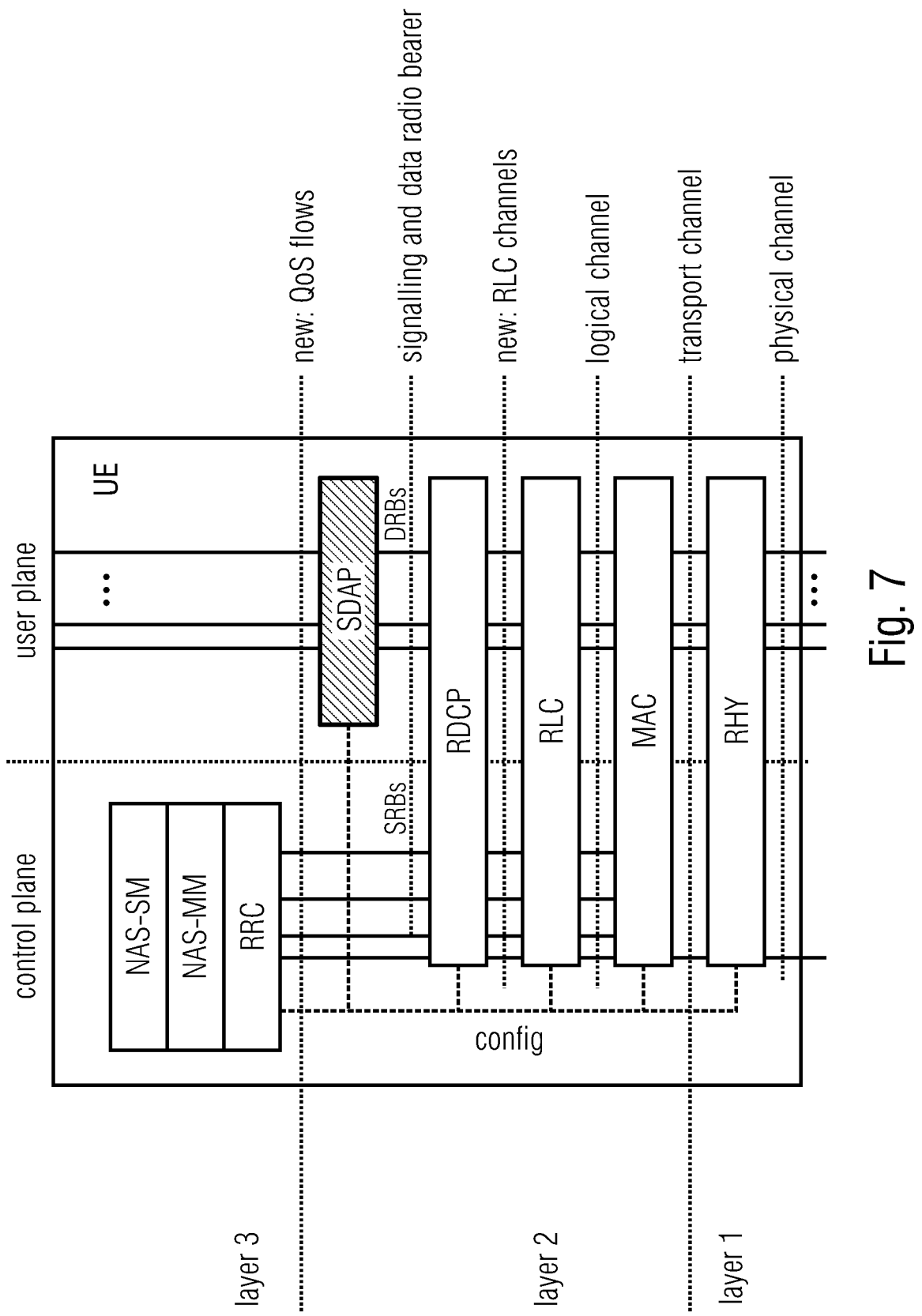
FIG. 7 schematically illustrates the respective layers at a UE.

In accordance with embodiments, the above-mentioned slice-specific UE RACH resource configuration selection function as provided in accordance with embodiments of the first aspect of the present invention may be located at any of the protocol layers, in the radio resource protocol, RRC, layer controlling the overall resources or in the medium access control, MAC, layer, controlling the random-access procedure. FIG. 7 schematically illustrates the respective layers at the UE 400 and in an embodiment, the slice-specific RACH resource configuration selection function is located at the MAC layer. The function may be implemented as a separate function or it may be integrated into the general RACH resource selection function. In the integrated case, the general RACH resource configuration selection function is initially executed so as to select the slice-specific RACH resource configuration, followed by performing the general RACH resource selection function for selecting a specific RACH resource within the selected slice-specific RACH resource configuration to be used for performing the RACH procedure.

A RACH resource configuration policy may be stored in the core network, e.g. 5GC, and the UE may be configured or preconfigured with a default policy that may be updated based on a certain criterion or based on a request by the UE. For example, the UE may receive an updated or secondary slice specific RACH resource configuration policy from another entity of the wireless communication network, like a gNB or a sidelink UE or a relay or an entity of the 5GC (5G core network), e.g. by the access and mobility management function (AMF). The UE replaces a current slice specific RACH resource configuration policy, like the default slice specific RACH resource configuration policy, by the updated or secondary slice specific RACH resource configuration policy. The default policy may be the simplest type of network configuration that works for all UEs, which are authorized to perform a random access to the given network. An update may happen if the network is upgraded to support new or different network slices, e.g. initially the network only supported an eMBB slice, and the upgraded network supports eMBB as well as URLLC services or slices. The upgrade may also happen on the UE side, e.g. the UE owner buys a license of the URLLC slice to be able to use the URLLC services, and the UE pulls the updated RACH policies from a server in the core network (CN).

In accordance with embodiments, the slice-specific UE RACH resource configuration selection function may rely on information provided by the non-access stratum, NAS. The NAS mobility management, NAS-MM, function may communicate with the access mobility management function in the 5G core network, 5GC. The NAS-session management, NAS-SM, function may communicate with the session management function in the 5GC. In order to enable a PDU transmission in a network slice, the UE may request the establishment of a PDU session in a network slice towards a data network, DN, which is associated with single network slice selection assistance information, S-NSSAI, and a data network name, DNN, if there is no established PDU session adequate for the PDU transmissions, as described in reference [2]. The UE may also include the requested network slice selection assistance information, NSSAI, including the S-NSSAI(s) corresponding to the slice(s) to which the UE intends to register or connect within the NAS registration request message. For the transmission, NAS messages may be passed towards the RRC protocol and processed along the whole protocol stack using a signal radio bearer. All protocols below the NAS layer are referred to as access stratum. Some side information is passed from the NAS layer towards the lower layer of the access stratum. Association of Network Slices with Slice-Specific RACH Resource Configurations Embodiments realize a network including slice-specific RACH resource configurations, by associating the slice-specific UE RACH resource configuration with the network slices.

Association of UEs with Slice-Specific RACH Resource Configurations

In accordance with embodiments, a gNB may assign a UE specifically to the one or more slice-specific RACH resource configurations. There may be an index for each slice-specific RACH resource configuration, and the gNB may inform the UE which configuration to use. This association may be signaled to the UE, for example via a dedicated RRC signaling. The UE may store the association in its buffer and, once a RACH is triggered, the UE may look-up the information in the buffer and select a suitable slice-specific RACH resource configuration from which the actual RACH resources for performing the RACH procedure may be selected. The advantage of this embodiment is a clear association of the UE to the slice-specific RACH resource configurations and the simple RACH resource configuration selection function. Since the function is executed during each random-access, it reduces the UE processing and may limit additional delay introduced by executing the function.

Direct Association of Slice or PDU Session Identities to Slice-Specific RACH Resource Configurations In accordance with further embodiments, the slice identities may be linked directly or indirectly to the slice-specific RACH resource configurations as configured by the gNB. The slice identity may be the network slice selection assistance information, NSSAI, identifier, as described in reference [4] or any identifier derived therefrom. The NSSAI includes a mandatory slice/service type, SST, and an optional slice differentiator, ST. In accordance with other embodiments, the slice may be identified by a PDU session identity, a data network, a data network name, a PLMN identity, an access identity, an access category, a user device type or user equipment category, a QoS flow identity, a radio bearer identity, a logical channel identity or a group/multi-cast identity.

During a RACH attempt, i.e., when responding to a RACH event, the UE may execute an additional slice-specific RACH resource configuration selection procedure to evaluate with which slice the random-access is associated and to select the correct slice-specific RACH resource configuration.

In accordance with embodiments, the selected slice-specific RACH resource configuration may be considered to be valid for a certain time period so that, following a first RACH attempt, the UE may assume that the initially selected slice-specific RACH resource configuration is still valid during the certain time period. In accordance with other embodiments, the UE may assume that the selected slice-specific RACH resource configuration is valid for a certain number of RACH attempts following the first RACH attempt. In accordance with embodiments, the UE may include a counter to count the number of RACH events and/or PRACH transmission attempts, and/or a timer to measure the predetermined time period following an initial or first RACH event and/or an initial or first PRACH transmission attempt. The UE, in accordance with embodiments, may be configured or preconfigured with a counter threshold and/or with a timer threshold indicating the number of RACH events and/or PRACH transmission attempts for which the selected slice-specific RACH resource configuration is valid, and a predetermined time period during which the selected slice-specific RACH resource configuration is valid, respectively. The preconfigured counter threshold or timer threshold may be hardcoded in the UE or may be obtained from a storage medium from the UE or from a modem firmware, as explained above with reference to the pre-configuration of the slice-specific RACH resource configurations. To support this function at the UE side, in accordance with embodiments, the higher layer, like the NAS protocol, may provide additional information to the lower layer, like the RRC layer. This means, for each access attempt, each message, service or registration request, the non-access stratum protocol at the UE side may provide a related slice identity to the access stratum. The RRC protocol may pass the information further down to a lower layer, for example towards the MAC layer.

For example, during an RRC connection setup procedure, the NAS protocol may provide the slice identity to the RRC protocol, and the RRC protocol may store this information to be used once the slice-specific RACH resource configuration selection function is executed or to forward this information to the MAC layer, in case the function is executed in the MAC layer as part of the RACH procedure. In case the function is executed at the RRC layer, the RRC layer informs the MAC layer which slice-specific RACH resource configuration is to be used for the random-access. UEs connected to a slice being configured to use a separate RACH resource, may have to read a new SIB slice before performing a random-access.

Association of Access Identities and/or Access Categories to Slice-Specific RACH Resource Configurations In accordance with embodiments of the first aspect of the present invention, the UE may determine the slice that triggered the RACH event and select the slice-specific RACH resource configuration associated with the determined slice jointly with or after a successful admission or access control for the slice. The slice-specific RACH resource configuration selection function may be executed jointly with the admission and access control. This may be a beneficial because the access control function may be executed in a slice-specific way. Before executing an access attempt, the NAS layer may interact with the access stratum to evaluate whether access to the specific slice is allowed or not. The slice-specific RACH resource configuration may be selected already as part of this process or only once an access control was successful.

The NAS protocol, in accordance with embodiments, may define that a UE, which initiates an access attempt, determines one or more access identities from a set of standardized access identities, and an access category from a set of standardized and/or operator-defined access categories. For example, access identity #2 is defined as a UE that is configured for mission critical services. Other access identities may be linked to access classes for access baring.

Access categories are standardized in the NAS protocol, as indicated in reference [2]. For example, access category #2 is defined for emergency services. Other examples are MMTel voice or MMTel video. Access categories may also be operator defined and valid within the PLMN. The definitions may be signaled to the UE via the NAS protocol. The access category may, for example, be set to a data network name, to an operating system or operation system app identity or to a PLMN specific slice based on the slice identity, S-NSSAI.

Figure 8:
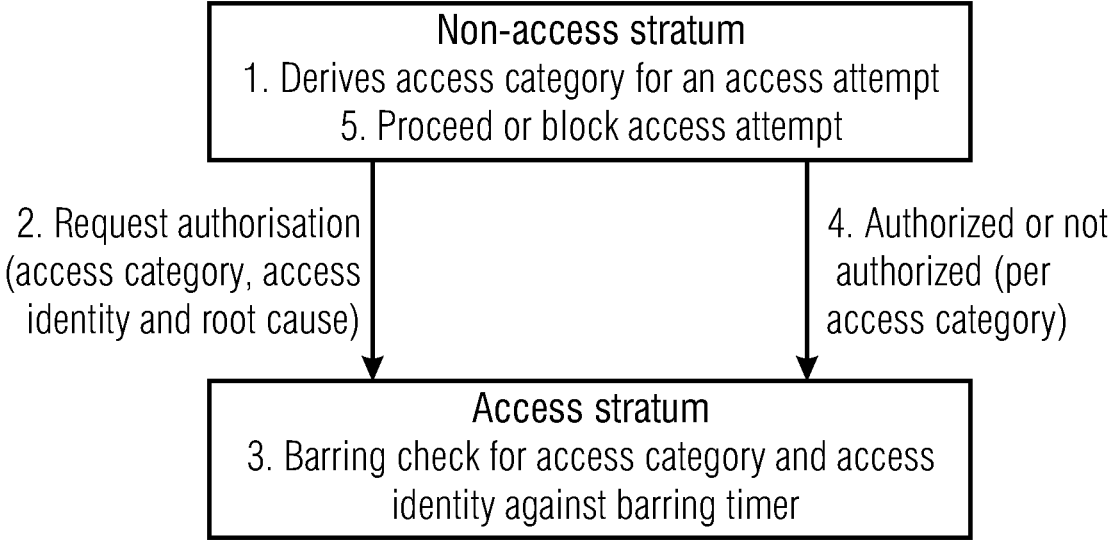
FIG. 8 illustrates an embodiment for associating the access identities and/or access categories to the slice-specific RACH resource configurations.

An advantage of providing the access identity/access category is that it may be defined more flexible than just the slice identity. Embodiments allow a network to flexibly map a RACH resource to a service, an access class, a slice and the like. Moreover, the access identity/access category is generated at the NAS layer for every access attempt, and during the access control, the NAS layer passes this information to the access stratum. FIG. 8 illustrates an embodiment for associating the access identities and/or access categories to the slice-specific RACH resource configurations. As is illustrated in FIG. 8, initially, the non-access stratum derives the access category for an access attempt as indicated at "1".

Then, as is indicated at "2", an authorization is requested, based on access category, access identity and root cause. This is passed from the NAS layer to the access stratum layer where, as indicated at "3", a baring check for the access category and access identity, for example against a baring timer, is performed. Following the barring check at "3", the access stratum passes, as is indicated at "4", the result of the authorization process to the non-access stratum layer so as to indicate whether the access is authorized or not authorized so that the non-access stratum layer at "5" may proceed with the access or block the access. In case of proceeding with the access, the above described embodiments for selecting a slice-specific RACH resource configuration may be employed.

The mapping of access categories, access identities and access root causes to slice-specific RACH resource configurations provides for a flexible scheme which goes together with a signaling overhead as a mapping table needs to be configured in the gNB and signaled to the UE. In accordance with embodiments, the mapping table may be preconfigured or partly preconfigured in the UE, for example for emergency systems, such that a default behavior is specified with less or no signaling involved. The information may also be stored within the UE while moving through the network and only the differences or deltas needs to be updated by signaling to the respective UE.

Association to PLMN Identities in Case of Network Sharing

In accordance with further embodiments, the first aspect of the present invention may be extended to support PLMN sharing with PLMN specific different RACH resources. A network slice may be defined within a PLMN, and network sharing may be performed among different PLMNs. In case of network sharing, each PLMN sharing the NG-RAN defines and supports its PLMN-specific set of slices that are supported by the common NG-RAN. In case NR access is shared, system information broadcast in a shared cell indicates a Tracking Area Code, TAC, and a cell identity for each subset of up to 12 PLMNs, and the NR access provides only TAC and one cell identity per cell per PLMN, as is explained in reference [1]. Conventionally, only the same RACH resources are used for all networks. In accordance with embodiments of the present invention, the slice-specific RACH resource configurations may be PLMN specific and may be signaled, for example, by SIB-slices. In this case, the slice-specific UE RACH resource configuration selection function may select a configuration that is associated with a PLMN or a specific slice of a PLMN in case multiple RACH resources are configured per PLMN. The above described principles may be maintained because the UE is connected to different data networks and the gNB knows the association of the UE to the PLMNs.

It is noted that the present invention is not limited to the above described associations which are only examples and either associations may be used as well, for example any combination of the above described associations.

RACH Procedure Failure

Embodiments of the first aspect of the present invention handle failures of a RACH procedure following the selection of a slice-specific RACH resource configuration and selection of the actual RACH resources from the slice-specific configuration to be used for the RACH procedure. In case the access procedure on the RACH resource selected from the determined slice-specific RACH resource configuration fails, the UE may repeat the random-access using RACH resources of a configured or preconfigured fallback RACH resource configuration, for example, provided by a SIB-slice. In accordance with other embodiments, the UE may also remember the last RACH resource it has been using and may continue to use this resource until a different RACH resource is configured.

In case of a radio link failure, a beam failure or an RRC re-establishment, the UE may use a separate RACH resource that was previously configured by the gNB. Also, in case of a radio link failure, a beam failure or an RRC re-establishment, the UE may re-read the SIB slice before performing the random-access procedure.

In accordance with embodiments, the UE may signal a RACH failure event to another UE, for example, using the sidelink communication. Signaling the RACH failure event via the sidelink to another UE is advantageous as the other UE, like a group leader UE or a smartphone-UE, may take over the communication with a network. For example, when considering a smartwatch which failed to connect and send its data, the smartwatch may forward the data to the smartphone-UE to which it is connected, and signal the RACH failure event so that the smartphone-UE may perform the PRACH attempt, which may be successful because it is of a higher power class. After a successful RACH procedure via the smartphone-UE, the data may be sent or relayed to the network.

RACH Events Causing the Selection of the Slice-Specific RACH Resource Configuration In accordance with embodiments, as mentioned above, the UE may be connected to a plurality of slices simultaneously, and responding to a certain RACH event, the UE determines the slice from which the RACH event originated so as to be in a position to select a correct slice-specific RACH resource configuration for performing the RACH attempt or RACH procedure.

In accordance with embodiments, the RACH event includes one or more of a radio link failure, a beam failure, an uplink data arrival in the user plane, an uplink data arrival in the control plane, a scheduling request or scheduling request failure, a downlink data arrival, may be with the UE being out of uplink synchronization, a handover procedure, a conditional handover procedure, an initial access, an RRC connection re-establishment, a response to paging, a transition from the RRC idle state, a transition from the RRC inactive state, or a trigger received via a sidelink, like a SCI or RRC signaling on the sidelink. The sidelink triggers may be one of the following:

- a change in the QoS requirements stemming from or due to a change in data packets from a given application, e.g., if more UEs need high priority, the logical channels, LCHs, on the sidelink may be mapped to resource pools with the available resources for meeting the transmissions with a higher priority,
- insufficient resources in a current RACH resource configuration, e.g., in the case of a sudden pile-up of vehicles due to an accident or a traffic jam resulting in resource pools with a very high congestion measured, e.g., using the CBR,
- a change in the dynamic of users, e.g., if more UEs carry out unicast or groupcast transmissions that need PSFCH enabled resource pools over broadcast transmissions that do not have PSFCH configured.

In the following, embodiments of the first aspect of the present invention are described in more detail with reference to different events which triggered the random-access procedure, and the slice-specific RACH resource configuration selection function may work differently dependent on the RACH trigger event.

Uplink Data Arrival at the User Plane

Assuming a UE being registered or connected to two slices, like in the embodiment described above with reference to FIG. 6, each having a slice-specific RACH resource configuration, and assuming the UE being in the RRC_CONNECTED or in the RRC_INACTIVE state, in case there is no ongoing uplink transmission and no configured scheduling request, SR, on a PUCCH resource, the UE needs to use the RACH to connect to the gNB and to request resources for the uplink. In other words, in case there is no ongoing uplink transmission and the UE receives data to be transmitted to the gNB, for example from an application running on the UE, for obtaining resources on which the uplink is to be performed or transmitted, the RACH procedure needs to be performed. In accordance with embodiments of the present invention providing for the RACH resource isolation among slices, the UE selects a RACH resource that is associated with the slice that generated the data request. More specifically, the UE determines the slice associated with the data request and an associated slice-specific RACH resource configuration. From this associated slice-specific RACH resource configuration, the UE selects the RACH resource to be used for the RACH procedure, for example for sending the initial RACH message to the gNB.

Without the inventive approach, certain transmissions may fail, e.g., a high priority mission critical data transmission may fail or a mission critical RACH resource may be overloaded with low priority data requests. Such situations are avoided by using the slice-specific RACH resource configuration including slice-specific RACH resources to be used for a RACH attempt associated with a certain slice, thereby providing for the above-mentioned RACH resource isolation among the slices.

In accordance with embodiments, the NAS layer may configure filters in the UE's user plane to map each packet to a QoS flow according to certain criteria like a source or destination IP address, a port number, a type of service field, a protocol identity of protocols above IP and the like. In accordance with embodiments, the QoS flow is used which is the finest granularity of QoS differentiation in the PDU session. The QoS flows may be configured on a per slice basis and identified by a QoS flow identifier, QFI. Within a 5G network or system, a QoS flow is controlled by the SMF and may be preconfigured or established via a PDU session establishment procedure or the PDU session modification procedure. One or more QoS rules and optionally QoS flow level QoS parameters associated with these QoS rules may be provided by the SMF to the UE via the AMF over the N1 reference point and/or may be derived by the UE by applying reflective QoS control of the SDAP layer, as is described in reference [2]. For the uplink traffic, a UE may use stored QoS rules to determine a mapping between the UL user plane traffic and the QoS flows from the NAS layer. The UE may mark the UL PDU with the QFI of the QoS rules containing the matching packet filter and transmit the UL PDUs using the corresponding access specific resource for the QoS flow based on the mapping provided by the RAN, as is specified in reference [1].

Each user plane slice may connect to a specific network identified by the PDU session identity. In the access stratum, the radio bearers are defined and configured by the RRC protocol, which also configures the lower layer with specific configurations for each radio bearer. In case the UE is connected to a plurality of slices, there are different PDU sessions each having individual bearers configured for the respective slices. This allows each slice to have its own security function at the PDCP layer to provide security on a per layer basis. There is one SDAP entity per PDU session and slice. The SDAP entity is responsible to map the slice-specific QoS flows to the slice-specific radio bearers according to the QoS flow to DRB mapping rules. At the SDAP layer, there is default DRB configured.

Depending on the layer where the RACH resource selection is executed, different identities may be used in the slice-specific RACH resources selection. The selection may consider any of the above-mentioned identities to derive the slice with which the RACH is associated.

In accordance with an embodiment, the slice-specific RACH resource configuration selection function may be performed at the MAC layer. In accordance with such an embodiment, a certain appliance or service may send a packet within the UE. This packet arrives as a service data flow at the NAS layer of the UE and is filtered by the uplink packet filter. The IP address and port number, if known, correspond to a certain PDN session identity, are mapped by the filters of the QoS flow. The packet belonging to the QoS flow is mapped by a DRB by the SDAP layer to an RLC channel by the PDCP layer and to a logical channel by the RRC layer. The packet ends up in an uplink data queue and depending on the implementation, the packet may be pre-processed up to the RLC layer. The mapped scheduler is informed that there is new data in the data queue. Since no uplink data transmission on the PUSCH is ongoing and since there is no scheduling request possible on a preconfigured PUCCH, a random-access needs to be performed. The RACH resource configuration selection function at the MAC layer is triggered so as to select the slice-specific RACH resource configuration and, from the selected configuration, the RACH resources to be used. The higher layer may provide the PDN session identity and/or the associated slice identity along the packet or it may be known that the data queue to which the data has been added is associated with this PDN session identity and/or the associated slice identity. Based on this information, in accordance with embodiments, the UE may look into a lookup table to identify the slice-specific RACH resource configuration to be used and from which the RACH resource to be actually used for the RACH attempt is selected. The lookup table may be stored once the UE receives and decodes the system information block, for example, the SIB-slice, containing the slice-specific RACH resource configurations for the different slices to which the UE may connect. Once the slice-specific RACH resource configuration is selected, a specific RACH resource and preamble specified by this configuration is selected, and at the next RACH resource, the random-access message is transmitted.

Figure 9:
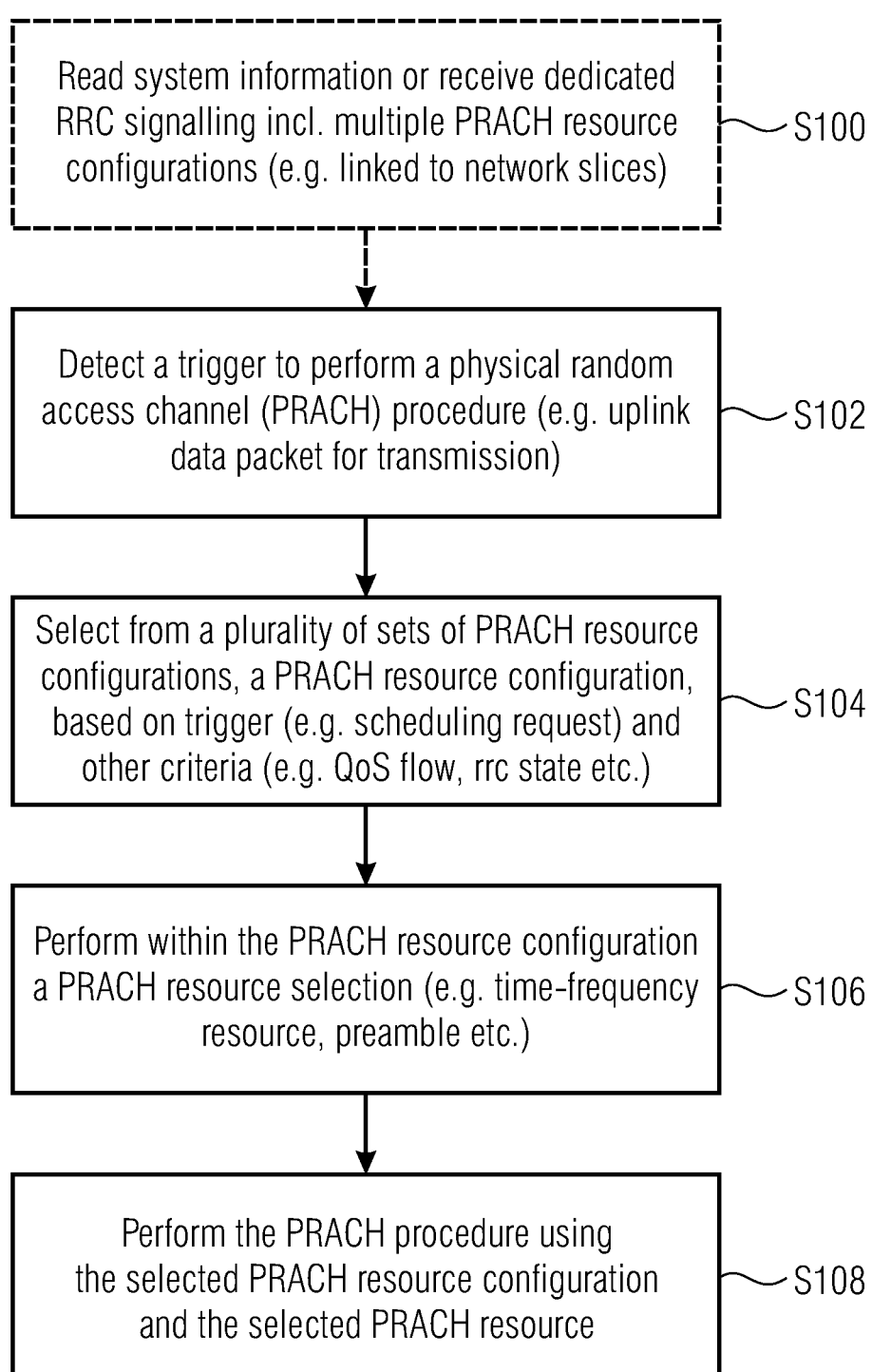
FIG. 9 illustrates an embodiment of a process for handling the uplink data arrival at the user plane.

FIG. 9 illustrates the just-described process. Initially, for example at a time at which the UE connects to the system or network, system information may be read by the UE or received using dedicated RRC signaling so that the UE is configured with multiple slice-specific RACH resource configurations, which are linked to the respective network slices, as illustrated at S100. At a later time, after the UE has been connected to the system or network, a RACH event is determined, for example, an uplink packet data is determined to be available for a transmission at the UE. Responsive to the detection of the trigger at S102 to perform a physical random-access channel procedure, based on the trigger, a slice-specific RACH or PRACH resource configuration is selected at S104 from a plurality of slice-specific RACH or PRACH resource configurations. Once the slice-specific RACH resource configuration is selected, a PRACH or RACH resource is selected at S106 from the selected slice-specific RACH resource configuration, thereby determining the actual time-frequency resource, the preamble and the like to be used for performing the RACH procedure which is then performed at S108.

In accordance with embodiments, packets belonging to a PDN session identity and/or a slice identity for which no entry in the lookup table may be found, for example because no such configuration for the respective identity or slice has been signaled by the system information, the slice-specific RACH resource configuration selection function may select the last used slice-specific RACH resource configuration or a configured or preconfigured fallback RACH resource configuration. In a lookup table, this may be a separate entry or a known RACH configuration as used in 3GPP NR Rel. 15 or Rel. 16 may be signaled by the serving cell configuration of SIB-1.

Uplink Data Arrival at the UE's Control Plane

As described in the preceding embodiment, uplink data arriving at the user plane of the UE may be mapped to a QoS flow, however, other traffic may be generated in the NAS layer or the RRC layer or any other layer so that depending on the nature of the message, whether it is a control message or a data message, the slice-specific RACH resource configuration selection procedure may vary. For example, for the control plane NAS, the RRC packets are not mapped to the QoS flows but they are mapped to the Signaling Radio Bearer 1, SRB1, and the Signaling Radio Bearer 2, SRB2. NAS packets are transmitted via RRC in respective UL information transfer messages. The NAS and RRC messages submitted to the lower layer and triggering the random-access may provide some slice related identities as side information to indicate to which RACH resource they are mapped. For example, in case a NAS packet is to be sent to the SMF in the 5GC, this may be assigned to a specific slice.

Other control functions may not be associated with a specific slice. For instance, NAS messages to the AMF may be part of a common control function, i.e., a control function common to all slices. From the set of slice-specific or dedicated RACH resource configurations, the network may configure for a UE one of the slice-specific RACH resource configurations as a primary RACH resource configuration to be used for all common control messages. The primary RACH resource configuration is provided with a sufficient number of RACH resources to handle the control messages of all slices.

Figure 10:
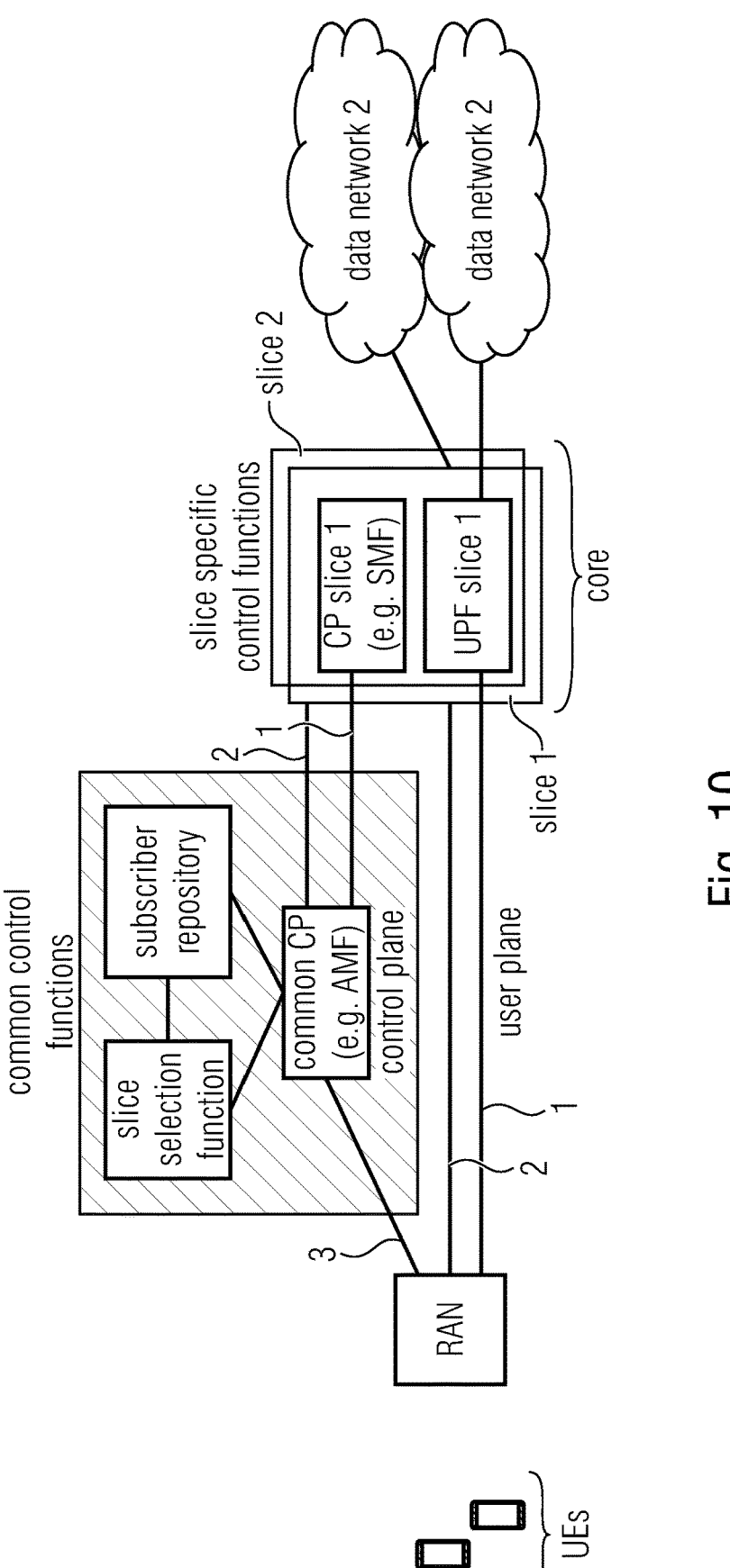
FIG. 10 illustrates the difference in handling transmissions in the control plane and the user plane in accordance with embodiments of the present invention.

FIG. 10 illustrates the difference between the control plane and the user plane. It is assumed that the core implements two slices, slice 1 and slice 2 associated with data network 1 and data network 2. The user plane, in the above-described way, provides for a slice-specific selection of the RACH resources in case of a RACH event by one of the UEs coupled to the radio access network as illustrated by the separate connections for the data network 1 and the data network 2 in the user plane. On the other hand, the control plane handles the common control functions for both slice 1 and slice 2. More specifically, when a control message is received at the RAN, it is forwarded, as indicated at "3", to the common control plane block which, following the determination of the default RACH configuration and selecting a slice to which the control information applies performs the RACH procedure for the first or second slice.

In case a UE is not registered when receiving a common control message, it may consider the slice identity for the slice-specific RACH resource selection that is sent in the NAS registration request.

Scheduling Request Failure

In accordance with embodiments, a UE at which data for an uplink transmission is received but not having uplink resources, may use the PUCCH scheduling request for resources for the uplink transmission on the PUSCH. After transmitting the scheduling request, the UE waits for the PDCCH response in the downlink. In case no response is received for some time, the scheduling request is considered to have failed and the UE starts a random-access to connect to the gNB, and the procedure as described above with regard to the uplink data arrival at the UE is performed.

Downlink Data Arrival

In accordance with embodiments, downlink data may arrive at the gNB for transmission to a UE. The UE is assumed to be connected in parallel to a plurality of slices supporting respective slice-specific or slice-dependent RACH resource configurations. For the downlink transmission, initially, the gNB may use a RACH request so as to make sure that the UE is uplink synchronized. For example, the UE may have moved so that, when compared to a last downlink transmission, the location is different and also the timing advance may have changed. In such a situation, the UE may be out of uplink synchronization with the gNB. On the other hand, the UE may still be synchronized, for example because it remained stationary. However, the gNB does not know the UE status and does not know whether the UE moved or not, i.e., whether the UE is still uplink synchronized. Therefore, when downlink data is received at the gNB, the gNB may use the RACH request to ensure uplink synchronization before transmitting the data to the UE. The gNB may send a RACH request, independent from a UE synchronization status, at any time, for example, for ordering the UE to perform a RACH procedure so as to enable the gNB to perform uplink measurements based on the UE's RACH signal.

The data in the downlink may arrive for a certain QoS flow belonging to a certain PDN connection at the gNB. Before the gNB sends the data to the UE, the UE, for the reasons outlined above, is to be uplink synchronized, for example to transmit the HARQ acknowledgement in a synchronized way. The gNB sends a PDCCH with a RACH request to request an uplink RACH transmission from the UE. Once the UE is synchronized by a timing advance command received by decoding the random-access response, RAR, the gNB may send the data to the uplink synchronized UE. Similar to any other uplink random-access transmission, the slice-specific RACH resource configuration is to be used, namely the one associated with the slice that triggered the RACH request. The UE does not know the slice at which the data or service request was received, and in this case, the gNB provides this information to the UE to allow the UE to select the right RACH resource.

Figure 11:
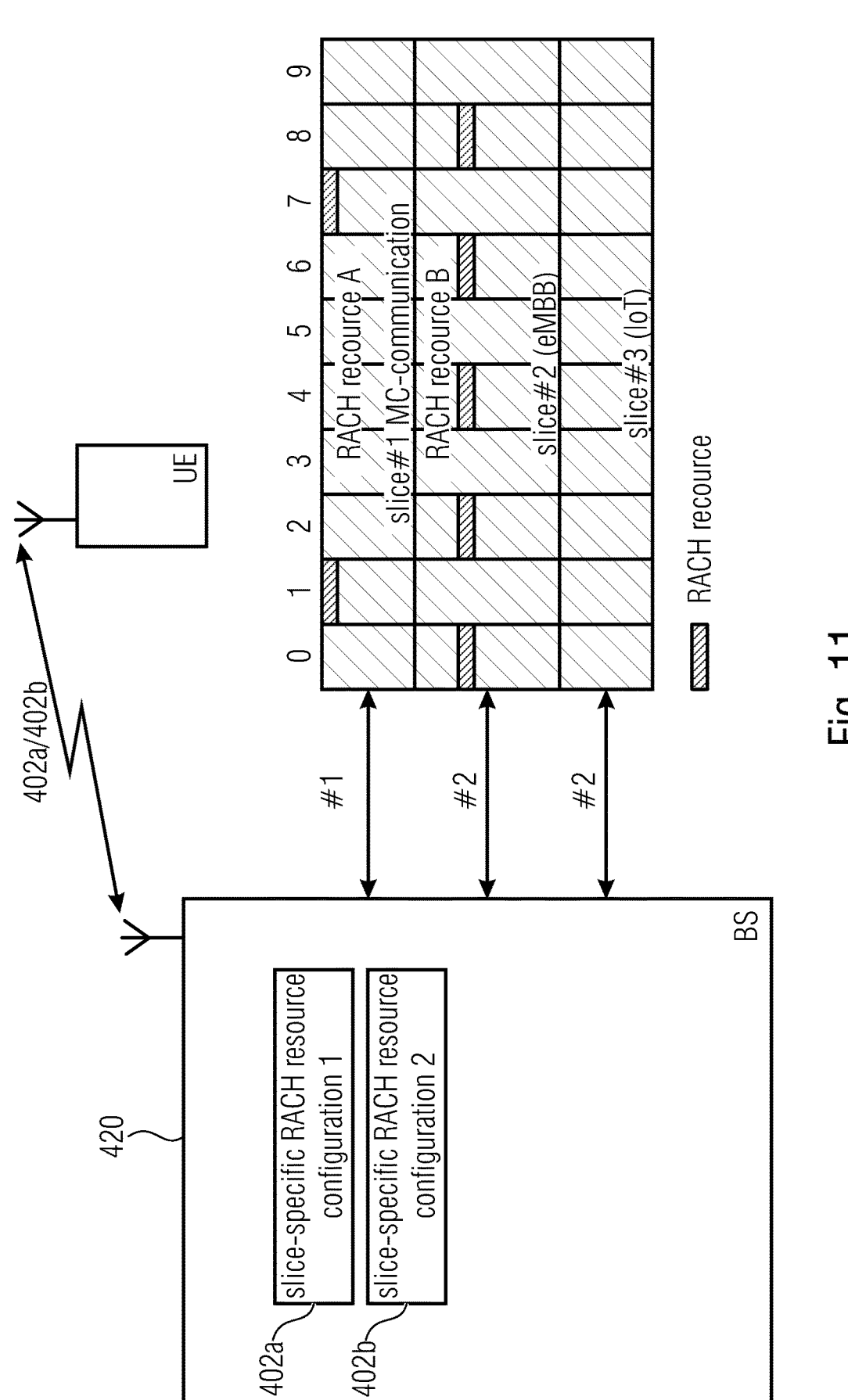
FIG. 11 illustrates a base station in accordance with embodiments of the first aspect of the present invention.

In general, embodiments of the first aspect of the present invention provide a base station as shown in FIG. 11. The base station 420 supports one or more of a plurality of slices as provided by the wireless communication network, like the core network. In FIG. 11, the base station 420 is assumed to support three slices as described, e.g., with reference to FIG. 4 and FIG. 6. The base station 430 supporting such slices may configure a UE that is connected to the base station 420 with slice-specific RACH resource configurations 422_a_ and 422_b_, for example using RRC signaling.

Figure 12A:
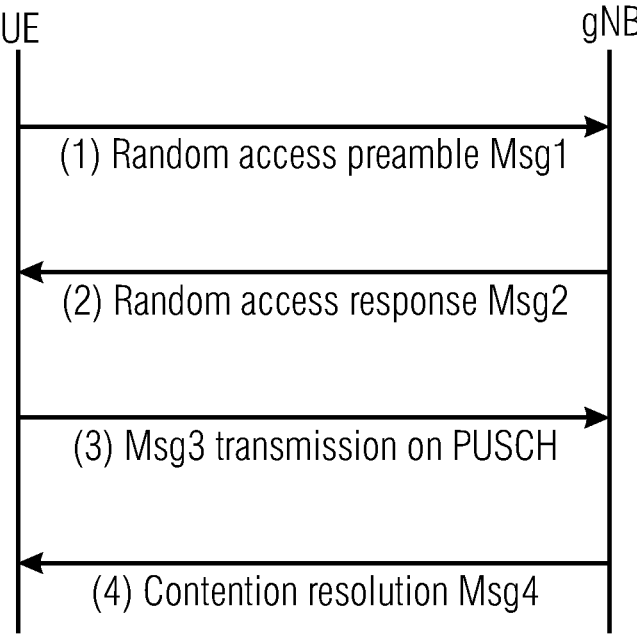
FIG. 12(*a*) illustrates a four-step Contention-Based Random Access, CBRA, procedure.
Figure 12B:
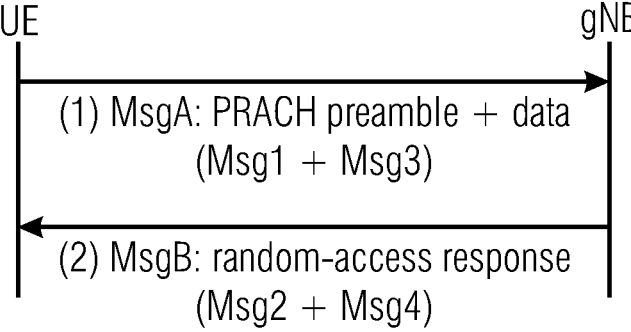

A RACH procedure may be a four-step or 4-way Contention-Based Random Access, CBRA, procedure, or a two-step or 2-way CBRA procedure as illustrated in FIG. 12(_a_) and FIG. 12(_b_), respectively. The four-step CBRA procedure comprises four messages being exchanged between the UE and the gNB. The UE send the RACH Message 1, Msg1, including the uplink PRACH preamble to the gNB. The UE monitors for the downlink RACH response, RAR, Message 2. Msg2, from the gNB, which includes the Random-Access Radio Network Temporary Identifier, RA-RNTI, and the preamble identifier. The UE sends the RACH Message 3, Msg3, in the uplink, optionally already including an RRC message. The CBRA procedure further includes the contention resolution message, Msg4, in the downlink. The two-step CBRA procedure comprises two messages exchanged between the UE and the gNB, one uplink message combining messages Msg1 and Msg3 described above, and one downlink message combining messages Msg2 and Msg 4 described above. The 2-way RACH procedure of FIG. 12(_b_) may be used especially for small data low latency traffic, e.g. for supporting URLLC services, where Msg1 and Msg3 are condensed into MsgA and Msg2 and Msg4 are condensed MsgB.

In accordance with embodiments, the base station 420 may receive from a UE, which performs a RACH procedure, a RACH message, like a certain RACH preamble. Responsive to receiving the RACH message, the base station determines a slice that triggered and/or that is associated with the RACH message and responds to the RACH message according to a slice-specific function. For example, the response may be the answer of the RACH resource configuration selection function on the base station or gNB side which generates the PRACH response, e.g., as described below in more detail with reference to FIG. 12(_c_). In accordance with other embodiments, the response may be an additional slice-specific configuration message following Message 4, e.g. Message 5, which contains slice-specific information. In accordance with embodiments, using Message 5, the UE may inform the gNB for which slices it performed the PRACH procedure, so that the gNB in return may prepare resources for these slices, e.g., send uplink grants to the UE for the particular slices. In accordance with other embodiments, this information may also be included in Msg3, the RRC Connection Request, e.g., using a MAC CE. The content of Msg3 may vary depending on whether the UE already has a C-RNTI or not. The content of the respective messages of the RACH procedure may be as described in http://howltestuffworks.blogspot.com/2019/09/5g-nr-random-access-procedure.html.

In accordance with other embodiments, the base station, responsive to receiving a RACH message, like Message 5, may create an event with slice-specific parameters, e.g. the scheduler may be triggered to schedule an uplink grant using slice-specific parameters, like QoS, priority, delay budget, or expected packet size. Other events may include establishing or modifying or releasing a network slice, wherein the modification may also be a re-mapping of a network slice, e.g., to perform a handover, to provide CHO information, to setup/modify/release measurements, to add/modify/release SCells, or to transfer dedicated NAS Information from gNB to UE.

In accordance with yet other embodiments, the base station, responsive to receiving the RACH message, may prioritize/deprioritize a RACH response according to the associated slice as described in more detail below in the second aspect of the present invention.

In accordance with further embodiments, the base station, responsive to receiving the RACH message, may select resources for a response according to the slice. For example, slice-specific data resources in a certain time/frequency/space resource grid, or slice-specific data resources from a different frequency band or a frequency carrier or bandwidth part associated to that network slice. For example, the gNB may realizes that a slice is better served in a different slice-specific bandwidth part, BWP, since it can only there provide the needed QoS. Resources may also be selected to achieve a certain reliability, e.g., by choosing the right modulation and coding schema (MCS), a lower frequency band for higher reliability, or a smaller subcarrier spacing to fulfill latency budgets.

Figure 12C:
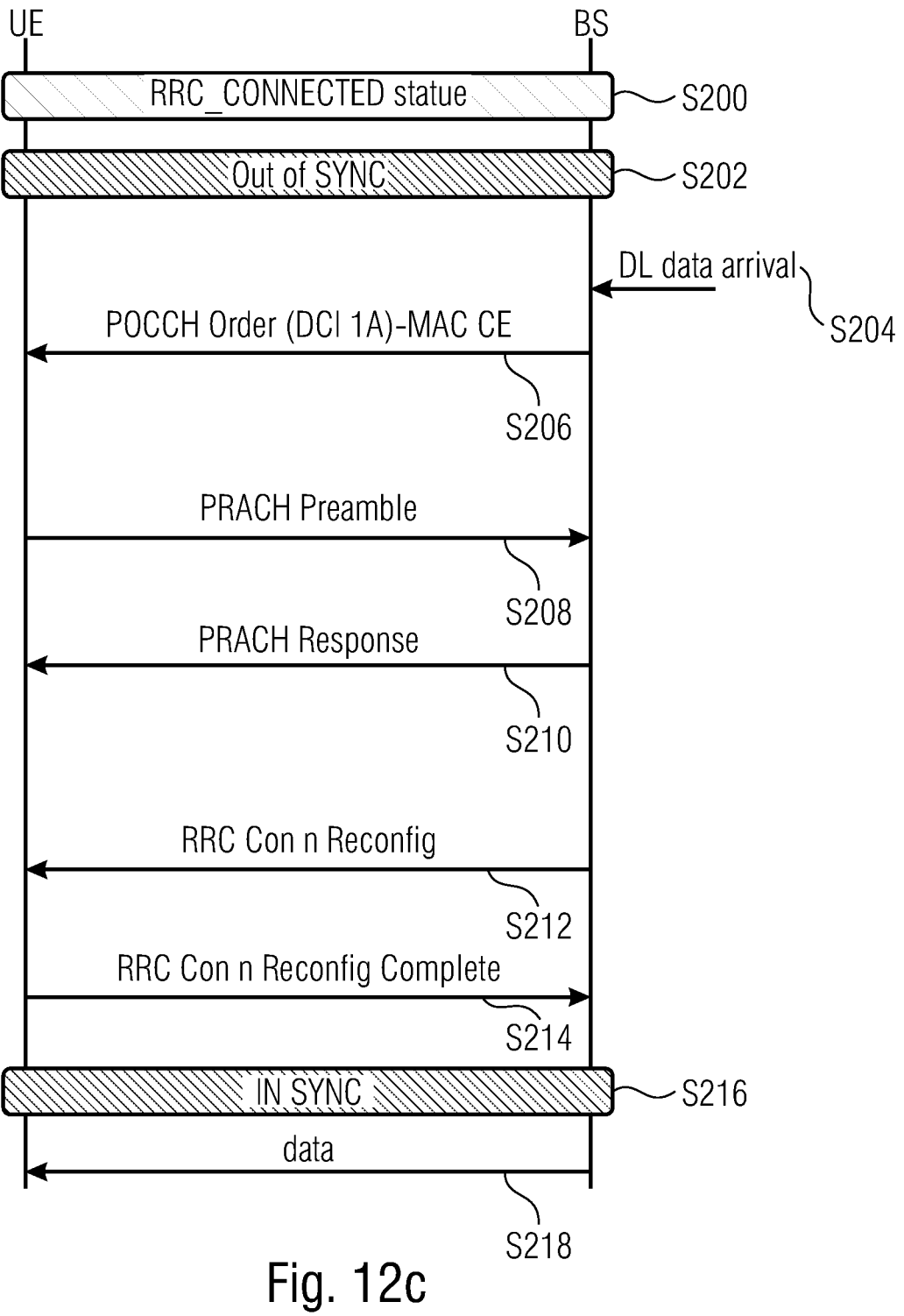

FIG. 12(c) illustrates the process performed at the base station 402 and at the UE in FIG. 11 in case of downlink data arrival at the base station. The UE is considered to be in RRC connected state with the base station 420 as indicated at S200, however, the base station, as mentioned above, may not be sure that the UE is still in uplink synchronization and therefore assumes or considers the UE to be out of sync as indicated at S202. At S204, it is assumed that data for a downlink from the base station to the UE is arriving at the base station 420. Since the base station 420 considers the UE to be no longer in synchronization, at S206, when the downlink data arrived, the base station 420 triggers a PDCCH order at the MAC layer, i.e., the gNB may use downlink control information, for example in LTE DCI format 1A or in NR DCI format 1_0, that is transmitted on the PDCCH to send a RACH request. In accordance with other embodiments, a newly defined DCI format may be used, for example a DCI format in which the bits may be interpreted differently so that not only a RACH request is indicated but also a RACH resource configuration index that points to a slice-specific RACH resource configuration to be used by the UE for the random-access. In accordance with the described embodiment, the slice-specific RACH resource configuration selection function is located at the gNB 420 since the gNB has the knowledge which control message or which data packet of which PDN session/QoS flow is pending for the downlink transmission. The gNB 420 may perform the slice-specific RACH resource configuration selection function based on similar input as the UE, such as slice identity or the other identities mentioned above, and signal the actual slice-specific RACH resource configuration to be used by the UE for the RACH process together with the RACH request. For example, the plurality of slice-specific RACH resource configurations, for example previously signaled by RRC system information or dedicated RRC signaling, may be numbered by an index and additional bits, like the RACH resource index, on a DCI format sent at S206, may point to a respective configuration. Once the UE receives the PDCCH DCI requesting the random-access, the UE decodes the DCI including, for example, the RACH resource index and based on the RACH resource index, a slice-specific RACH resource configuration is selected. The RACH procedure is started by the UE by selecting a RACH resource and a RACH preamble from the indicated slice-specific configuration and then the RACH is transmitted, as is indicated at S208 from the UE to the gNB 420.

In accordance with embodiments, a maximum number of 2 or 4 configured RACH resources may be defined so as to limit the signaling overhead. For example, in case of up to 2 configured RACH resources, the RACH resource index may be only 1 bit, in case of up to 4 configured RACH resources the RACH resource index is 2 bits. The bits may be added to an existing DCI format or may be part of a new DCI format. For example, in an existing DCI format, some bits may be replaced.

In accordance with other embodiments, the PDCCH order may indicate a specific RACH resource that is previously reserved by the gNB within an existing configuration that is used for contention free random-access, CFRA. The resource may be defined by a time frequency resource, by a preamble index, by a Synchronization Signal and Physical Broadcast Channel, SS/PBCH, index, by a PRACH mask index and the like. Assigning a very specific RACH resource that was previously reserved, avoids collisions with other UEs in the contention based random-access. The RACH resource configuration index may be part of the signaling to point to a very specific resource.

In FIG. 12(c), following the sending of the PRACH preamble at S208, the gNB 420 responds, at S210 with the PRACH response and, at S212, with the RRC connection reconfiguration message to which the UE at S214 responds with the RRC connection reconfiguration complete message, responsive to which the UE is considered to be in synchronization with the gNB 420 as indicated at S216. Following to the synchronization, the transmission of the downlink data from the gNB 420 to the UE is performed, as is indicated at S218.

FIG. 13 illustrates the above-described process for providing data from the base station 420 to the UE from the UE's perspective. Initially, for example at the time of the UE connecting to the system, the UE reads system information or receives dedicated RRC signaling including the plurality of slice-specific RACH resource configurations, for example multiple PRACH resource configurations linked to respective network slices as indicated at S230. At S232, the UE receives the PDCCH order (see S206 in FIG. 12(c)), and decodes the signal which requests a random-access channel procedure and which includes an indication which of the slice-specific PRACH resource configurations is to be used for the random-access channel procedure. At S234, the UE selects from the plurality of slice-specific PRACH resource configurations the one indicated by the PDCCH order, and, at S236 selects a resource to perform at S238 the RACH procedure using the selected resource, namely for sending the PRACH preamble (see S208 in FIG. 12(c)).

Handover

Figure 14:
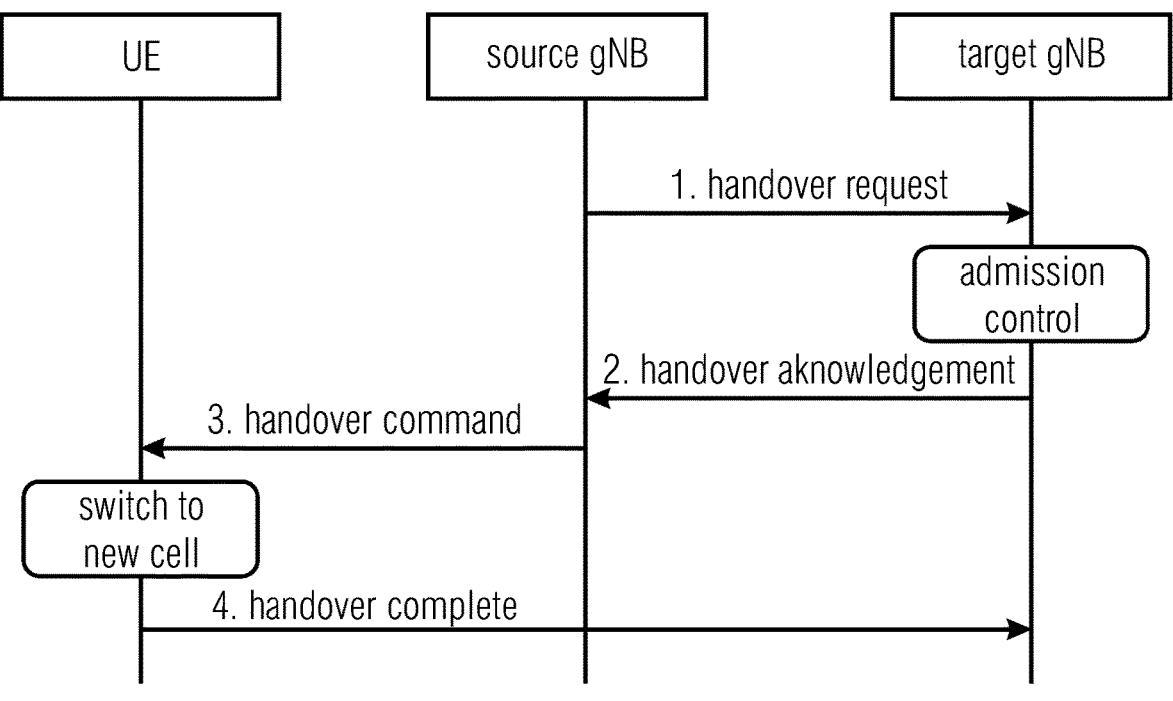
FIG. 14 illustrates a handover process in accordance with embodiments of the present invention.

Embodiments of the first aspect of the present invention concerning a handover situation or handover procedure are now described. During a handover procedure, the UE desires to handover the connection from a source gNB to a target gNB. Any UE connected to a serving cell is configured with neighbor cell measurements to prepare for a potential handover. Once the UE measures a strong neighbor cell, it may report this measurement on a potential target gNB to its source gNB. FIG. 14 illustrates a handover process, and before the handover process may be executed, the source gNB asks the target gNB, using for example a Xn handover request "1", whether it is allowed to handover a UE. In accordance with embodiments of the present invention, it is assumed that also the target gNB implements or supports the slices to which the UE requesting the handover is connected to in parallel or simultaneously. The target gNB performs admission control and, responsive to a positive admission control, the target gNB sends, for example, a Xn handover acknowledge message "2" to the source gNB. The target gNB may provide some configuration parameters of its cell configuration back to the source gNB and may also include parameters that are to be forwarded to the UE in the RRC handover command message "3" transmitted from the source gNB to the UE and supporting the UE to switch to the target cell. The handover message may be signaled by an RRC reconfiguration message. Since the uplink synchronization to the target gNB is missing, the UE is expected is to perform a random-access with regard to the target gNB, and the UE receives a random-access response, among others, with an uplink grant. The UE eventually sends a RRC handover complete message "4" to the target gNB to complete the handover.

Although the procedure in FIG. 14 is explained as a procedure using the inter-gNB interface Xn, like X2 in LTE, it is also possible to run the procedure via the core network over the NG interface, like the S1 interface in LTE.

In the handover situation, the network needs to control the configuration/resources for the RACH to be used by the UE when performing a random-access for completing the handover. The gNBs configure and control their own resources, i.e., the target gNB resources are controlled by the target gNB and not the source gNB. The UE obtains the respective information from a gNB by reading the RRC system information, for example, the RACH resource configuration by reading SIB-1 or a new SIB-slicing. However, during handover it may not be possible for the UE to read all system information because the UE is still in coverage of the source gNB. While a certain set of minimum system information, like the MCS information block, or minimum system information or the SIB-1 is signaled with higher quality, for example, with a larger power and a more conservative MCS or more often repeated, other SIBs may not be transmitted as reliable and may not be receivable in a neighboring cell outside the coverage of the target gNB. Thus, during a handover situation, when the UE is only approaching the coverage of the new gNB, the target gNB, it may not be possible to receive the SIBs, like the SIB-slice and in this case the UE has no knowledge about the slice-specific RACH resource configurations as employed by the target gNB, which may be different from the ones employed by the source gNB.

In accordance with embodiments of the present invention, to address this situation, after having received the Xn handover request message "1" from the source gNB, the target gNB provides details of the slice-specific RACH resource configuration. The source gNB forwards this information transparently and unmodified to the UE in the RRC handover commend message "3", and the UE considers the information in the RACH resource selection procedure. For example, the information provided to the UE may be the slice-specific RACH resource configurations as otherwise provided by system information blocks, like the SIB-slices.

The target gNB may execute the slice-specific RACH resource configuration selection function after a successful admission control following a handover request from a source gNB. The slice-specific RACH resource configuration selection function may decide about the slice-RACH resource configuration to be used based on the target gNB configuration and, in accordance with embodiments, also on the basis of information provided in the handover request message from the source gNB. Such information provided in the handover request may include, among others, PDU session identities or other PDU session resource information that may contain the slice identities of the slices the UE is connected to. For the user plane, the information may contain the PDU session type, the QoS flows that are to be setup in up- and downlink and potentially queues and data information on the transmission status. For the control plane, information may be included which core network entities the UE is connected to, information about the transport network layer parameters and the like.

In accordance with embodiments, the target gNB may not admit access to all resources, slices, QoS flows and the like but just to a subset of the requested resources, slices, PDU sessions, QoS flows and the like. The target gNB may inform the source gNB which resources, slices, PDU sessions and QoS flows are admitted and which are not admitted, for example using a PDU session resources not admitted list and/or a PDU session resources admitted list. Dependent on the admitted resources, slices, QoS flows, the slice-specific RACH resource configuration to be used is selected.

In case of a contention free random-access, in accordance with embodiments, the target gNB may not only select the slice-specific RACH resource configuration, but also the specific RACH resource, the preamble index and other RACH resource configuration parameters to be used by the UE for the RACH procedure.

The target gNB may forward the outcome of the RACH resource configuration selection function and the RACH resource selection to the source gNB in the handover acknowledge message "2", e.g., using a transparent container. The transparent container is then forwarded to the UE in the handover command, i.e., using the RRC reconfiguration message "3" informing the UE about the slice-specific RACH resource configuration to be used when connecting to the target gNB with a random-access.

The embodiments described above provide all needed information to the UE during the handover process, however, it also leads to an increase in the size of the handover message. The size of the handover message may be critical because the UE within the handover region experiences a degradation in receive quality. To address this problem, embodiments make use of the requirement in NR that the same slices are to be supported within a certain tracking area, TA. Therefore, in accordance with other embodiments, the same slice-specific RACH resource configurations may be provided by all gNBs within a certain tracking area so that, for example, the same indexing of the slice-specific RACH resource configurations is used in a source gNB and in a target gNB. During a handover situation, within a tracking area, this allows to signal only the previously defined slice-specific RACH resource configuration index and not the complete configuration. Thus, the increase in size of the handover message is avoided, and the UE knows from the system information that, if the target gNB is within the same tracking area and broadcasting the same tracking area code, the same slice-specific RACH resource configurations are used in the target cell. In a newly defined RRC handover command, this additional information may be defined by new information elements, IEs.

Figure 15:
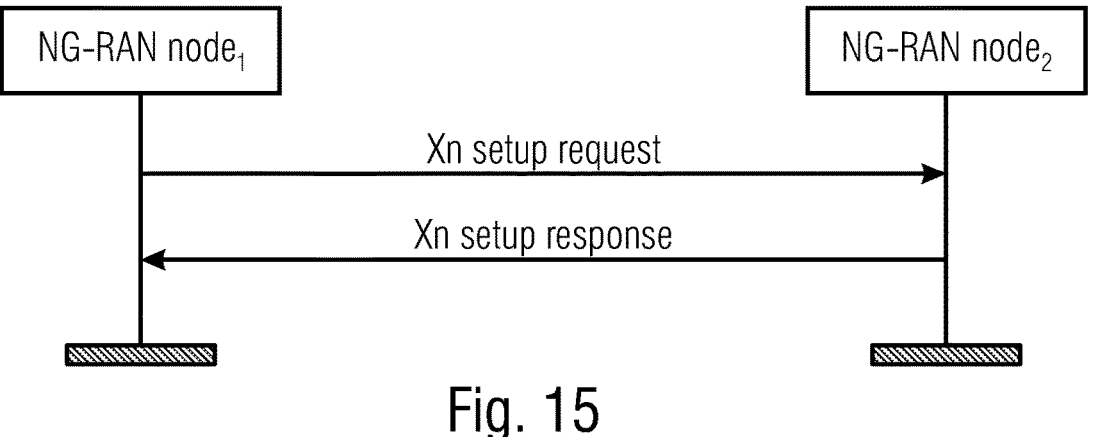
FIG. 15 illustrates an embodiment of the present invention exchanging information about slice-specific RACH resource configurations as part of a set up procedure between base stations for use during a handover.

When considering the above embodiments regarding the handover procedure, providing the RACH resource configuration in every handover or at every conditional handover, adds to the signaling overhead even if the RACH resource configuration is quite static. Therefore, in accordance with further embodiments, the gNBs may exchange information about the slice-specific RACH resource configurations via an inter-gNB interface such as the Xn, X2, or S1-MME, NG-C interface. FIG. 15 illustrates an embodiment in accordance with which this information may be exchanged as part of a set up procedure. As is illustrated, the information is provided when a gNB is being set up via a set up procedure. The gNB1 requesting an Xn setup may add its slice-specific RACH resource configuration in the Xn setup request message, while the answering gNB2 may include its slice-specific RACH resource configuration in the Xn setup response message.

Figure 16:
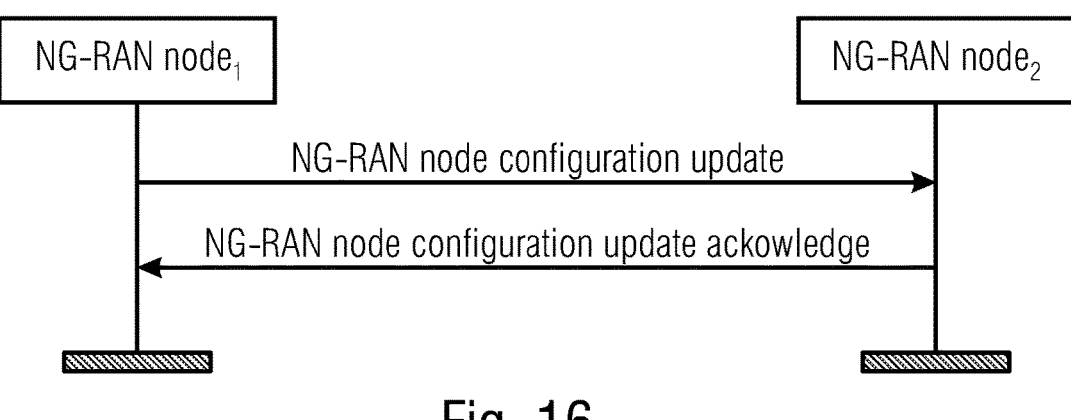
FIG. 16 illustrates an embodiment of the present invention updating information about slice-specific RACH resource configurations as part of an update procedure between base stations for use during a handover.

In case a configuration changes within a certain gNB, the gNB may provide the updated slice-specific RACH resource configuration via an Xn gNB configuration update procedure as is illustrated in FIG. 16.

In accordance with further embodiments, each base station may maintain the slice-specific RACH resource configuration of each neighbor cell in a neighbor cell list table. In case of a handover or in case of a conditional handover, the source gNB already knows which of the slice-specific RACH resource configurations is to be selected from the configured slice-specific RACH resource configuration of the target gNB for performing the RACH process for the handover completion. This may be based on information contained in the handover request or in the handover response message, for example a requested explicit or implicit slice identity.

Conditional Handover

Figure 17:
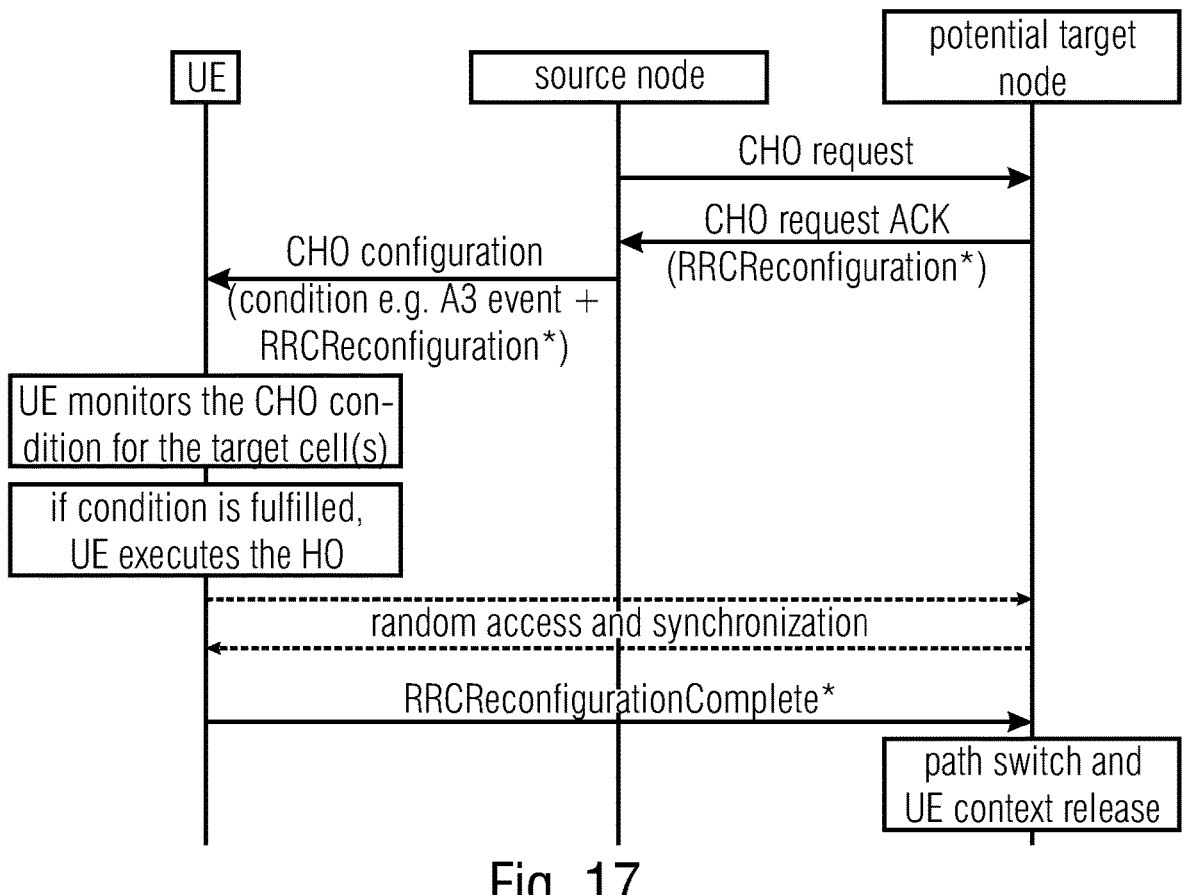
FIG. 17 illustrates a conditional handover process in accordance with embodiments of the present invention.

In the embodiment described above, reference has been primarily made to a handover process, however, the inventive approach may be equally applicable to a conditional handover situation, CHO situation. CHO is standardized in NR Rel. 16. Instead of the gNB making the decision based on UE measurement reports, the actual handover decision is made by the UE based on a gNB configuration. FIG. 17 illustrates the conditional handover process which is basically the same as the process in FIG. 14 except that the UE received from the source node the handover conditions to be monitored. Once the handover conditions are fulfilled, the handover is executed by the UE. In other words, in case one or more predefined CHO criteria are met, for example, a certain signal strength threshold, the CHO is triggered, and the UE performs the RACH in the target cell. The signaling of the information for performing the RACH in the target cell is the same as described above with reference to the non-conditional handover. While in regular handover, HO, the gNB provides details about the selected RACH resource in the HO command, in CHO, the gNB may provide the details about the selected RACH resource configuration in the CHO configuration. Once a CHO configuration is to be established, the source gNB sends a CHO request (see FIG. 17) to the target gNBs and receives an acknowledgement message of the potential target nodes with configuration details. This also includes details of the RACH resource configurations that are to be used for the respective slices and the source gNB forwards the information to the UE when configuring the CHO with the RRC reconfiguration message.

Initial Access from RRC Connected, for Example RRC Connection Re-Establishment

In case a UE lost its link to a serving cell, after a certain time, for example a timer T310 expiry, a radio link failure (RLF) is declared. At some point in time, for example after a timer T312 expiry, an RRC reestablishment to a previous serving cell may be triggered. The procedure starts with a random-access. Since the RRC reestablishment applies to all slices, in accordance with embodiments, no slice-specific procedure is implemented, rather a cell specific procedure is started that triggers a RACH that is linked to a default RACH resource or a prioritized RACH resource. For example, the SIB-slice may indicate which resources may be prioritized, for example for a cell specific procedure like a RRC connection reestablishment.

Response to Paging, Transition from Idle, Transition from RRC Inactive

In accordance with other embodiments, further procedures may trigger a RACH at the UE side. Such procedures may be triggered by the gNB, for example by paging, or may be triggered by the UE itself, for example by transmitting a control message in the uplink. The RACH configuration to be employed may include, in accordance with embodiments, a primary or procedure-specific RACH resource configuration to be used for such control procedures. In accordance with other embodiments, the UE may remember a last RACH resource configuration that was used. The UE may store the information about the last used RACH resource configuration in its buffer, like in a look-up table for several slice-specific RACH resource configurations, to be used when executing the RACH resource configuration function once a random-access is triggered.

General

Embodiments of the first aspect of the present invention provide for a full isolation of RACH resources on a slice or PLNM specific manner which allows for reliable random-access without cutting off a large number of users from the communication system, for example in case of emergency calls in a high load scenario.

Second Aspect

Embodiments of the second aspect address the issue of potentially overlapping RACH procedures to be performed by a UE connected to a plurality of different slices in parallel or simultaneously, wherein the respective RACH resources are triggered by RACH events on the different slices.

UE—Handling of Multiple RACH Procedures

In accordance with the second aspect, the present invention provides a user device, UE, for a wireless communication network, wherein the UE is connectable to two or more of a plurality of network slices of the wireless communication network, wherein a slice specific random access channel, RACH, resource configuration is associated with one or more of the plurality of slices, wherein, responsive to a first RACH event associated with a first slice, the UE is to determine whether there is an ongoing RACH procedure triggered by a second RACH event associated with a second slice, and wherein, in case of an ongoing RACH procedure, the UE is to prohibit an additional RACH procedure triggered by the first RACH event associated with the first slice, and/or suspend the additional RACH procedure for a certain time, and/or stop the ongoing RACH procedure and start the additional RACH procedure, and/or modify the ongoing RACH procedure, and/or modify the ongoing RACH procedure to start the additional RACH procedure.

In accordance with embodiments of the second aspect, the slice specific RACH resource configuration specifies one or more resource configurations and one or more parameters for a RACH procedure, like a PRACH preamble, e.g., including a preamble format, a preamble sequence, a sequence length, a subcarrier spacing used for the preamble, a cyclic prefix, a guard time length, a beam index, a trigger to switch beams, resources used for the PRACH, e.g., time and/or frequency and/or spatial resources, one or more parameters for determining one or more root sequences and cyclic shifts of the root sequences in a PRACH preamble sequence set, an index to a logical root sequence table a cyclic shift, $N_{CS}$, a set type, e.g., unrestricted, restricted set A, or restricted set B.

3 In accordance with embodiments of the second aspect, the UE is to abort any additional RACH procedure in case there is an ongoing RACH procedure so that, at any point in time, there is only a single ongoing RACH procedure.

In accordance with embodiments of the second aspect, the UE is to suspend the additional RACH procedure until the ongoing RACH procedure is completed.

In accordance with embodiments of the second aspect, the UE is to store information related to the additional RACH procedure to be used when starting the additional RACH procedure on the second slice, once the ongoing RACH procedure on the first slice is completed.

In accordance with embodiments of the second aspect, responsive to the ongoing RACH procedure having failed for a predefined number of times, the UE is to stop or defer the ongoing RACH procedure, and to start the additional RACH procedure.

In accordance with embodiments of the second aspect, the UE is to prohibit or suspend the additional RACH procedure in case any parallel RACH procedures using different slice specific RACH resource configurations are not allowed, e.g., by a certain standard specification, by the defined UE capabilities and/or, parallel RACH procedures using different slice specific RACH resource configurations are disabled, e.g., for a certain cell, a certain UE, a certain service type, a certain priority level, a certain slice, or a certain RACH trigger. and/or, the ongoing RACH procedure has a higher priority than the additional RACH procedure, and/or the additional RACH procedure uses a different configuration when compared to the ongoing RACH procedure, e.g., a different numerology, a different subcarrier spacing, a different frequency band or a bandwidth part, and/or the additional RACH procedure is sent to a different BS or DU than the ongoing RACH procedure.

In accordance with embodiments of the second aspect, the UE is to suspend the additional RACH procedure once the ongoing RACH procedure is partly completed.

In accordance with embodiments of the second aspect, the UE is to start the additional RACH procedure such that there are no parallel uplink transmissions associated with the ongoing RACH procedure and the additional RACH procedure.

In accordance with embodiments of the second aspect, the UE is to start the additional RACH procedure responsive to a certain event associated with the ongoing RACH procedure, the certain event including one or more of:

the UE sending the RRC Connection Request Message 3 for the ongoing RACH procedure in the uplink, the UE receiving the RACH Response, RAR, Message 2 for the ongoing RACH procedure in the downlink, the UE sending the RACH Preamble Message 1 for the ongoing RACH procedure in the uplink, the UE receiving an RRC connection reconfiguration message in the downlink.

In accordance with embodiments of the second aspect, the UE is to stop the ongoing RACH procedure and start the additional RACH procedure during the whole ongoing RACH procedure or until a certain stage of the ongoing RACH procedure, and/or responsive to one or more pre-emption criteria being fulfilled.

In accordance with embodiments of the second aspect, the one or more pre-emption criteria comprise one or more of the following:

certain parameters in the RRC RACH resource configuration, like a relative slice priority, or a QoS flow or a logical channel priority, an event that triggered the RACH procedure, like a PDCCH order, or a handover, or a CHO, or an RRC re-establishment, a type of user plane message pending for transmission, e.g., to which logical channel, or QoS flow, or PDN session, or slice identity the message belongs to, a QoS attribute of a user plane message pending for transmission, like priority, or latency or reliability of the logical channel or data flow the message belongs to, a type of message pending for transmission, e.g., prioritization of an RRC control plane message transmitted over a Signaling Radio Bearer over a user plane message transmitted over a of Data Radio Bearer, an entity that triggered the RACH procedure, e.g., prioritization of a UE triggered RACH procedure over a base station triggered RACH procedure or SL-UE triggered RACH procedure, like a group lead UE, or an RSU.

In accordance with embodiments of the second aspect, to modify the ongoing RACH procedure, the UE is to modify a certain message, e.g. Msg3, transmitted by the UE during the ongoing RACH procedure by including into certain message, in addition to an indication of the first slice, an indication of the second slice so as to allow a base station to provide in response to the certain message parameters for a configuration of the first and second slices.

In accordance with embodiments of the second aspect, to modify the ongoing RACH procedure to start the additional RACH procedure, the UE is to modify a certain message, e.g. Msg3, transmitted by the UE during the ongoing RACH procedure by replacing an indication of the first slice with an indication of the second slice so as to allow a base station to provide in response to the certain message parameters for a configuration of the second slice.

In accordance with embodiments of the second aspect, the additional RACH procedure and the ongoing RACH procedure are triggered at the same time or are triggered within a certain time window.

In accordance with embodiments of the second aspect, the UE is configured or pre-configured to support two or more parallel ongoing RACH procedures, the ongoing RACH procedure being associated with different slices.

In accordance with embodiments of the second aspect, the UE is only permitted to perform two or more PRACH procedures for different slices, if the slice is configured to one or more of use of a different BWP, operate on a different carrier frequency with a frequency gap of delta x between a first radio frequency, e.g. operating on FR1, and a second radio frequency, e.g. operating on FR2.

UE—Allowing Multiple RACH Procedures

In accordance with the second aspect, the present invention provides a user device, UE, for a wireless communication network, wherein the UE is connectable to two or more of a plurality of network slices of the wireless communication network, wherein a slice specific random access channel, RACH, configuration is associated with one or more of the plurality of slices, wherein the UE is configured or pre-configured to support two or more parallel ongoing RACH procedures, the ongoing RACH procedure being associated with different slices.

In accordance with embodiments of the second aspect, the possibility of having parallel ongoing RACH procedures is specified as a UE capability, and the UE is to report its capabilities to a base station or another UE, e.g., when the UE registers for the first time to the wireless communication system.

In accordance with embodiments of the second aspect, the UE is to receive from the base station an enquiry, like an RRC UE Capability Enquiry message, and responsive to the enquiry, send to the base station the capabilities, e.g., using an RRC UE Capability Information message.

In accordance with embodiments of the second aspect, the UE is to enable parallel ongoing RACH procedures responsive to a signaling from the base station, e.g., in order to reduce a latency of the RACH procedures associated with slices supporting latency critical services, and disable parallel ongoing RACH procedures responsive to a signaling from the base station, e.g., for slices supporting a mission critical communication.

UE—Monitoring Multiple RAR Messages

In accordance with embodiments of the second aspect, the UE is to monitor two or more random access response, RAR, messages in a downlink corresponding to two or more slice specific RACH resource configurations.

In accordance with embodiments of the second aspect, the UE is to monitor one or more common resources or one or more slice-specific resources for the two or more RAR messages.

In accordance with embodiments of the second aspect, the UE is to monitor a common search space for the two or more RAR messages, like a bandwidth part, BWP, being common for all slices.

In accordance with embodiments of the second aspect, the UE is preconfigured or configured with a Control Resource Set, CORESET, for a common PDCCH Search Space, in a common BWP to monitor for the two or more RAR messages.

In accordance with embodiments of the second aspect, the RAR messages corresponding to the different slice specific RACH resource configurations are differentiated by splitting of RACH resources and RA-RNTIs, and/or splitting preamble identities, and/or additional information, like additional RA-RNTIs or preamble identities, and/or introducing a slice specific RACH resource configuration index or a slice resource index.

In accordance with embodiments of the second aspect, wherein the additional information is signaled as part of a MAC PDU for RAR.

In accordance with embodiments of the second aspect, the UE is to monitor separate slice-specific search spaces, like slice specific bandwidth parts BWPs and/or CORESETs and/or PDCCH search spaces, and/or PSCCH search spaces, each separate slice-specific search space associated with a certain slice specific RACH resource configuration.

In accordance with embodiments of the second aspect, the UE is preconfigured or configured with one or more downlink resources of slice-specific search spaces to be monitored.

In accordance with embodiments of the second aspect, an Uplink Grant received in a RAR message for a certain slice points to a different uplink resource as previously configured for the certain slice, like a different BWP.

In accordance with embodiments of the second aspect, among the plurality of slices, a slice has its own slice specific RACH resource configuration, and/or two or more slices share a slice specific RACH resource configuration.

In accordance with embodiments of the second aspect, the UE is configured or pre-configured with the slice specific RACH resource configurations for some or all of the plurality of slices.

In accordance with embodiments of the second aspect, responsive to a RACH event, the UE is to determine a slice that triggered and/or that is associated with the RACH event, and select the slice specific RACH resource configuration associated with the determined slice to be used for performing a RACH procedure.

Base Station

In accordance with the second aspect, the present invention provides a base station, BS, for a wireless communication network, wherein the BS is to support one or more of a plurality of slices of the wireless communication network, wherein a slice specific random access channel, RACH, configuration is associated with one or more of the plurality of slices, wherein the BS is to configure one or more user devices, UEs, to enable or to disable parallel ongoing RACH procedures.

System

In accordance with the first aspect, the present invention provides a wireless communication system, comprising one or more of the inventive user devices, UEs, and/or one or more of the inventive base stations, BSs.

Method

In accordance with the second aspect, the present invention provides a method for operating a user device, UE, for a wireless communication network, wherein the UE is connectable to two or more of a plurality of network slices of the wireless communication network, wherein a slice specific random access channel, RACH, resource configuration is associated with one or more of the plurality of slices, the method comprising:

responsive to a first RACH event associated with a first slice, determining whether there is an ongoing RACH procedure triggered by a second RACH event associated with a second slice, and in case of an ongoing RACH procedure, prohibiting an additional RACH procedure triggered by the first RACH event associated with the first slice, and/or suspending the additional RACH procedure for a certain time, and/or stopping the ongoing RACH procedure and start the additional RACH procedure, and/or modifying the ongoing RACH procedure, and/or modifying the ongoing RACH procedure to start the additional RACH procedure.

In accordance with the second aspect, the present invention provides a method for operating a user device, UE, for a wireless communication network, wherein the UE is connectable to two or more of a plurality of network slices of the wireless communication network, wherein a slice specific random access channel, RACH, configuration is associated with one or more of the plurality of slices, the method comprising:

configuring or pre-configuring the UE to support two or more parallel ongoing RACH procedures, the ongoing RACH procedure being associated with different slices.

In accordance with the second aspect, the present invention provides a method for operating a base station, BS, for a wireless communication network, wherein the BS is to support one or more of a plurality of slices of the wireless communication network, wherein a slice specific random access channel, RACH, configuration is associated with one or more of the plurality of slices, the method comprising:

configuring one or more user devices, UEs, to enable or to disable parallel ongoing RACH procedures.

Figure 18:
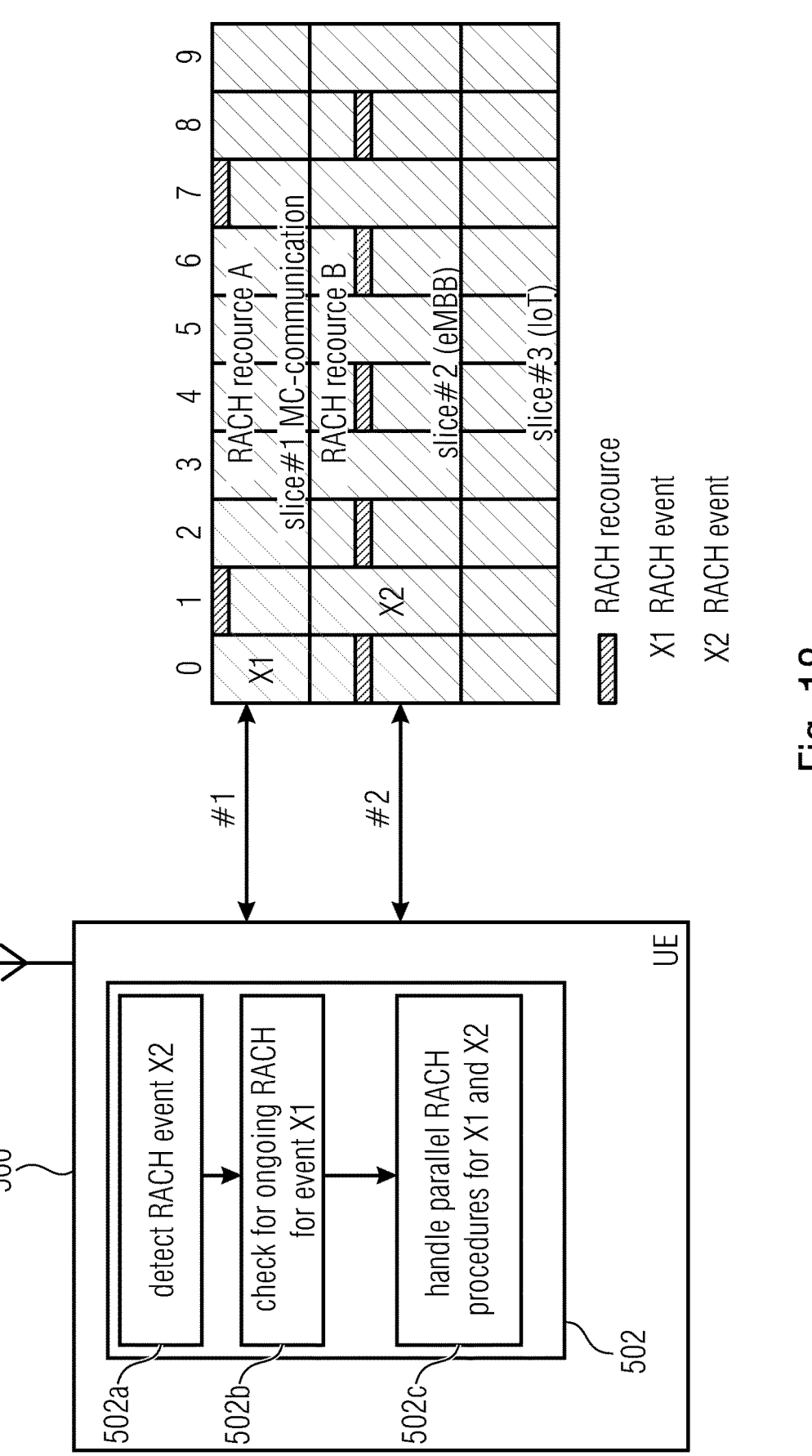
FIG. 18 illustrates an embodiment of the second aspect of the present invention allowing a UE connectable to two or more slices to handle two or more RACH procedures triggered at the same time or during an ongoing RACH procedure.

FIG. 18 illustrates an embodiment of the second aspect of the present invention, more specifically an embodiment of a UE 500 connectable to two or more slices and able to handle two or more RACH procedures triggered at the same time or during an ongoing RACH procedure. The UE 500 is assumed to be connected to a network using network slicing, e.g., a network as described above with reference to FIG. 4 and FIG. 6. The configuration of the network depicted in FIG. 18 is as in FIG. 4 or FIG. 6 described above. UE 500 is connected to two slices in parallel or simultaneously, namely to slice #1 and to slice #2. The UE may include a processor 502 to detect a certain RACH event X2 that is associated with slice #2, as is indicated at 502a. The UE 500, responsive to detecting the RACH event in slice #2, determines or checks whether there are any ongoing RACH procedures triggered by a different RACH event associated with a different slice. In FIG. 18 a situation is depicted in which there is an ongoing RACH procedure X1 that originated from a first RACH event in slice #1. Following the checking for an ongoing RACH procedure at 502b, in case such an ongoing RACH procedure is found, the UE, at 502c, may handle the one or more further or additional RACH procedures to be initiated in different ways.

In the embodiment of FIG. 18, the UE is connected to two slices, however, the present invention is not limited to such embodiments, and the UE may be connected to more than two slices in parallel.

The UE, in accordance with an embodiment, may prohibit an additional RACH procedure, like the second RACH procedure triggered by the RACH event X2 associated with the slice #2. In accordance with other embodiments, the UE may suspend the additional RACH procedure for a certain time. In accordance with yet other embodiments, the UE may stop an ongoing RACH procedure, like the RACH procedure by RACH event X1 in FIG. 18, and start the additional RACH procedure initiated by RACH event X2. In accordance with even further embodiments, the UE may modify the ongoing RACH procedure or modify the ongoing RACH procedure to start the additional RACH procedure.

Figure 19:
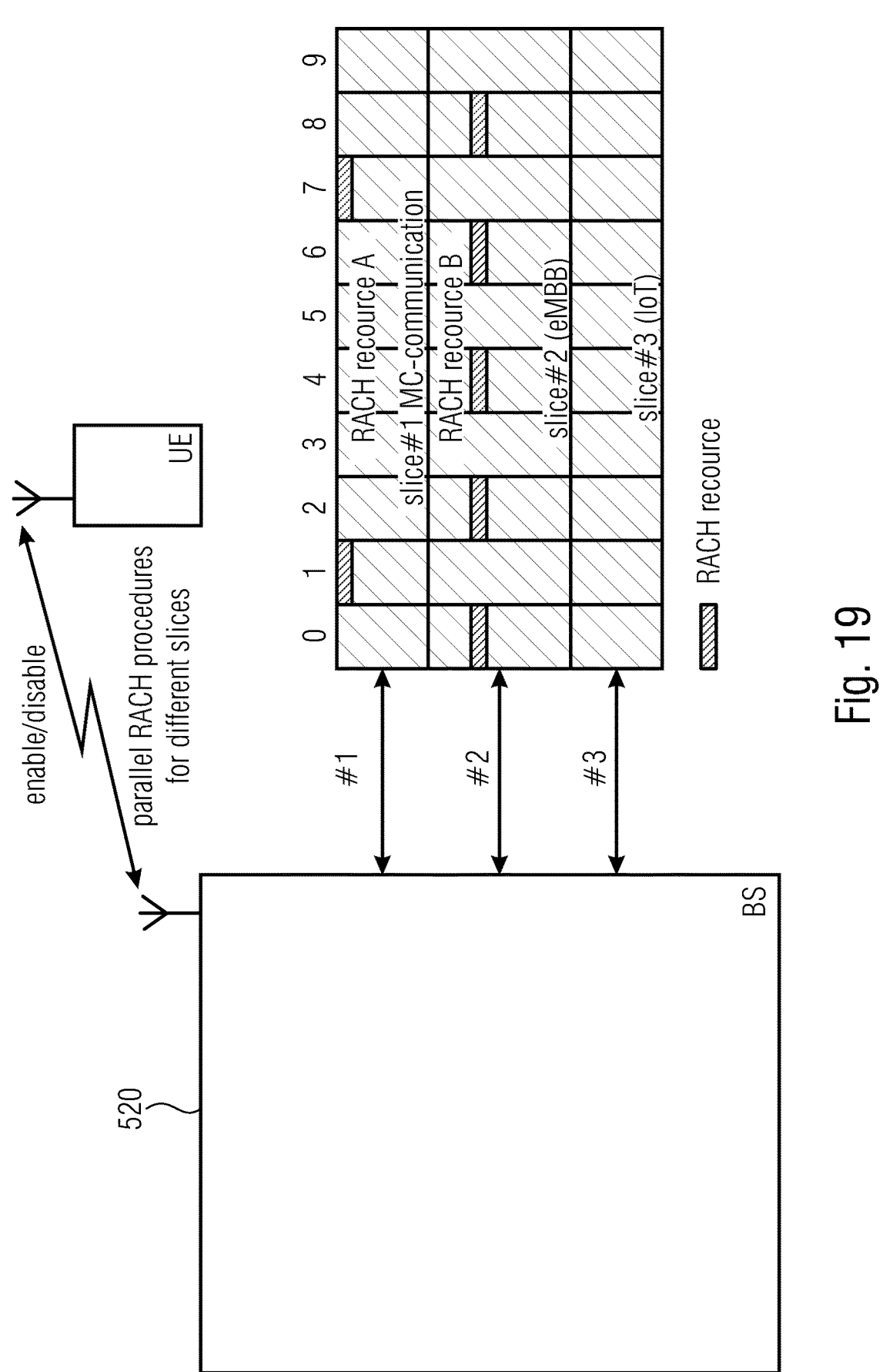
FIG. 19 illustrates a base station in accordance with embodiments of the second aspect of the present invention.

Further embodiments of the second aspect of the present invention provide a base station as shown in FIG. 19. The base station 520 supports one or more of a plurality of slices as provided by the wireless communication network, like the core network. In FIG. 19, the base station 520 is assumed to support three slices as described, e.g., with reference to FIG. 4 and FIG. 6. In accordance with embodiments of the second aspect, the base station 520 supporting such slices may configure a UE that is connected to the base station 520 to enable or to disable parallel ongoing RACH procedures. In other words, the base station 520 may configure the UE such that two or more parallel RACH procedures are allowed, or such that two or more parallel RACH procedures not are allowed, e.g., by handling parallel RACH procedures in accordance with the subsequently described embodiments.

Embodiments for handling a plurality of overlapping RACH procedures are now described in more detail.

Prohibiting Parallel Ongoing RACH Procedures

In case a standard or specification of the UE implementation does not allow any further ongoing RACH procedures on different slice-specific RACH resource configurations, at any point in time, or in case the UE is configured by the base station or gNB to disable the processing of a plurality of ongoing RACH procedures in parallel, there may only be a single ongoing RACH procedure.

In accordance with embodiments, the UE executes a first RACH procedure on a slice-specific RACH resource configuration, also referred to as the ongoing RACH procedure, while a second RACH procedure, also referred to as the additional RACH procedure, on a second slice-specific RACH resource configuration is triggered. Although embodiments are described herein assuming that two RACH procedures for different slices occur in parallel or overlap, it is noted that the inventive approach is not limited to such embodiments. In accordance with further embodiments, more than two RACH procedures for different slices may occur in parallel or overlap.

Figure 20:
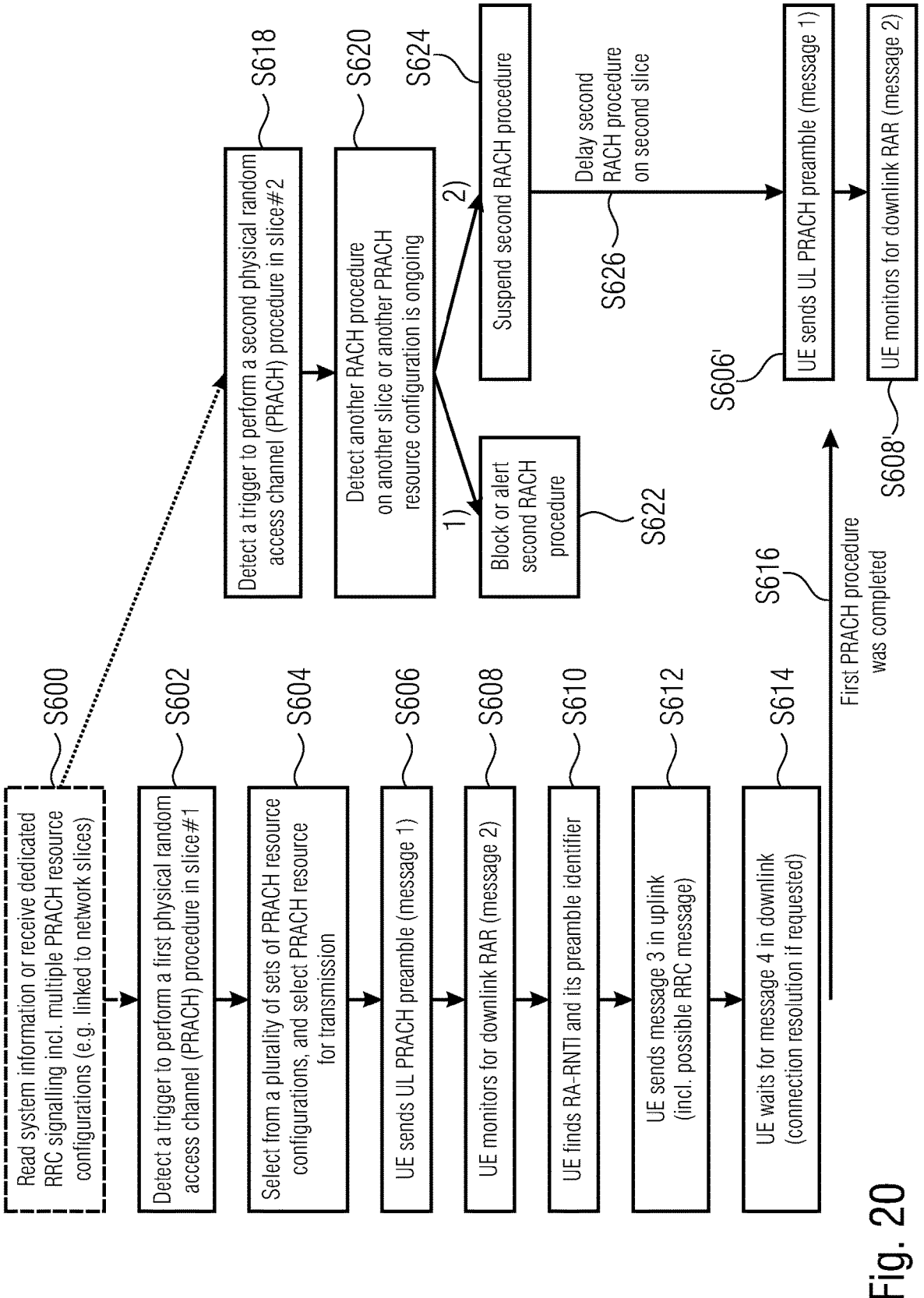
FIG. 20 illustrates an embodiment prohibiting any parallel ongoing RACH procedures.

To prohibit the parallel executing of RACH procedures, the second RACH procedure in a different slice is blocked or aborted until the first RACH procedure is completed. The UE detects that a first RACH procedure on a first slice or on a first slice-specific RACH resource configuration is ongoing, and blocks or aborts the second RACH procedure. FIG. 20 illustrates an embodiment prohibiting any parallel ongoing RACH procedures. Initially, at a S600, the UE, like UE 500 in FIG. 18, reads system information or receives a dedicated RRC signaling including a plurality of slice-specific RACH resource configurations, for example in a way as described above with reference to the first aspect of the present invention. The slice specific RACH resource configurations specify for one or more slices one or more resource configurations and one or more parameters for a RACH procedure. At S602, the UE 500 detects a trigger X1 to perform a first RACH procedure, also referred to as a physical random-access channel, PRACH, procedure, in slice #1 (see FIG. 18). At S604, the UE selects from a plurality of sets of slice-specific RACH or PRACH resource configurations the RACH or PRACH resource configuration for slice #1, and from the selected slice-specific PRACH resource configuration the UE selects the PRACH resource for the transmission. The UE performs a conventional RACH procedure, and sends, at S606, the RACH message 1, e.g., the uplink PRACH preamble, to the receiver, like a base station or another network entity, like a sidelink UE. The UE, at S608 monitors for the downlink RACH response, RAR, message 2 from the base station or the other network entity. At S610, the UE finds the Random-Access Radio Network Temporary Identifier, RA-RNTI, and its preamble identifier and sends, at S612, the RACH message 3 in the uplink, optionally already including an RRC message. In case a contention-based random-access procedure is employed, the UE, at S614, waits for the contention resolution message in the downlink, in case contention resolution is needed. This, as is indicated at S616 completes the first PRACH or RACH procedure.

The UE, while performing the first RACH procedure also monitors the network for further RACH triggers from slices other than slice #1. In the embodiment depicted in FIG. 20 the UE is assumed to detect at S618 a second trigger X2 to perform a second RACH or PRACH procedure in slice #2

(see FIG. 18). Responsive to detecting the trigger to perform the second PRACH procedure, the UE, at S620, determines that there is already another RACH procedure going on for another slice, i.e., another RACH procedure using a different slice-specific PRACH resource configuration, namely the above-described first PRACH procedure. It is noted that a RACH procedure is considered ongoing as long as the process S602 to S614 described above is not completed, i.e., ongoing also includes waiting for a response or waiting for contention resolution.

The UE, at S622 prohibits the second RACH procedure by blocking or aborting the additional RACH procedure. For example, the second RACH trigger may be disregarded and/or any parameters already obtained from the associated slice-specific RACH resource configuration may be discarded. In other words, in accordance with the current embodiment, upon detecting a further RACH procedure in addition to an ongoing RACH procedure, the UE does not perform the second or additional RACH procedure as indicated at S622 in FIG. 20.

In accordance with other embodiments, for prohibiting parallel ongoing RACH procedures, rather than blocking or aborting an additional RACH procedure as described above, the UE may suspend the second RACH procedure until the first RACH procedure is completed. This is also illustrated in FIG. 20. Responsive to detecting the parallel RACH procedures at S620, rather than aborting or blocking the second RAH procedure, the UE, at S624 suspends the second RACH procedure until the first RACH procedure is completed, i.e., performing the second RACH procedure is delayed on the second slice #2, as is indicated at S626 until the first RACH procedure is completed, as indicated at S616. Following the completion of the first RACH procedure, the UE starts the second RACH procedure as is indicated at S606' and S608' by performing, for example, the same steps as in the first RACH procedure. Thus, in accordance with the current embodiment, the second RACH procedure is only suspended by adding some delay until the procedure is allowed to start. Once a parallel, ongoing first RACH procedure on a first slice is detected, the UE waits until the first RACH procedure is completed. In this case, the UE may store the information related to the second RACH procedure, and once the first RACH procedure on the first slice is completed, the second RACH procedure on the second slice is started.

In accordance with embodiments the UE may to store information related to the additional RACH procedure to be used when starting the additional RACH procedure on the second slice, once the ongoing RACH procedure on the first slice is completed. The UE, responsive to the ongoing RACH procedure having failed for a predefined number of times, may stop or defer the ongoing RACH procedure, and start the additional RACH procedure.

In accordance with embodiments, the UE may to prohibit or suspend the additional RACH procedure to be executed in parallel with the ongoing RACH procedure in one or more of the following cases:

Any parallel RACH procedures using different slice specific RACH resource configurations are not allowed. For example, such parallel RACH procedures may not be allowed by a certain standard specification, or the UE capabilities do not allow for executing parallel RACH.
   Parallel RACH procedures using different slice specific RACH resource configurations are disabled, e.g., for a certain cell, a certain UE, a certain service type, a certain priority level, a certain slice, or a certain RACH trigger.
   The ongoing RACH procedure has a higher priority than the additional RACH procedure.
   The additional RACH procedure uses a different configuration when compared to the ongoing RACH procedure, e.g., a different numerology, a different subcarrier spacing, a different frequency band or a different bandwidth part.
   The additional RACH procedure is sent to a different base station or, in case of a cloud-RAN, C-RAN, a different distributed unit, DU, than the ongoing RACH procedure.

Prohibiting the additional RACH procedure is advantageous, e.g., in terms of power requirements at the UE. The overall uplink transmit power of the UE is limited, and, for example, a UE located at a cell edge may regularly transmit using its maximum power. Therefore, a power split among multiple parallel ongoing RACH procedures is not desired. Such a power split is avoided by blocking the second RACH procedure on a different slice or by suspending the second RACH procedure until the first RACH procedure is completed.

Time-Shifting the Additional RACH Procedures

In accordance with other embodiments of the second aspect of the present invention, an approach may be provided that allows improving the overall latency with a minimum impact on the performance for the second RACH procedure on the second slice. To achieve this, the second RACH procedure may be started before the first RACH procedure is completed, i.e., the second RACH procedure does not wait until the entire first RACH procedure is completed. In other words, in accordance with further embodiments, the second RACH procedure as described above with reference to FIG. 20, is not suspended for the entire duration of the first RACH procedure but only for a part thereof.

In accordance with embodiments, the first RACH procedure is partly completed before the second RACH procedure may start without increasing the requirements on UE complexity and processing. In accordance with embodiments, the second RACH procedure on the second slice may start when the Message 3 of the first RACH procedure was sent on the uplink. This is the last message of the RACH procedure that is being send in the uplink before completion. Since no other uplink message of the ongoing procedure is expected, the additional RACH procedure may already be started without any uplink transmission conflicts. This results in a lower latency of the additional RACH procedure since the UE does not wait until the reception of Message 4.

In accordance with further embodiments, the second RACH procedure on the second slice may start when the RAR Message 2 for the first RACH procedure was received in the downlink. In the RAR Message 2, among others, the uplink resource allocation of the transmission of Message 3 is send from the gNB to the UE. Based on the received RAR, the UE knows when the uplink transmission of Message 3 of the ongoing RACH procedure and shifts the uplink transmission of the RACH preamble Message 1 transmission of the additional RACH procedure. In case of an uplink collision, i.e., Message 3 of the ongoing RACH procedure collides with Message 1 of the additional RACH procedure, the UE may skip the respective RACH resource and select the next RACH resource. This results in an even lower latency of the additional RACH procedure since the UE does not wait until the transmission of Message 3.

In accordance with yet further embodiments, the second RACH procedure on the second slice may start, when the PRACH preamble message 1 for the first RACH procedure was sent on the uplink. A parallel transmission of RACH preambles is to be avoided as much as possible since a power split may have an even more severe impact on system performance compared to any other uplink data transmission. The primary reason is that the power is split among the two transmission at a time where the UE is not yet connected to the gNB, does not have a timing advance and performs link adaptation loops. The RACH preamble in message 1 is also the only message of the RACH procedure for which no HARQ retransmissions are supported, including soft-combining of different versions being retransmitted. Furthermore, the RACH preamble transmission is a non-orthogonal resource that operates at a low utilisation rate to avoid excessive interference from other UEs. For these reasons, the needed receive quality, i.e., the receive SINR, of the PRACH is to be higher compared to the uplink/downlink shared channel. This may be compensated by a higher transmit power which makes the power slit between two ongoing transmission exceedingly difficult and may significantly reduce the cell coverage and/or the reliability of the PRACH reception. Starting the additional RACH procedure, when the PRACH preamble message 1 for the first RACH procedure was sent on the uplink may minimize the latency of the additional RACH procedure to a minimum. Only the RACH preamble transmission of the additional RACH procedure is delayed. Nevertheless, when compared to starting the additional RACH procedure following messages 2 and 3, as described above, the transmission/reception of the following messages may collide and, therefore, may rely on HARQ retransmissions or on a scheduler coordination of the two RACH procedures by the gNB.

Figure 21:
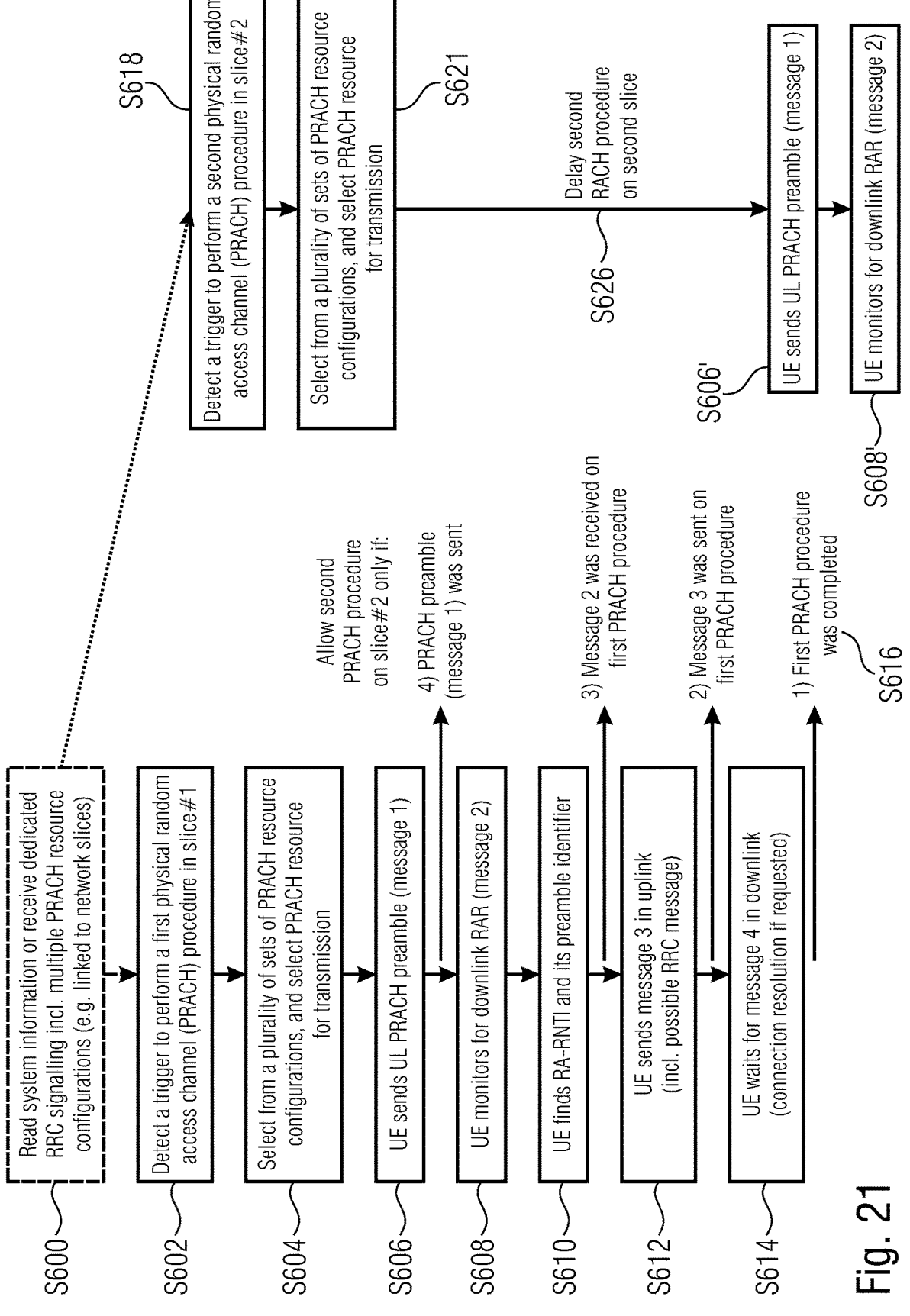
FIG. 21 illustrates an embodiment for time-shifting an additional RACH procedure.

FIG. 21 illustrates an embodiment for time-shifting an additional RACH procedure. The UE, responsive to being configured at S600 with the slice-specific RACH resource configurations performs at S602-S614 the first RACH procedure associated with a trigger or a RACH event X1 in slice #1 (see FIG. 18). When there is a second trigger X2 in a second slice #2 (see FIG. 18), the UE, as described above with reference to FIG. 20, detects this trigger X2 at S618. Responsive to detecting the trigger to perform the second PRACH procedure, the UE, at S621, determines that there is already another RACH procedure going on for another slice and selects from the plurality of slice-specific RACH resource configurations the slice/to RACH resource configurations, and, therefrom, the actual RACH resources to be used for the transmission, like the sending of the preamble message 1. Other than in the previous embodiments described with reference to FIG. 20, in the current embodiment, the UE delays the start of the second RACH procedure, as indicated at S626, not until the end or completion of the first RACH procedure as indicated at S616, but starts the second RACH procedure by performing the same steps as for the first RACH procedure as indicated at S606' and S608' responsive to receiving for the first RACH procedure the message 3 as indicated at S628 or responsive to receiving for the first RACH procedure the message 2 as indicated at S630 or already responsive to sending the RACH preamble message 1 for the first RACH procedure as indicated at S632.

The second RACH procedure on the second slice #2, when being started before the first RACH procedure is completed, may be performed such that, responsive to any one of the above messages 1-3, parallel transmissions of uplink signals, such as the PRACH preamble in message 1 are avoided.

Figure 22:
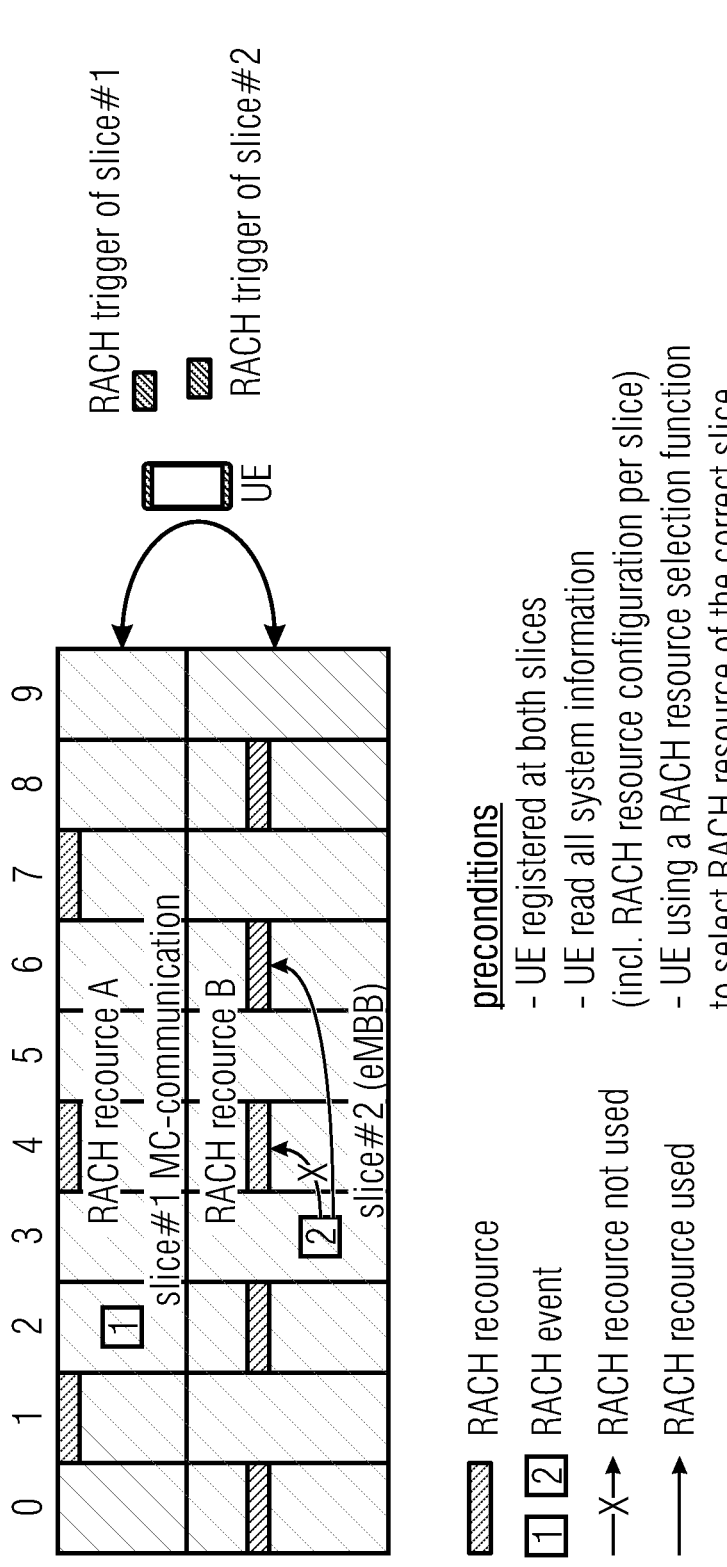
FIG. 22 illustrates a further embodiment for time-shifting an additional RACH procedure.

Starting the additional RACH procedure before the end of the ongoing RACH procedure is advantageous, e.g., in terms of latency and power requirements at the UE. The overall uplink transmit power of the UE is limited, and, for example, a UE located at a cell edge may regularly transmit using its maximum power. Therefore, a power split among multiple parallel ongoing RACH procedures is not desired. Such a power split may also be avoided when allowing parallel ongoing RACH procedures such that a parallel transmission in the uplink is avoided as much as possible. For example, in case two RACH procedures are triggered on different slice-specific RACH resources at the same time or with a certain offset so that the RACH procedures overlap at least partly, the UE may initially transmit the first RACH preamble of the slice-specific RACH resource configuration associated with a first slice #1 and time shift the second RACH preamble of the slice-specific RACH resource configuration for slice #2 to a later time. For example, the second RACH procedure, rather than using the immediately available RACH resource specified in the slice #2 specific RACH resource configuration, uses the next configured RACH resource of this configuration for the uplink transmission of the preamble. FIG. 22 illustrates an embodiment using such a time shift. FIG. 22 illustrates the triggering of RACH procedures associated with different slices in a network supporting a plurality of slices to which a UE may be connected in parallel. The network is similar to what is described above with reference to FIG. 4 and FIG. 6 and FIG. 18. In FIG. 22 the first RACH event "1" is illustrated in slice #1 to happen in subframe 2 and causing the first RACH procedure using RACH resources A as defined by slice #1 specific RACH resource configurations. For example, the first RACH procedure may use the RACH resource A in subframe 4 for sending the preamble. A second RACH event "2" is assumed to be detected by the UE in subframe 3, and the slice #2 specific RACH resource configuration specifies RACH resources B illustrated in FIG. 22 in subframes 0, 2, 4, 6 and 8. In accordance with the embodiment of deferring the second RACH procedure or suspending the second RACH procedure for a certain time, as described above, to avoid simultaneous uplinks by the UE the RACH procedure for the second slice #2, rather than using the RACH resource B in subframe 4 uses, for sending the preamble message 1, the RACH resource B provided in subframe 6, thereby avoiding simultaneous transmissions and a need to split or distribute the power among the two transmission procedures for the two RACH procedures, thereby avoiding that one or both of the transmissions is not received at the receiver, like the base station or another network entity.

Preemption of RACH Procedures

In the embodiments described so far, the additional or second RACH procedure was either blocked or suspended for a certain time, however, the second aspect of the present invention is not limited to such embodiments. Instead of waiting until the previous RACH procedure on a certain slice is completed or at least partly completed, as described above, in accordance with further embodiments, preemption of an ongoing RACH procedure may be implemented. For example, in case a second RACH procedure on a second slice, which is detected while a first RACH procedure is ongoing, is determined to have a higher priority than the first RACH procedure or in case is belongs to a slice having a higher priority than the first slice, the preemption of the ongoing RACH procedure by the additional or second RACH procedure may be implemented.

Figure 23:
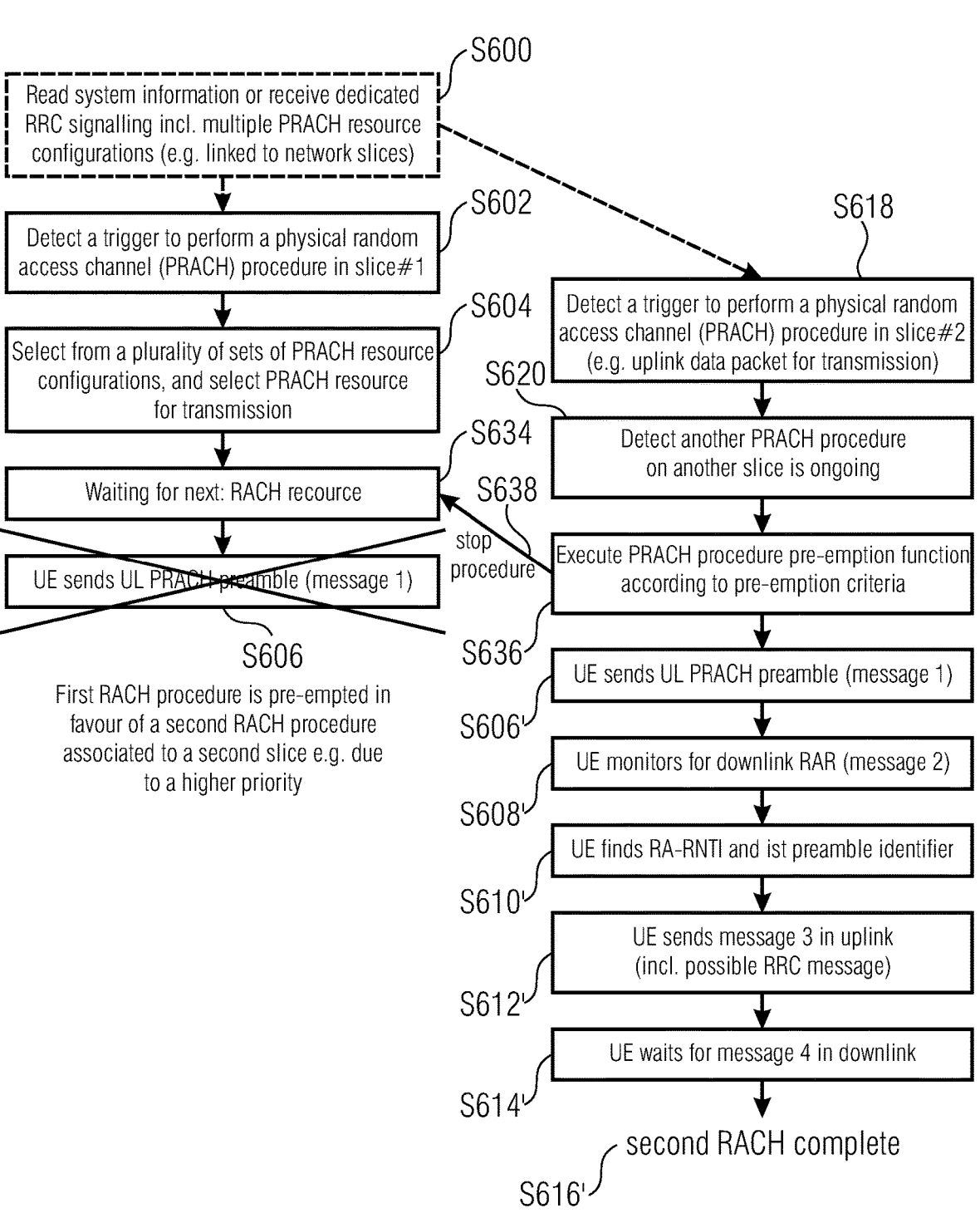
FIG. 23 illustrates an embodiment for the preemption of a RACH procedure.

FIG. 23 illustrates an embodiment for the preemption of a RACH procedure. In FIG. 23, a situation similar to the situations described above with reference to FIG. 18 to FIG. 22 is assumed, namely that a UE, like UE 500 in FIG. 18 is configured or preconfigured with the slice-specific RACH resource configurations as is indicated at S600. At S602, the UE detects a trigger X1 to perform a RACH procedure in slice #1 and selects, at S604, from the slice #1 RACH resource configuration the resources to be used for sending the preamble message 1. Once the resource is selected from the slice #1 RACH resource configuration, the UE waits until the selected RACH resource becomes available, as is indicated at S634. In the embodiment of FIG. 23 it is assumed that, while the UE is waiting at S634 for the RACH resource to be used for sending the preamble message for the first RACH procedure, a trigger X2 to perform a second RACH procedure in slice #2 is detected as is indicated at S618, and at S620 it is further detected that the first RACH procedure is ongoing, i.e., is not yet terminated or completed. In accordance with the present embodiment, following the detection of the ongoing first RACH procedure at S620, the UE, at S636 executes a RACH procedure preemption function according to one or more preemption criteria which causes the UE to stop the first RACH procedure, as is indicated at S638. Thus, the step S604 of the first RACH procedure, namely sending the preamble message 1 on the selected RACH resource is not executed. For example, the first RACH procedure may be preempted in favor of the second RACH procedure associated with a second slice due to the second slice having a higher priority than the first slice or an event in the second slice having a higher priority than the event in the first slice that triggered the first RACH procedure. Following the execution of the preemption function at S636, the UE starts performing the RACH procedure for the second slice as is indicated by step S606' to S616' in accordance with which the respective messages are transmitted as described above with reference to FIG. 20 for the first RACH procedure.

Embodiments implementing a preemption of RACH procedures cause a stopping or aborting of a first, ongoing RACH procedure in favor of a second RACH procedure. When considering, for example, radio efficiency, UE power consumption and a user service perspective, such a preemption may not be favored, at least from the perspective of the first network slice. For example, the transmission of certain uplink signals may already have completed and the procedure may need to be restarted after the second procedure is completed. This may only come at the cost of additional transmit power. Also, latency requirements for the first procedure may no longer be met when aborting the first procedure and restarting it only once the second procedure is completed. The more advanced the first RACH procedure is, the higher the costs are for aborting or ending the first RACH procedure in favor of the second RACH procedure are. In an extreme situation, the first RACH procedure may even be close to completion when being aborted.

To address these issues, in accordance with further embodiments of the preemption of RACH resources, an ongoing RACH procedure may only be aborted to a certain stage, and once this stage or step is reached, the first RACH procedure proceeds to completion, while the second RACH procedure may run in parallel or may be suspended by a certain time, for example, in a way as described above this reference to FIG. 20 to FIG. 22. For example, once the UE sent the RACH preamble in message 1 or received the RAR message 2 with an uplink grant for transmission, or once it transmitted message 3, the first ongoing RACH procedure is not stopped anymore.

As mentioned above, at S636 in FIG. 23, the UE may execute the preemption function according to one or more preemption criteria, and which of the two RACH procedures illustrated in FIG. 23 is to be completed and which one is to be preempted may be defined in different ways according to one or more of the following preemption criteria:

The preemption criteria may include one or more parameters configured by the gNB in the RRC slice-specific RACH resource configuration, for example an assignment of relative RACH priority or an association of the configuration to a relative slice priority, to a QoS flow priority or to a logical channel priority, so that a RACH procedure associated with a higher priority may preempt a RACH procedure associated with a lower priority.

The preemption criteria may include one or more specific events that triggered the RACH procedure, for example a PDCCH order, a handover, a conditional handover, an RRC re-establishment, so that a RACH procedure associated with a PDCCH order may preempt a RACH procedure associated with a handover event, a conditional handover event, or an RRC re-establishment event.

In case of an uplink data transmission triggered RACH procedure, when there is no scheduling request via PUCCH configured, the preemption criteria may include a type of packet pending for transmission, for example to which logical channel or QoS flow or to which PDN session or to which slice identity the packet belongs to.

In case of an uplink data transmission, the preemption criteria may include one or more QoS attributes, such as a priority, a latency or a reliability of the logical channel or data flow the packet belongs to, so that the RACH procedure with a higher priority may preempt the lower priority RACH procedure, or the RACH procedure with a low latency and high reliability may supersede the RACH procedure for a packet that is not delay critical.

The preemption criteria may prioritize an RRC control plane message transmitted over a Signaling Radio Bearer, SRB, over a user plane packet over a Data Radio Bearer, DRB. For example, a gNB triggered RACH procedure, like a PDCCH order, may be of different priority than a UE triggered RACH procedure.

The preemption criteria may include the entity that triggered the RACH procedure, namely whether it is self-triggered by the UE, triggered by the gNB or triggered by another UE via the sidelink, for example, by a group leader UE, a roadside unit, RSU, or the like.

Modify an Ongoing RACH Procedure

In accordance with embodiments, to modify the ongoing RACH procedure, the UE may modify a certain message transmitted by the UE during the ongoing RACH procedure by including into the certain message, in addition to an indication of the first slice, an indication of the second slice so as to allow a base station to provide in response to the certain message parameters for a configuration of the first and second slices. The UE may alter the content of Msg3 if not already transmitted to the gNB. The Msg3 content may contain a MAC CE, which informs the gNB about the additional slice, e.g. slice #2, that triggered a RACH procedure, thus that the gNB may decide to alter its Msg4 using a different C-RNTI for the UE to be used for communication for slice #2. Furthermore, the Msg4 may also contain a list of C-RNTIs to be used for each particular communication for the slice, e.g. [C-RNTI #slice #1, CRNTI #slice #2, etc.]. If the UE already has a C-RNTI for slice #1, the gNB may provide a C-RNTI in Msg4 only for the missing C-RNTIs. Thus, the certain message may be Msg3 that is modified to contain a different C-RNTI MAC or a different CCCH SDU which contains information for the first slice and the second slice. For example, in the four-step RACH procedure described above with reference to FIG. 12(*a*) Msg3 may be allowed to carry data in order to reduce the latency and overhead. This data may also be for slice 2, although the UE reconnected to the network via slice 1. In general, the parameters for a configuration of the first and second slices may be any type of RRC message, including a RRC configuration or reconfiguration or RRC parameters.

In accordance with other embodiments, to modify the ongoing RACH procedure to start the additional RACH procedure, the UE is to modify a certain message, e.g. Msg3 as described above, transmitted by the UE during the ongoing RACH procedure by replacing an indication of the first slice with an indication of the second slice so as to allow a base station to provide in response to the certain message parameters for a configuration of the second slice. Thus, other than in the preceding embodiment modifying the RACH message by adding information for the second slice, in this embodiment, the information for the first slice is removed and replaced by information for the second slice so that the base station provides only parameters for a configuration of the second slice.

Allowing Two or More RACH Procedures from Different Slices to be Performed at Least Partially in Parallel In accordance with the above-described embodiments of the second aspect of the present invention, except for the first embodiment described with reference to FIG. 20 in which a second RACH procedure is aborted, the UE may allow that two or more RACH procedures are performed at the same time in an overlapping manner. Whether or not parallel ongoing RACH procedures are supported and may be executed depends on the UE's implementation and capabilities. There may be different types of UE's, some supporting parallel reception and/or parallel transmission, while other UEs may not support such functionality.

Figure 24:
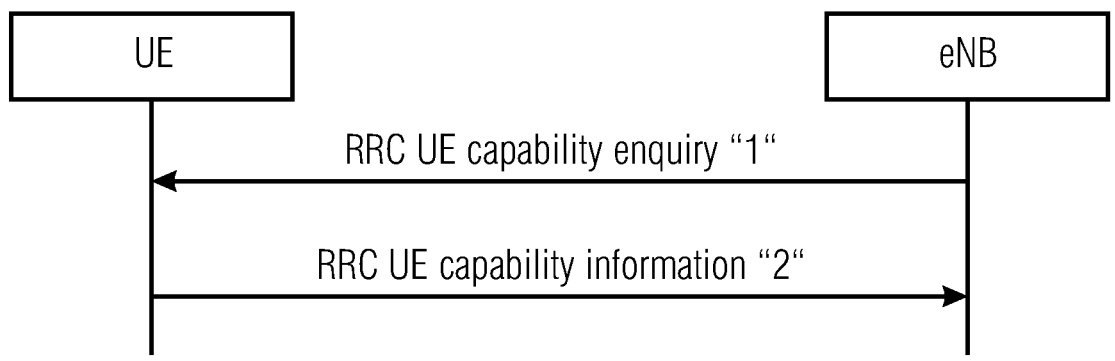
FIG. 24 illustrates an embodiment for signaling UE capabilities indicating the UE's capability to perform RACH procedures in parallel.

Therefore, in accordance with embodiments of the second aspect of the present invention, a UE, like UE 500 in FIG. 18 is provided which is configured or pre-configured to support two or more parallel ongoing RACH procedures, each ongoing RACH procedure being associated with a different slice of the network, for example slice #1 and slice #2 in FIG. 18. For example, the UE may be permitted to perform two or more PRACH procedures for different slices, if the slices use different BWPs or operate on different carrier frequencies with a frequency gap of delta x between a first radio frequency, e.g. operating on FR1, and a second radio frequency, e.g. operating on FR2. The UE 500 may indicate its capability of allowing parallel ongoing RACH procedures as a UE capability in the specification. The UE may report its capabilities to the gNB so that the network knows that the UE is capable to execute two or more RACH procedures at the same time, either in parallel or in an overlapping manner. FIG. 24 illustrates an embodiment for signaling the UE capabilities. A base station may send an RRC UE capability inquiry "1" to a UE which responds with its capabilities provided in the RRC UE capability information message "2" transmitted to the base station. For example, if the UE registers for the first time to the network, the gNB may inquire the UE by sending the above-described message "1" so as to cause the UE to send its capability in the RRC UE capability inquiry message "2". The RRC signaling, which is send via a Signaling Radio Bearer, is received, decoded and processed by the UE. The UE then replies to the inquiry "1" by sending the RRC UE capability information message "2" to the gNB. This message may contain slice-specific procedure related information, for example that the UE supports multiple RACH configurations, supports a RACH resource configuration selection function as described above with reference to the first aspect of the present invention, and/or that the UE supports parallel ongoing RACH procedures. The capability may concern the capability of the overall RACH procedure, the receiving part, for example the ability to receive random-access response messages in parallel, or the transmission part, for example the ability to transmit RACH preambles in parallel, the whole RACH procedure or only a part of the RACH procedure.

In accordance with further embodiments, in a wireless communication system or network some or all of the UEs may support parallel ongoing RACH procedures. In such a scenario, the gNB may configure adaptively whether parallel ongoing RACH procedures are enabled or disabled. In accordance with embodiments, enabling a RACH procedure may be desirable in order to reduce the latency for RACH procedures, for example in case slices with latency critical services are supported. Disabling, on the other hand, may be advantageous for slices supporting mission critical communication so that, for example, in case the ongoing RACH procedure is associated with a mission critical communication slice, it is not to be preempted by another RACH procedure or aborted, and in case the second procedure is from a slice supporting mission critical communication, the ongoing RACH procedure from another slice may be aborted so as to immediately allow performing the mission critical communication RACH procedure. Allowing parallel RACH procedures may be a compromise when it comes to the reliability of the RACH procedure. As mentioned above, when performing parallel RACH procedures, the overall transmit power may need to be split during parallel uplink transmissions. For example, for UEs being close to the cell center and not transmitting with the full power, such a parallel performance of ongoing RACH procedures may be allowed, while it may be not allowed/disabled, for a UE being close to the cell edge.

In accordance with embodiments, the enabling/disabling of the parallel ongoing RACH procedures may be signaled on a cell basis using RRC system information or on a UE specific basis by sending an RRC reconfiguration message to the UE. An information element for enabling/disabling the parallel RACH procedures may, for example, be added to the RRC rach-ConfigCommon or a rach-ConfigDedicated Radio Resource Control Information Elements.

In accordance with further embodiments of the second aspect of the present invention, the UE 500 may perform up to N parallel RACH procedures of a plurality, i.e., two or more, slice-specific RACH resource configurations, wherein the RACH procedures may be associated with certain priorities or preemption criteria. In other words, for every ongoing RACH procedure, the UE may store the selected slice-specific RACH resource configuration, the RACH physical resource selected from the slice-specific RACH resource configuration together with the related RA-RNTI, the preamble identity and the other related transmission parameters such as transmit power, number of RACH attempts and the like.

53
54

Third Aspect

Embodiments of the third aspect of the present invention are now described.

UE

In accordance with the third aspect, the present invention provides a user device, UE, for a wireless communication network, wherein the UE is connectable to two or more of a plurality of network slices of the wireless communication network, wherein a slice specific random access channel, RACH, configuration is associated with one or more of the plurality of slices, wherein the UE is connected, e.g., RRC connected, to a base station of the wireless communication network, the UE connected to the base station responsive to a first RACH event associated with a first slice by performing a first RACH procedure using the slice specific RACH resource configuration associated with the first slice, wherein, responsive to a second event associated with a second slice and causing a second RACH procedure, the UE is to skip the second RACH procedure using the slice specific RACH resource configuration associated with the second slice.

In accordance with embodiments of the third aspect, a RACH procedure performed on the first slice or on the second slice is followed by an RRC Connection Setup procedure, in case the UE was in RRC IDLE state, prior performing the RACH procedure, or an RRC Connection Resume procedure, in case the UE was in RRC INACTIVE state, prior performing the RACH procedure.

In accordance with embodiments of the third aspect, the second event associated with a second slice and causing a second RACH procedure comprises of one or more of:

a RACH event, an RRC connections setup, an RRC connection resume.

In accordance with embodiments of the third aspect, the UE is to employ one or more connection parameters obtained by the first RACH and/or RRC Connection Setup procedure for the second slice, wherein the one or more connection parameters may comprise one or more of:

the timing advance, power control, e.g., the transmit power, the synchronization state of the UE, the connection state of the UE, the cell specific identity e.g. C-RNTI, the Discontinuous Reception, DRX, state, e.g., no DRX, short DRX or long DRX, the radio link control state information, e.g., Radio Link Failure, RLF, measurements and declaration, the RRC connection state of the UE, the beam ID, MIMO mode, the MCS, channel state information, e.g., CSI, CQI, PMI, RI, neighboring cell measurements, a handover, HO, configuration or a conditional HO configuration, sidelink measurements, e.g., a channel busy ratio, CBR, or a congestion ratio, CR, on the sidelink.

In accordance with embodiments of the third aspect, the UE is to update the one or more connection parameters for the second slice via the first slice.

In accordance with embodiments of the third aspect, in case the UE is transitioning from an RRC_INACTIVE state to an RRC_CONNECTED state on the first slice prior to the second event associated with the second slice, the UE is to send an RRC connection resume request for the second slice.

In accordance with embodiments of the third aspect, the UE is to maintain the uplink synchronization with the base station using the first slice, e.g., by using regular Timing Advance commands send by MAC Control Elements received from the base station on the first slice.

In accordance with embodiments of the third aspect, the UE is to monitor a downlink radio link with the base station using the first slice, e.g., monitoring a downlink signal quality received from a signal send by the base station on the first slice.

In accordance with embodiments of the third aspect, the UE is to maintain a DRX state with the base station using the first slice, e.g., by using regular DRX commands send by MAC Control Elements from the base station on the first slice based on regular uplink measurements by the base station.

In accordance with embodiments of the third aspect, the UE is to inform the second slice in case the synchronization or the radio link to the base station is lost in the connected state.

In accordance with embodiments of the third aspect, the UE is to apply the DRX state as maintained by the first slice in the second slice, e.g., by using slice specific information exchanged between the first and second slices directly at the MAC layer or via the common RRC layer.

In accordance with embodiments of the third aspect, the UE is to apply the uplink timing advance and or power control as maintained by the first slice for uplink transmissions in the second slice, e.g., by using slice specific information exchanged between the first and second slices directly at the MAC layer or via the common RRC layer.

In accordance with embodiments of the third aspect, the UE is configured or preconfigured with a common control search space, like a common PDCCH search space, for the first and second slices, and separate resource sets, like separate BWPs, for each of the first and second slices so that the UE is capable to receive data on the first and second slices without performing a RACH procedure for the one or more second slices.

In accordance with embodiments of the third aspect, responsive to completing the RACH procedure on the first slice and to becoming RRC connected, the UE is to receive one or more reconfiguration messages, the one or more RRC reconfiguration messages configuring the UE with slice specific uplink control resources, like the PUCCH, for a scheduling request on the first and the one or more second slices.

In accordance with embodiments of the third aspect, the one or more RRC reconfiguration messages comprise separate RRC messages per slice or a single reconfiguration message for two or more slices or a combination of both.

In accordance with embodiments of the third aspect, responsive to an event in a slice that triggered the uplink scheduling request, the UE is to select the uplink control resource of the respective slice to request uplink resources from the base station, e.g., by performing an Uplink Control Resource Selection Function or PUCCH Selection Function, receive a downlink control signaling on a search space associated with the respective slice, the downlink control signaling including an uplink resource allocation for the respective slice by the base station, and

use slice specific radio resources in the received uplink resource allocation to transmit a user or control data packet associated with the respective slice.

In accordance with embodiments of the third aspect, responsive to completing the RACH procedure on the first slice and to becoming RRC connected, for requesting downlink or uplink resources for the second slice the UE is to
send a scheduling request, SR, to the base station, wherein the SR
is a SR for the first slice piggybacked with a SR for the second slice, or
includes information allowing the base station to identify the second slice.

In accordance with embodiments of the third aspect, responsive to the SR, the UE is to receive from the base station one or more of:
a DL or UL grant for user or control data associated with the second slice,
a denial of resources for the second slice,
a notification to the UE to PRACH the first or second slice onto a different BWP, e.g. FR2,
a notification that the gNB supports the second slice only, and drops the first slice.

In accordance with embodiments of the third aspect, responsive to events in two or more slices that triggered respective uplink scheduling requests at the same time or within a certain time window, the UE is to prioritize or pre-empt the scheduling requests, wherein the pre-emptions may consider an association of the uplink data with the slices and the events that triggered the uplink data transmission.

In accordance with embodiments of the third aspect, the user device comprises one or more of the following: a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

System

In accordance with the third aspect, the present invention provides a wireless communication system, comprising one or more of the inventive user devices, UEs, and/or one or more of the inventive base stations, BSs.

Method

In accordance with the third aspect, the present invention provides a method for operating a user device, UE, for a wireless communication network, wherein the UE is connectable to two or more of a plurality of network slices of the wireless communication network, wherein a slice specific random access channel, RACH, configuration is associated with one or more of the plurality of slices, and wherein the UE is connected, e.g., RRC connected, to a base station of the wireless communication network, the UE connected to the base station responsive to a first RACH event associated with a first slice by performing a first RACH procedure using the slice specific RACH resource configuration associated with the first slice, the method comprising:
responsive to a second event associated with a second slice and causing a second RACH procedure, skipping the second RACH procedure using the slice specific RACH resource configuration associated with the second slice.

Figure 25:
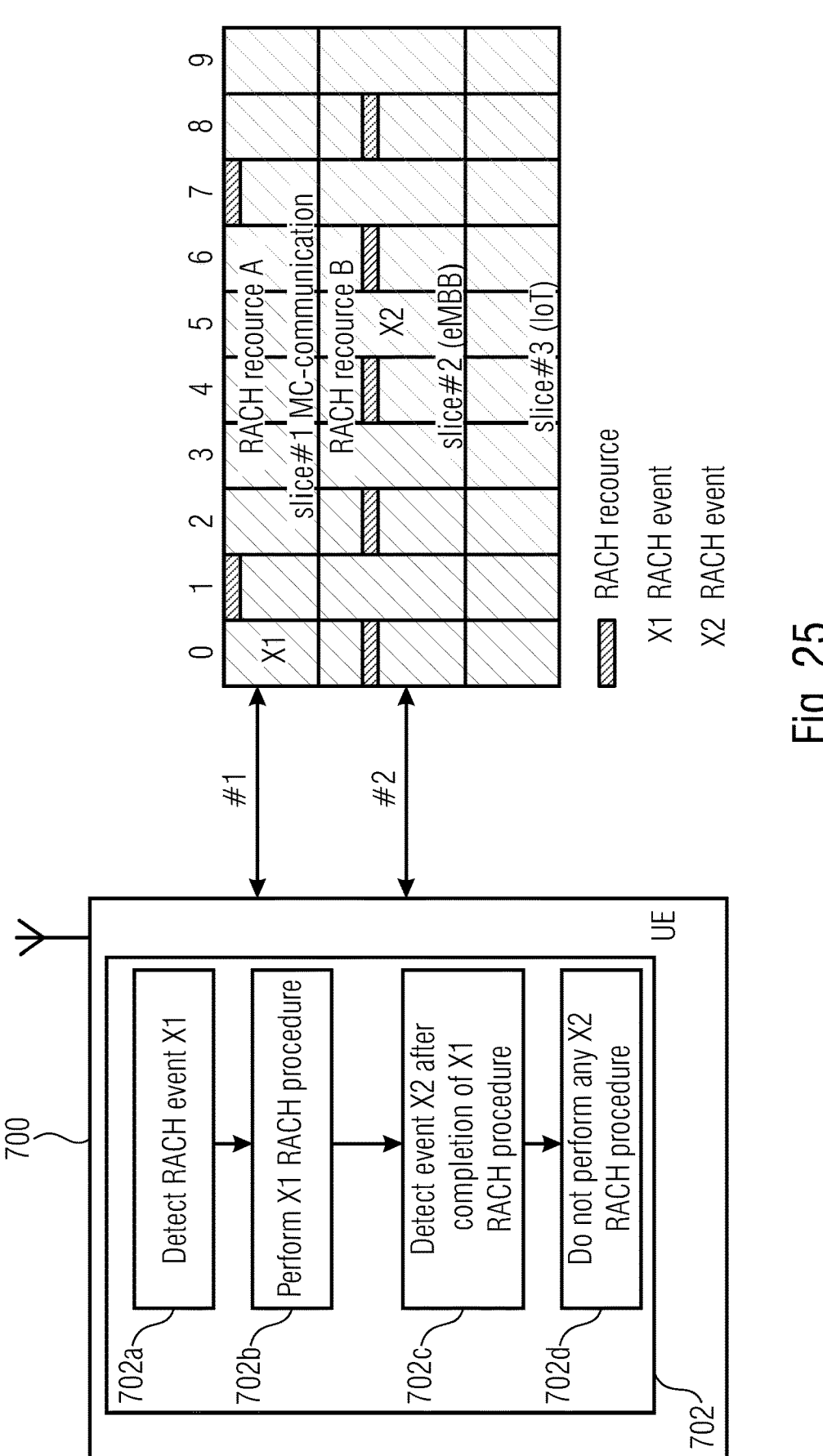
FIG. 25 illustrates an embodiment of the third aspect of the present invention allowing a UE connectable to two or more slices to not perform additional RACH procedures once the UE is connected to a base station responsive to an initial RACH procedure.
Figure 26:
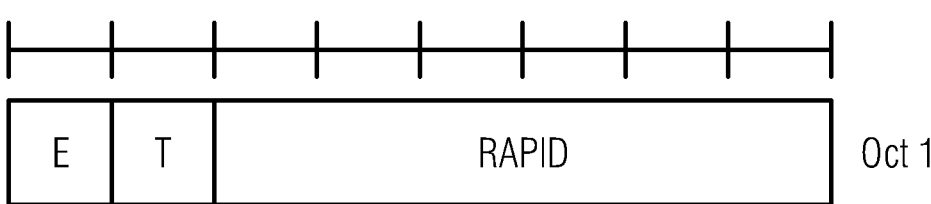
FIG. 26 illustrates a conventional MAC header of a MAC RAR message modified to identify the uplink slice-specific RACH resource configuration that was used by a UE.

FIG. 25 illustrates an embodiment of a UE 700 connectable to two or more of a plurality of network slices of a wireless communication network. A slice-specific RACH resource configuration is associated with one or more of the plurality of slices. In the embodiment depicted in FIG. 25, the UE 700 is assumed to be connected to a network as described above with reference to FIG. 4, FIG. 6 and FIG. 18. The configuration of the network depicted in FIG. 25 is as described above, and UE 700 is connected to two slices in parallel or simultaneously, namely to slice #1 and to slice #2. The UE may include a processor 702 which, responsive to a first RACH event X1, that the UE may detect, as is indicated at 702a, performs a X1 RACH procedure as is indicated at 702b. It is assumed that the X1 RACH procedure is completed so that the UE 700, responsive to the first RACH procedure is RRC connected to a base station and is also uplink synchronized. At a later time, for example in subframe 5, a second RACH event X2 occurs after completion of the X1 RACH procedure.

This second RACH event X2 is detected by the UE 700, as is indicated at 700c, and in accordance with the third aspect of the present invention, the UE 700, since it is already uplink synchronized and RRC connected with the base station, does not perform any X2 RACH procedure, as is indicated at 702d. In other words, after completion of the first RACH procedure, responsive to a second RACH event associated with a second slice, the UE does not perform or does skip a second RACH procedure using the slice-specific RACH resource configuration associated with the second slice.

In the embodiment of FIG. 25, the UE is connected to two slices, however, the present invention is not limited to such embodiments, and the UE may be connected to more than two slices in parallel. In such embodiments, the UE having completed a RACH procedure for one slice, the first slice, will skip one or more RACH procedures for any of the other slices, the one or more second slices, to which the UE is connected as well.

Thus, in accordance with embodiments of the third aspect of the present invention, the UE may be kept connected by one of the slices, while data may be transmitted and received by all other slices the UE is connected to. In other words, the is only a single RRC state across all slices to which the UE is connected. On the UE and gNB side, since there is a single RRC state across all slices, it is known to all slices that the UE moved into the RRC connected state and is uplink synchronized. Based on the UE identity and a stored UE context information at the RRC layer, the gNB knows to which slices the UE is actually registered to or connected to. The first slice, where the UE performed the first RACH procedure may be referred to as a primary slice.

In accordance with embodiments, the RACH procedure performed on the first slice may be followed by a RRC Connection Setup procedure, in case the UE was in RRC IDLE state, prior performing the RACH procedure, or RRC Connection Resume procedure, in case the UE was in RRC INACTIVE state, prior performing the RACH procedure.

In accordance with embodiments, the second event associated with a second slice and causing a second RACH procedure may comprise of one or more of RACH event, an RRC connections setup, and an RRC connection resume.

In accordance with embodiments, UE may to employ for the second slice one or more connection parameters obtained by the first RACH and/or RRC Connection Setup procedure. The one or more connection parameters may comprise one or more of:

the timing advance, TA, power control, e.g., the transmit power, the synchronization state of the UE, the connection state of the UE, the cell specific identity e.g. C-RNTI, the Discontinuous Reception, DRX, state, e.g., no DRX, short DRX or long DRX, the radio link control state information, e.g., Radio Link Failure, RLF, measurements and declaration, the RRC connection state of the UE, the beam ID, MIMO mode, the MCS, channel state information, e.g., CSI, CQI, PMI, RI, neighboring cell measurements, a handover, HO, configuration or a conditional HO configuration, sidelink measurements, e.g., a channel busy ratio, CBR, or a congestion ratio, CR, on the sidelink.

In accordance with embodiments, the UE updates the one or more connection parameters for the second slice via the first slice.

In accordance with embodiments, the UE, when transitioning from RRC_INACTIVE state to RRC_CONNECTED state on the first slice prior to the event associated with the second slice, sends an RRC connection resume request for the second slice. In other words, the event of the second slice is treated as if the second slice was also coming from INACTIVE, and not from IDLE state. This is advantageous as it saves RRC signaling.

In accordance with embodiments, the primary slice may be responsible for monitoring a downlink radio link with the base station using the first slice, e.g., monitoring a downlink signal quality received from a signal send by the base station on the first slice. In the 5G QoS framework for traffic initiated by the UE, the UE maps UL packets to QoS flows which are then mapped to the resources of the access network, AN. If the UE sees stable resources on a first slice, it may inform an application to trigger a "PRACH" for a service which needs this kind of QoS. On the other hand, the UE may keep the status, and once such a flow is triggered, it allows this "PRACH" to proceed only if the QoS flow may be supported, e.g., when the AN resources are good enough or have been good enough for a certain time period depending on a threshold. "PRACH" as used above means that the UE does not really perform the PRACH but uses the communication channel established by the PRACH on the first slice for the second slice.

In accordance with embodiments, the primary slice may be responsible for maintaining a DRX state with the base station using the first slice, e.g., by using regular DRX commands send by MAC Control Elements from the base station on the first slice based on regular uplink measurements by the base station. For example, the UE may apply the DRX state as maintained by the first slice for a DRX state in the second slice, e.g., by using slice specific information exchanged between the first and second slices directly at the MAC layer or via the common RRC layer.

In accordance with embodiments, the primary slice may be responsible for maintaining the uplink synchronization. The uplink synchronization may be maintained by sending regularly, like at fixed times or time intervals, timing advance commands from the base station to the UE, which may be based on uplink measurements at the gNB. The primary slice may configure frequent uplink transmissions of the UE so as to allow the gNB to perform the uplink measurements and, responsive thereto, send the timing advance commands, for example by MAC control elements. This, for example, may be employed in case data transmissions occur at the UE on a regular basis, like at intervals not extending beyond a certain threshold or the like. In case there are no such regular data transmissions, or a UE does not send data for a certain period of time, the UE may send sounding reference symbols, SRS, that may be configured by the gNB. Based on the SRS transmitted by the UE, the gNB may measure the uplink timing of the UE. In case the uplink synchronization is lost, while the UE is in RRC connected state, in accordance with embodiments, the primary slice also informs the other slices about the loss of synchronization.

In accordance with embodiments of the third aspect of the present invention, the one or more additional slices, also referred to as secondary slices, are aware of the uplink timing advance obtained when performing the RACH procedure on the primary slice. The secondary slices apply the uplink timing advance as maintained by the primary slice. In case slice-specific MAC entities are provided, the information about the timing advance may be exchanged between the MAC entities of the primary and secondary slices directly, or via a common RRC layer. Since the timing advance is maintained by one slice, the primary slice, any overhead across all slices for maintaining the timing advance is reduced. For example, uplink timing advance loops may be performed only on the primary slice and do not have to be performed in each slice independently.

In accordance with further embodiments, the UE may be configured or preconfigured with a common control search space, like a common PDDCH search space, and a dedicated data search space, like a dedicated bandwidth part, BWP, for each slice so that the data search spaces use isolated resources for the respective slices. The configuration may be via system information or via dedicated RRC signaling. In accordance with such embodiments, once the primary slice, by means of an RRC procedure, connected the UE to the base station and provided for the uplink synchronization, the gNB may signal, via the common PDDCH search space, to any of the slices a downlink transmission of data and send the data in the data space which is known at the UE for any slice.

Uplink Control Resource Configuration Selection Function

In accordance with further embodiments of the third aspect of the present invention, provide an uplink control resource configuration selection function. As soon as the UE completed the RACH procedure on the primary slice, the UE becomes RRC connected and starts monitoring a control search space of the primary slice, and, if configured or preconfigured also a control search space of the one or more secondary slices. The control search space may be a BWP, a CORESET or a PDDCH search space.

Responsive to the information that the UE moved to the RRC connected state, the RRC layer may configure uplink control resources, for example the PUCCH, for a scheduling request on the one or more secondary slices, unless this has also been configured or preconfigured before. In other words, the UE may receive, for example, from the base station, one or more reconfiguration messages for configuring the uplink control resources for the slices to allow the respective slices to send a scheduling request for resources for an uplink transmission to the base station. The RRC reconfiguration message may be dedicated per slice on separate RRC messages, or may be a single reconfiguration message for all slices. Once configured, the UE has uplink control resources to send a scheduling request for the first or primary slice as well as for the one or more additional or secondary slices. Thus, a plurality of slice-specific uplink control resources for sending a slice-specific scheduling request are configured by the gNB, and the UE, once a packet needs to be transmitted in the uplink, may perform an uplink control resource selection function, also referred to as the PUCCH selection function, which may by located within the UE transceiver.

At the UE side, dependent on the event that triggered the uplink scheduling request, the UE selects the uplink control resource for the respective slice to request uplink resources from the gNB. The process is basically the same as the process or mechanism as for the RACH resource configuration selection function described above with reference to the first aspect of the present invention, except that responsive to the RACH trigger, the appropriate slice-specific uplink control resource for the slice, from which the trigger originated, is selected.

Upon receiving the uplink scheduling request at the gNB, the gNB is aware for which slice the UE is requesting resources for uplink data based on the uplink control resource or the specific PUCCH channel selected by the UE. Based on this association, the gNB responds with an uplink resource allocation for the respective slice by transmitting a downlink control signaling, like the PDCCH, on the common control search space or on control search space associated with a respective slice. Responsive to receiving the uplink resource allocation, the UE uses the slice-specific radio resources and transmits the data packet associated with a slice.

In accordance with this embodiment of the third aspect of the present invention, the UE does not need to execute a slice-specific RACH resource configuration selection function since the RACH procedure was already executed beforehand, for example, on the primary slice, and the UE is already RRC connected. Instead, the UE, now having configured multiple uplink control resources for uplink scheduling requests, may execute a slice-specific PUCCH resource configuration selection function so as to obtain the PUCCH resources for the uplink scheduling request associated with a certain slice. The control packet or the data packet may be associated with a slice from which it originated in a way as described above with reference to the first aspect of the present invention, e.g., by a slice identity.

In accordance with embodiments, the uplink control resource selection function may be needed only in case of a pending uplink data transmission and in case the UE is already RRC connected. When the UE moves from an RRC connected state to an RRC inactive state or to an RRC idle state, a pending uplink data transmission on any of the slices needs a RACH procedure for reconnecting the UE to the network or to the base station. Thus, in accordance with embodiments, the slice-specific RACH resource configuration selection function may be executed when the UE reconnects from the RRC idle state or the RRC inactive state to the RRC connected state and in case the network supports slice-specific RACH resource configurations. The PUCCH uplink control resource selection function, on the other hand, may be executed when the UE is in the RRC connected state and is configured, as described above, with the plurality of slice-specific uplink control resources for uplink scheduling requests on the respective slices, and in case there is no other ongoing data on the slice to send a buffer status report on the slice.

In accordance with yet other embodiments concerning the request for resources, responsive to completing the RACH procedure on the first slice and becoming RRC connected, the UE requests downlink or uplink resources for the second slice the UE by sending a scheduling request, SR, to the base station. The SR may be a SR for the first slice piggybacked with a SR for the second slice, or it may include information allowing the base station to identify the second slice. Responsive to the SR, the UE may receive from the base station one or more of:

receive from the base station a DL or UL grant for user or control data associated with the second slice, a denial of resources for the second slice, a notification to the UE to PRACH the first or second slice onto a different BWP, e.g. FR2, a notification that the gNB supports the second slice only, and drops the first slice.

Prioritization/Pre-Emption of Scheduling Request

In accordance with further embodiments of the third aspect of the present invention, the scheduling requests on the slice-specific PUCCH uplink control resources may be prioritized or preempted. In case of multiple slice-specific scheduling requests being configured and multiple uplink data packets arriving at the same time or within a certain time window, a prioritization or preemption of scheduling requests on the PUCCH may be performed, for example in a way similar as the above-described prioritization/preemption of RACH procedures in accordance with a second aspect of the present invention. The preemptions may consider the association of the uplink data to slices in the events that triggered the uplink data transmission, i.e., the same preemption criteria as described above with regard to the second aspect of the present invention may be employed.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

Monitoring Multiple Random-Access Response, RAR, Messages

In the above-described embodiments of the second aspect of the present invention, the UE, for any of the RACH procedures being performed, monitors the RAR message. In case of performing RACH procedures in parallel, for example in such a way that the parallel transmission of multiple PRACH preambles, message 1, is forbidden or time shifted, the UE is allowed to monitor multiple random-access response, RAR, messages in the downlink, message 2, corresponding to the plurality of RACH resource configurations. The RAR response message may be provided on a commonly configured downlink resource or it may be provided on a separately configured downlink resource, like a slice-specific downlink resource.

Further Embodiments

The following embodiments may be used for all aspects of the present invention described herein.

In accordance with embodiments regarding the monitoring of multiple random-access response messages, a common search space or a bandwidth part, BWP, that is common for all slices may be used. In case a downlink resource isolation among respective slices is not a strict requirement, a common downlink resource may be configured for the UE to receive the RAR messages. This is advantageous as it is more radio efficient since resources are multiplexed, less complex and more power efficient for the UE since only one downlink resource needs to be monitored. In accordance with embodiments, the common search space may be a bandwidth part, and the UE may have only one common or default bandwidth part, BWP, and within the BWP, a control resource set, COREST, for a common PDCCH search space may be configured. The UE continuously monitors the same common search space to receive the RAR message. The UE may also receive paging messages for all slices on the same common search space. In accordance with this embodiment, the different RAR messages corresponding to different slice-specific RACH resource configurations may be differentiated, for example, by splitting the RACH resources and RA-RNTIs, or by splitting the preamble identities, or by adding additional RA-RNTIs or preamble identities, or by introducing a slice-specific RACH resource configuration index or a slice resource index to be sent in a downlink.

In accordance with an embodiment, the above-mentioned additional information for differentiating the RAR messages may be signaled as part of the MAC PDU for the random-access response, MAC RAR. The MAC RAR is described in reference [6]. The UE may transmit a RACH on any of the configured slice-specific RACH resource configurations. The RACH resource configuration selection function selects the respective resource. Besides the regular RA-RNTI corresponding to the RACH resource and besides the regular random-access preamble identity, RAPID, the UE may store the new RACH resource configuration index or any other index associated with the specific slice. After the uplink transmission of the message 1, the UE monitors the PDCCH common control resource using the specific RA-RNTI corresponding to a specific resource RACH. The UE decodes the packet and looks for the stored RAPID in the MAC header.

Figure 27:
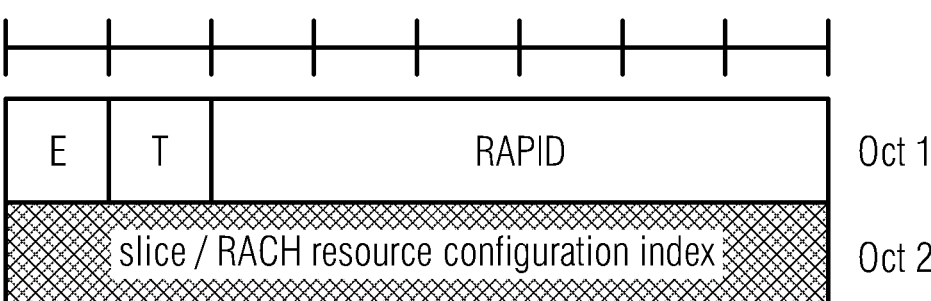
FIG. 27 illustrates a conventional MAC header of FIG. 25 extended to identify the uplink slice-specific RACH resource configuration that was used by a UE.

FIG. 27 illustrates a conventional MAC header including the extension field E which is a flag indicating if more fields are present in the MAC header or not. The E field is set to "1" to indicate that there is at least another field, like field T and field RAPID in FIG. 27. The type field T is a flag indicating whether the MAC sub header contains a random-access ID or a backoff indicator, and the T field is set of 0 to indicate the presence of a backoff indicator field in the subheader, and is set to "1" to indicate the present of a random-access preamble ID field in the subheader, namely the RAPID field. The RAPID, the random-access preamble identifier field, identifies the transmitted random-access preamble, and the size may be 6 bits.

In accordance with other embodiments, the MAC header of FIG. 27 may be extended as illustrated in FIG. 27, to identify the uplink slice-specific RACH resource configuration that was used by the UE. For example, a second octet, 8 bits, may be added to uniquely identify the RACH resource configuration of the uplink. The first octet corresponds to the header structure of FIG. 27 which is extended by the second octet as mentioned above. The UE may compare the slice/RACH resource configuration index with a stored slice/RACH resource configuration index from the uplink transmission, and if the index is the same, the UE proceeds with reading the MAC RAR message.

Figure 28:
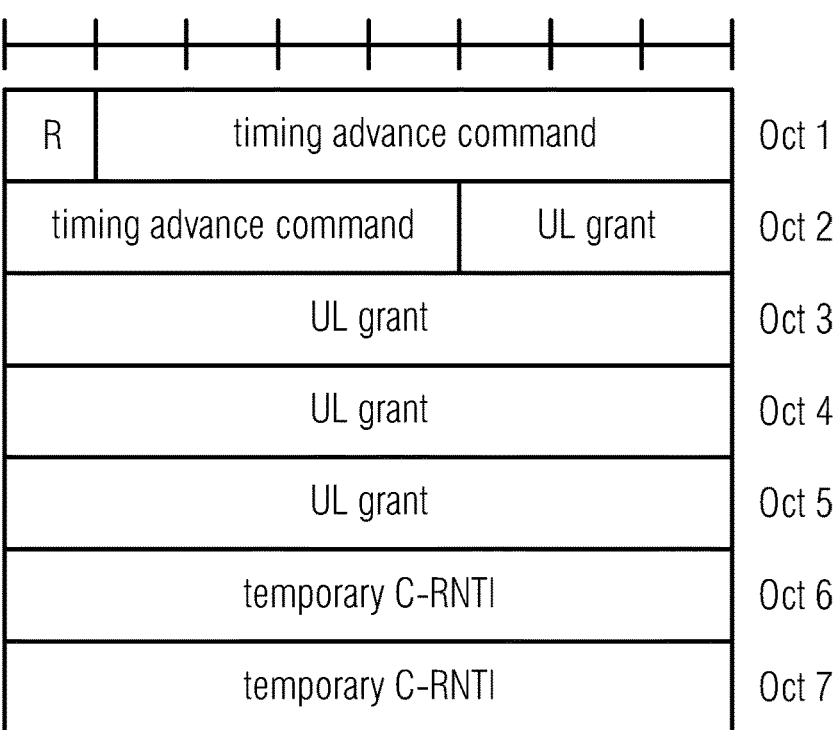
FIG. 28 illustrates a conventional MAC RAR message modified to identify the uplink slice-specific RACH resource configuration that was used by a UE.

In accordance with other embodiments, the slice/RACH resource configuration index may also be added to the MAC RAR message, in a conventional MAC RAR message as illustrated in FIG. 28. The conventional RAR message includes seven octets, the first including the reserved field R and the timing advance command, which also extends to the second octet. The second part of the second octet to the fifth octet include uplink grant information, and the sixth and seventh octets include the temporary C-RNTI to be used.

Figure 29:
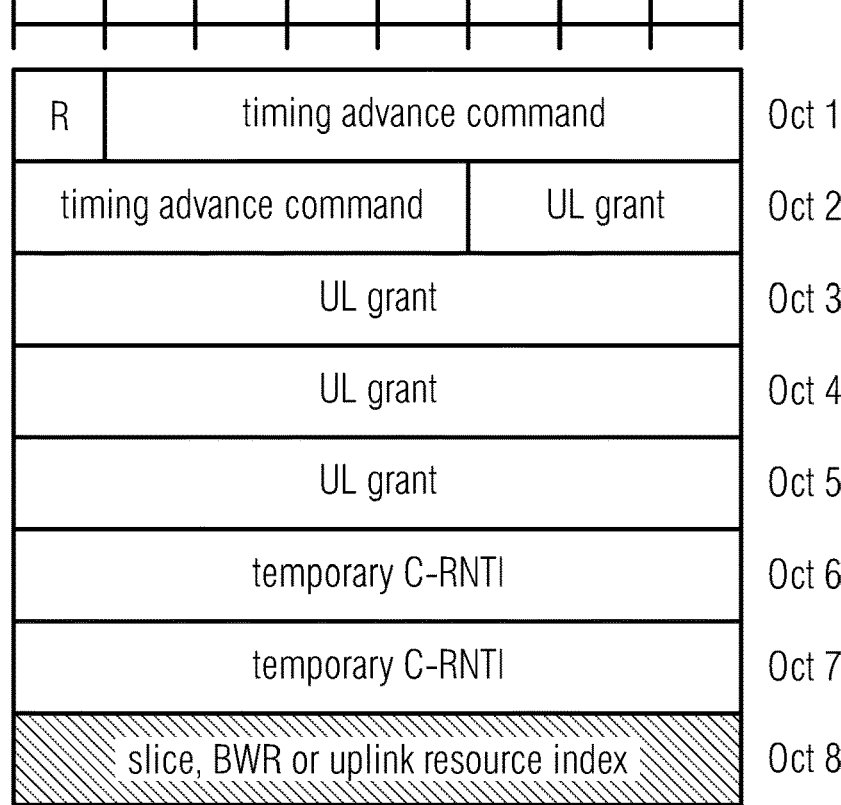
FIG. 29 illustrates a conventional MAC RAR message of FIG. 27 extended to identify the uplink slice-specific RACH resource configuration that was used by a UE.

FIG. 29 illustrates an embodiment of a modified MAC RAR message including an eighth octet for defining the slice, bandwidth part or uplink resource index. The UE may be configured such that the received uplink grant the MAC RAR points to a different uplink resource as previously configured, for example, by RRC signaling, for this slice. This may, for example, be by configuring a different carrier, different BWPs or any other uplink resource configuration. The UE previously received the slice or RACH resource configuration specific configuration by RRC system information or by dedicated RRC signaling and stores this configuration. Dependent on which slice-specific RAC resource configuration is used during the random-access, the UE knows for which carrier, bandwidth part and the like the uplink grant of the MAC RAR points to. In case a fixed mapping is not desirable, a slice, bandwidth part or any other uplink resource configuration index may be added to the MAC RAR at the expense of additional signaling overhead as indicated in FIG. 29.

In accordance with other embodiments, rather than using a common search space, separate search spaces or bandwidth parts, like slice-specific search spaces may be used. In accordance with such embodiments, a full resource isolation in the downlink may be desired so that separate physical downlink resources need to be configured to receive the different RARs corresponding to the different RACH procedures associated with different slice-specific RACH resource configurations. Slice-specific bandwidth parts and/or CORESETS and/or PDCCH search spaces are monitored by the UE to receive the downlink control information related to a specific uplink random-access associated with a certain slice. The gNB may use system information and/or dedicated RRC signaling to configure the UEs so as to make them aware of the specific downlink resources that need to be monitored dependent on the RACH resource configuration that has been used in the uplink.

In accordance with embodiments, to limit the UE complexity, parallel RACH procedures on different RACH resource configurations may be forbidden, otherwise, the UE has to monitor multiple downlink control resource configurations and different frequency bands. In other embodiments, different TDM patterns might be configured for the different slices, and the patterns may be arranged in a way that the UE only has to monitor a single downlink control resource configuration at a time.

Parameters of the Slice Specific RACH Resource Configuration

In accordance with embodiments of the all aspects of the present invention, the slice specific RACH resource configuration specifies one or more resource configurations and one or more parameters for a RACH procedure, like

- a PRACH preamble, e.g., including a preamble format, a preamble sequence, a sequence length, a subcarrier spacing used for the preamble, a cyclic prefix, a guard time length,
- a beam index,
- a trigger to switch beams,
- resources used for the PRACH, e.g., time and/or frequency and/or spatial resources, one or more parameters for determining one or more root
sequences and cyclic shifts of the root sequences in a
PRACH preamble sequence set,
an index to a logical root sequence table
a cyclic shift, $N_{CS}$,
a set type, e.g., unrestricted, restricted set A, or restricted
set B.

Cloud RAN Implementation

In the above description of the embodiments of the first,
second and third aspects of the present invention, it has been
assumed that the wireless communication network includes
a radio access network and a core network, of which the
radio access network is formed of non-distributed devices.
However, the present invention is not limited to such a RAN
implementation, and, in accordance with further embodi-
ments of the first, second and third aspects of the present
invention, the RAN may be implanted as a cloud RAN,
C-RAN.

The present invention provides a wireless communication
system, comprising one or more of the inventive user
devices, UEs, and/or one or more of the inventive base
stations, BSs.

In accordance with embodiments,
the wireless communication network provides the plural-
ity of network slices, and
a radio access network of the wireless communication
network, RAN, comprises a cloud-RAN, C-RAN, the
C-RAN comprising a plurality of slice specific distrib-
uted units, DUs, and one or more central units, CUs,
shared by some or all of the slices.

In accordance with embodiments,
one or more of the slice-specific DUs of the C-RAN
support a single slice, and/or
one or more of the slice-specific DUs of the C-RAN
support a plurality of slices.

In accordance with embodiments, the wireless communi-
cation network provides the slice-specific DUs of the
C-RAN dependent on one or more certain requirements of
the slices, e.g., dependent on one or more of
a needed level of redundancy,
the needed fronthaul interfaces, power supplies,
a reliability, e.g., the error rate, BER, PER,
a latency,
a throughput,
a service type, e.g., special services such as emergency
services,
a subscriber group, e.g., only UEs belonging to special
subscriber groups are authorized to use this service
a tenant or customer.

In accordance with embodiments, each DU has one or
more slice-specific RACH resource configurations for the
slices supported by the respective DU.

In accordance with embodiments,
a DU is configured or pre-configured with the one or more
slice-specific RACH resource configurations for the
slices supported by the DU, or
the CU is to configure a DU with the one or more
slice-specific RACH resource configurations for the
slices supported by the DU.

In accordance with embodiments, a DU is to send to the
CU or is to receive from the CU the one or more slice
specific RACH resource configurations over a certain inter-
face protocol, like the Fronthaul Interface 1, F1, protocol.

In accordance with embodiments, the DU is to send or is
to receive the one or more slice specific RACH resource
configurations during a DU setup procedure or a DU update
procedure.

In accordance with embodiments, the DU update proce-
dure comprises a DU configuration update procedure or a
CU configuration update procedure, wherein, in case of a
DU configuration update procedure, the DU is to update the
one or more slice specific RACH resource configurations for
the slices it supports, and wherein, in case of a CU configu-
ration update procedure, the CU is to update the ono or more
slice specific RACH resource configurations for the slices
supported by a DU.

In accordance with embodiments, in case of two or more
parallel ongoing RACH procedures, each RACH procedure
associated with a different slice, the DUs are to coordinate
the ongoing RACH procedures such that any parallel trans-
mission or reception during two or more parallel ongoing
RACH procedures is avoided.

In accordance with embodiments, the DUs are to coordi-
nate some or all of the RACH messages, like RACH
preamble messages 1 and the messages 2, 3 and 4 of a 4-step
RACH procedure or message A and message B of a 2-step
RACH procedure, of the ongoing RACH procedures such
that any parallel transmission or reception during two or
more parallel ongoing RACH procedures is avoided.

In accordance with embodiments, for coordinating the
ongoing RACH procedures, the DUs are to communicate
with each other only via the CU, thereby avoiding inter-DU
signaling.

In accordance with embodiments, the coordination is
done on a slice basis.

While, in the embodiments described thus far, the slice-
specific RACH resource configuration may be decided
within a base station or gNB of the RAN, in accordance with
further embodiments of all aspects of the present invention,
a coordination among different entities may be needed.
Without excluding inter-gNB signaling via the Xn/X2 inter-
faces for coordinating a slice-specific RACH resource con-
figuration, a coordination of the different slice-specific
RACH resource configurations using distributed units, DUs,
within a C-RAN may be employed. A 5G network support-
ing extensive slicing may be provided, and the network may
deploy slice-specific DUs, and a central unit, CU, in the
C-RAN may be shared by some or all slices provided by the
network.

Figure 30:
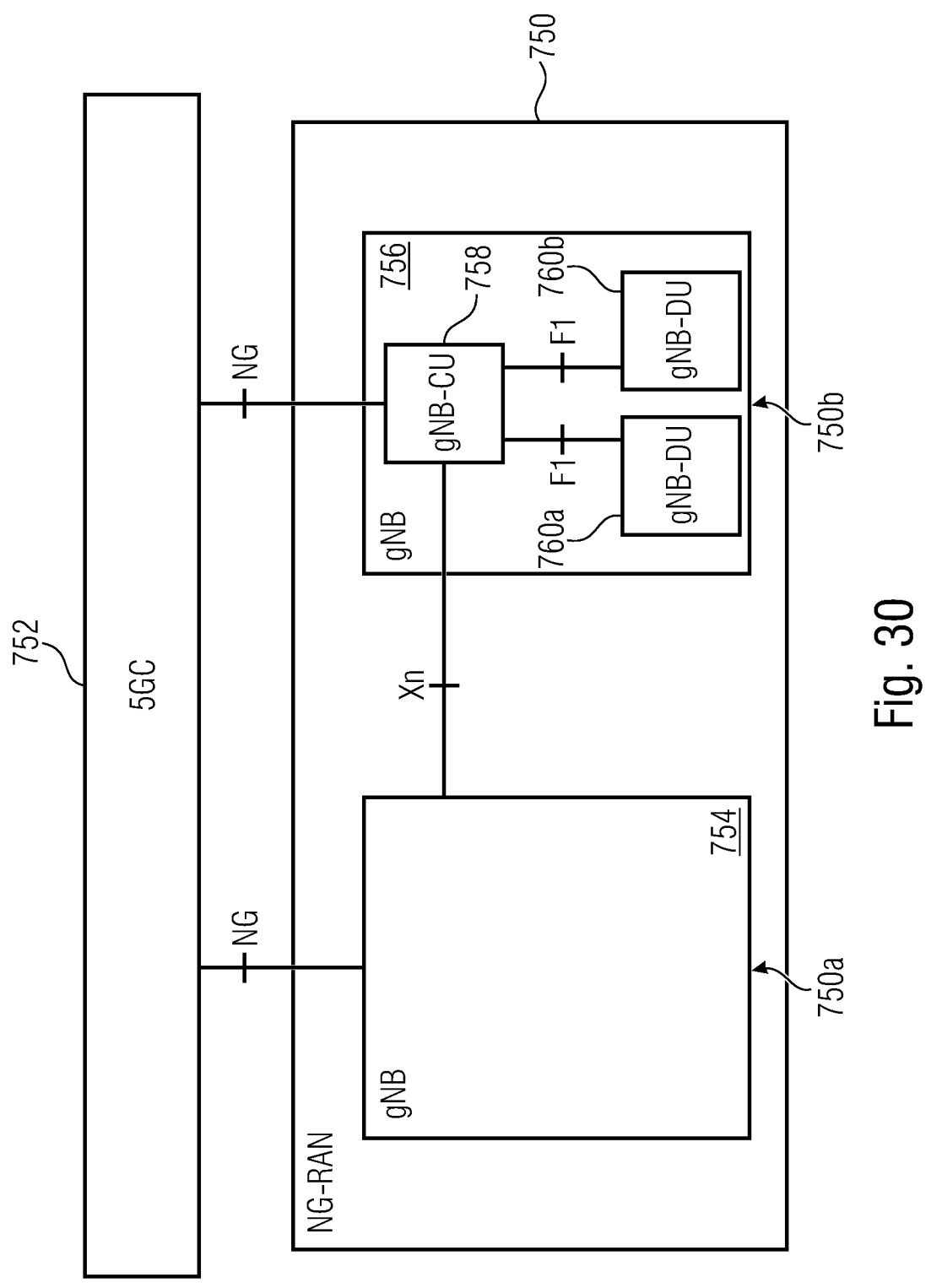
FIG. 30 illustrates an embodiment of a wireless communication network including a C-RAN implementation.

FIG. 30 illustrates an embodiment of a wireless commu-
nication network including a C-RAN implementation. More
specifically, FIG. 30 illustrates the NG-RAN architecture
according to 3GPP TS38.300. The wireless communication
network includes the radio access network 750 and the core
network 752. The radio access network 750 includes a first
non-distributed base station 754 and a distributed base
station 756. In other words, the RAN 750 includes a non-
distributed RAN 750*a* and a distributed or C-RAN 750*b*.
The C-RAN implemented base station 756 includes a central
unit, CU, 758 and, in the depicted embodiment, two distrib-
uted units DUs 760*a* and 760*b*. The respective base station
754 and 756 communicate with the core network 752 via
respective NG-interfaces and with each other via the Xn
interface. In the distributed base station 756, the distributed
unit 760*a* and 760*b* communicate with the central unit 758
via the fronthaul interface 1, F1, interface.

There may be different reasons for sharing slice-specific
DUs in a multi-slice network. For example, services asso-
ciated with the different slices may need
that the sites of the DUs are protected differently, or
different levels of redundancy, or
different fronthaul or backhaul interfaces, or
different power supplies.

For example, a mission critical network may use different DU hardware when compared to commercial DU hardware to achieve the higher requirements associated with the mission critical services provided. Since the CU is at a more central location, it may be easier to provide the needed security and redundancy level across all network slices. Thus, DUs operating mission critical services, e.g. emergency calls, may only be configured to support the particular "emergency" slice. Still the connected or associated CU to the beforementioned DUs may still support additional services, e.g. eMBB services, which operate with a different network and thus uses a different network of DUs. It is noted that the DU network may also comprise nodes configured as an integrated access and backhaul (IAB) network using a particular fronthaul and backhaul technology.

In accordance with further embodiments, the slice-specific DUs of the C-RAN may be provided dependent on one or more certain requirements of the slices, e.g., dependent on one or more of a needed level of redundancy, the needed fronthaul or backhaul interfaces, power supplies, a reliability, e.g., the error rate, BER, PER, a latency, a throughput, a service type, e.g., special services such as emergency services, a subscriber group, e.g., only UEs belonging to special subscriber groups are authorized to use this service a tenant or customer.

When implementing the RAN as a C-RAN, the UE is not aware that connecting to two or more network slices may be via different DUs. However, when implementing slice-specific DUs in a C-RAN network, a corresponding number of RACH procedures is needed for the different DUs, because they may be located at different physical locations, so that different independent timing advances may apply per DU which are needed to keep up synchronization to each site. When DUs are at different physical locations, each DU may have its slice-specific RACH resource configuration. The slice-specific RACH resource configurations may be decided by the CU or by the DU. In accordance with embodiments, when a DU is being set up is it is either pre-configured before installation, e.g., as part of the radio and network planning, or it will, based on an internal configuration, set up a secure connection with a management network and will download configuration parameters from an operation and maintenance server. This operation may be proprietary. Configuration parameters contain, among others, the slices the DU will support, the CU the DU will connect to etc. This pre-configuration of the DUs may also contain the slice specific RACH resource configuration. Part of those parameters may be communicated from the DU to the CU in the F1 Setup Request message. Although it may be desired that each DU decides about its own radio resource configuration to optimize resources within a cell, in accordance with further embodiments, the CU may decide about the configurations as it has better knowledge for coordinating the resources efficiently across multiple cells and/or multiple DUs. The respective entities need to communicate with each other and share the configuration data. Embodiments for sharing the configuration data, namely the respective slice-specific RACH resource configurations are now described.

Figure 31:
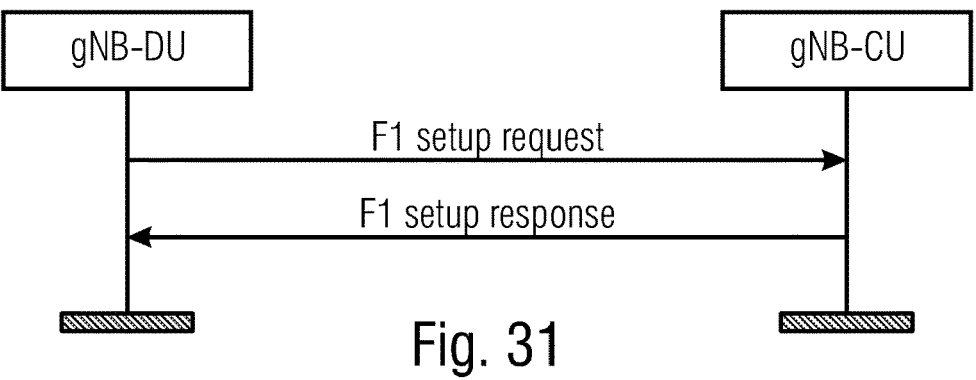
FIG. 31 illustrates an embodiment for providing slice-specific RACH resource configurations via a CU to one or more DUs.

FIG. 31 illustrates an embodiment for providing the slice-specific RACH resource configurations via the CU to the DUs. The configuration details of the slice-specific RACH resource configurations may be exchanged over the fronthaul interface 1, F1, protocol, as defined in 3GPP TS38.473. As is indicated in FIG. 31, the initial configuration may be exchanged as part of a setup procedure including an F1 setup request transmitted from the DU to the CU which answers with the setup response including the slice-specific RACH resource configurations for the respective DU.

Figure 32A:
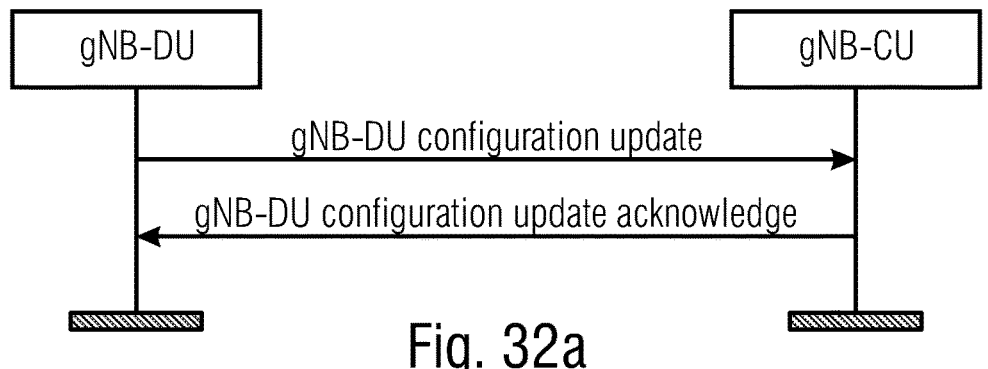
FIG. 32 illustrates an embodiment for a slice-specific RACH resource configuration update procedure, wherein FIG. 32(*a*) illustrates a successful gNB-DU update procedure and FIG. 32(*b*) illustrates a gNB-DU update failure.
Figure 32B:
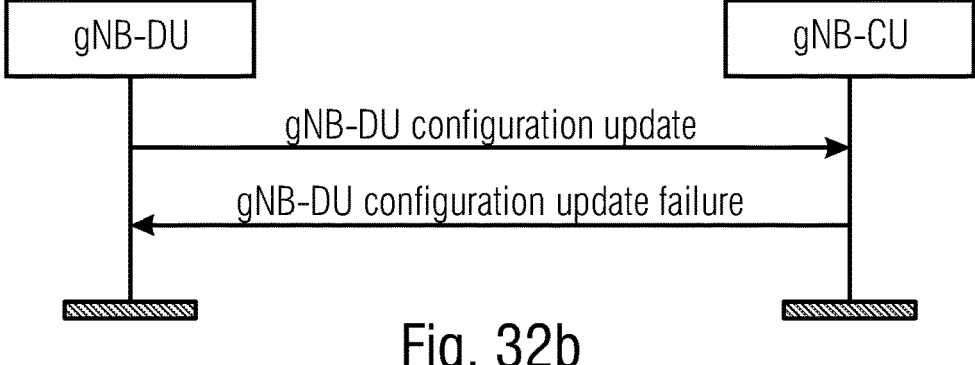

In accordance with further embodiments, changes in the configuration may be communicated, for example, using the gNB-DU or configuration update procedure. FIG. 32 illustrates an embodiment for a slice-specific RACH resource configuration update procedure, wherein FIG. 32(*a*) illustrates a successful gNB-DU update procedure and FIG. 32(*b*) illustrates a gNB-DU update failure. In FIG. 32(*a*), the gNB-DU performs cell level measurements, e.g., of the RACH load, the RACH failure rates and the like. The gNB-DU, e.g., dependent on the RACH load, may increase or decrease the slice-specific RACH resources for the respective slice-specific RACH resource configurations with which the gNB-DU is configured or preconfigured. Depending on the RACH failure rate, the gNB-DU may configure in the slice-specific RACH resource configurations different preamble formats. These updates or changes are performed at the DU and signaled update using the gNB-DU configuration update message to the gNB-CU which, in turn, acknowledges the update with the gNB-DU configuration update acknowledge message as illustrated in FIG. 32(*a*). Responsive to the acknowledgement, the gNB-DU starts using the updated configuration for further RACH procedures. In case the update, that has been send to the gNB-CU is not accepted or possible, gNB-CU responds with a gNB-DU configuration update failure, as indicated in FIG. 32(*b*), so that the UE, responsive to the failure message, does not use the updated parameters but maintains the current or original parameters.

Figure 33:
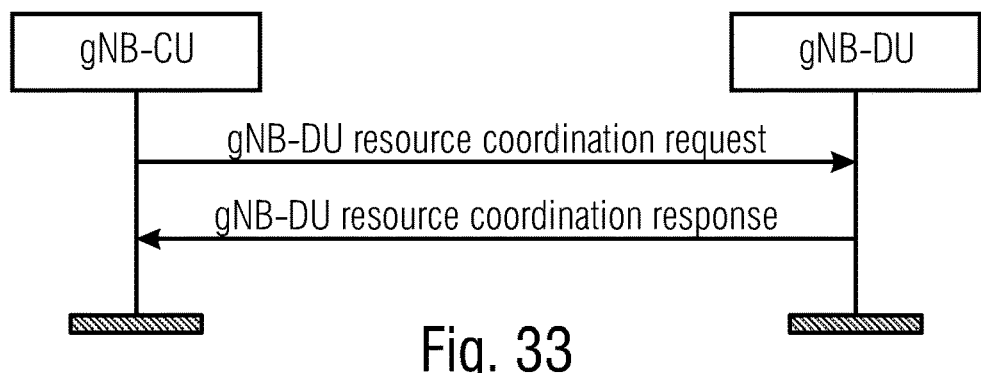
FIG. 33 illustrates an embodiment of a gNB-CU configuration update procedure.

In accordance with other embodiments, as mentioned above, also the gNB-CU may make the decision about modifications in the slice-specific RACH resource configurations. Making such decisions at the gNB-CU may be advantageous as the CU may also consider the slice-specific RACH resource configurations of neighboring cells, like neighboring DUs, so that, for example, collisions of resources may be avoided. FIG. 33 illustrates an embodiment of a gNB-CU configuration update procedure in which a CU, after deciding about the configuration update, sends a gNB-DU resource coordination request to the DU which responds with the gNB-DU response coordination response indicating that the update is received and is used at the DU.

In accordance with embodiments, when the CU makes the decision about updates in the slice-specific RACH resource configurations of the DUs, the DUs may support the CU, for example by providing cell level measurements, such as a RACH utilization or load factor or a RACH failure/success rate to the CU. On the other hand, in case the DU makes the decision, the CU may provide information about the RACH's resources that are used or that are not used in the neighboring cells or information about certain resources that are expected to experience low interference and, therefore, may be used as other resources for the RACH procedures. This additional information may be exchanged within respective signaling messages between the CU and the DUs.

RACH Procedure Coordination Across gNB-DUs

Parallel ongoing RACH procedures, as described above with reference to the second aspect of the present invention, may be allowed because such parallel RACH procedures may be beneficial for a latency reduction in 5G networks extensively using slicing. Still, dependent on the UE capabilities and transmit/receive requirements, it may be desired to avoid a parallel transmission and reception of RACH messages. As part of a gNB implementation, the base station may internally coordinate any additional RACH procedures with an already ongoing RACH procedure. Within a certain window, for example, the RACH receive window for message 2 during which the UE which has sent the RACH preamble waits for the downlink RAR message 2, the gNB may schedule its downlink messages 2 and 4 as well as an allocation for the transmission of the uplink message 3 by the UE.

Therefore, in accordance with embodiments, the gNB may shift respective messages to avoid parallel transmissions or receptions during two or more parallel ongoing RACH procedures from different slices. In accordance with yet further embodiments, in a C-RAN, as described above with reference to FIG. 30, where scheduling decisions are done by the DUs, the DUs associated with different network slices are to communicate such scheduling decisions. In accordance with embodiments, the communication among the DUs is via the CU, thereby avoiding inter-DU signaling. In accordance with embodiments, excessive signaling may be avoided by performing the coordination of resources for the slice-specific RACH procedures not on a UE basis, but on a slice basis. Thus, in addition to the slice-specific RACH preambles being coordinated, in accordance with embodiments, also the resources for the RACH messages 2, 3 and 4 may be coordinated to avoid colliding transmissions or receptions. This leads to some scheduling restrictions for the respective messages on the uplink and downlink shared channels, PUSCH/PDSCH, causing some delay. This delay may be acceptable as collisions of messages of the RACH procedures of different slices are avoided. In accordance with embodiments, the scheme needs to be applied only in case the network supports UEs that may simultaneously connect to multiple slices. Instead of the above-mentioned messages for the four-step or 4-way CBRA procedure, also the messages for a two-step or 2-way CBRA procedure may be coordinated in the above described way.

General

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a base station comprises one or more of the following: a macro cell base station, or a small cell base station, or a central unit of a base station, or a distributed unit of a base station, or a road side unit (RSU), or a UE, or a group leader (GL), e.g. a GL-UE, or a relay or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 34:
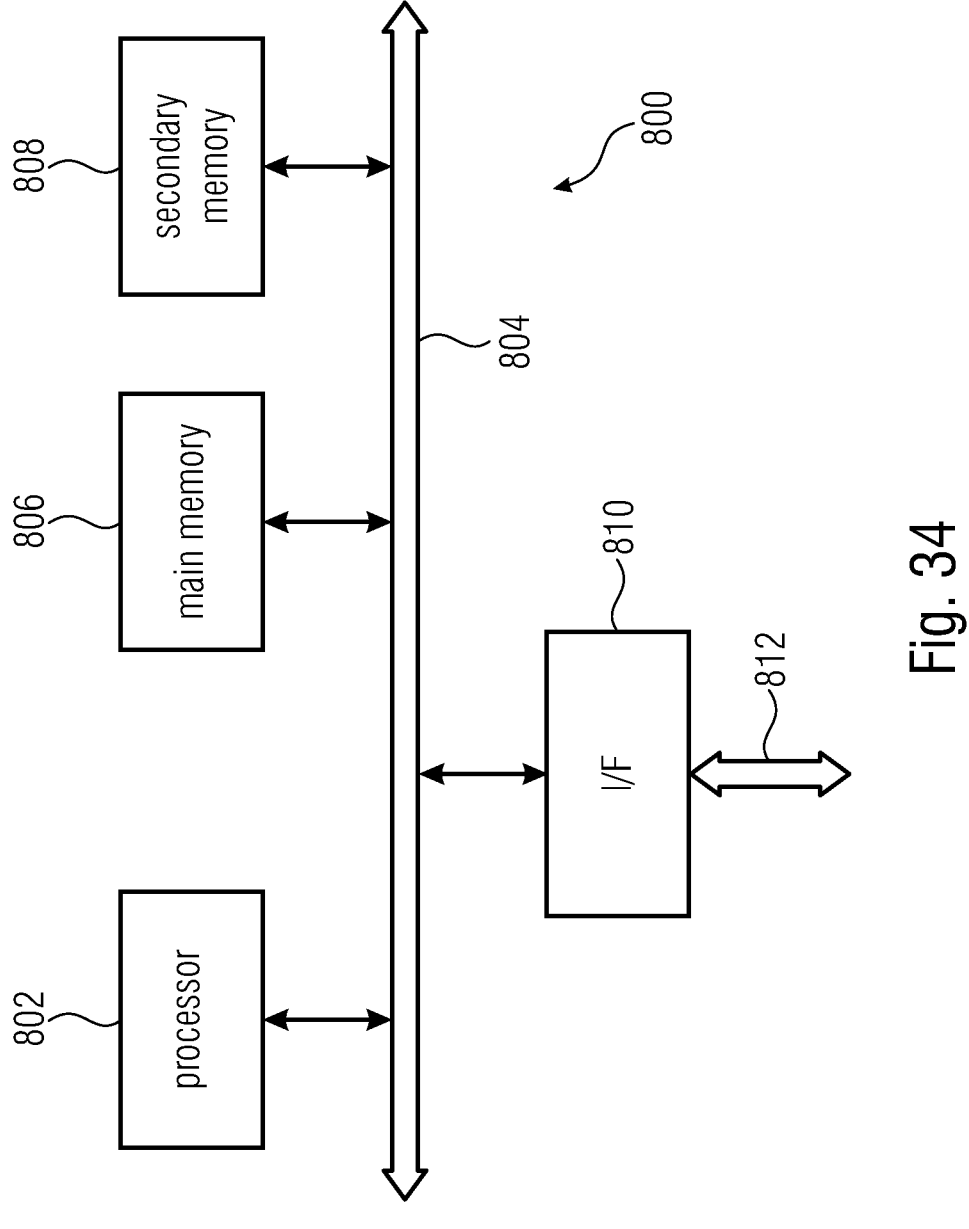
FIG. 34 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 34 illustrates an example of a computer system 800. The units or modules as well as the steps of the methods performed by these units may execute on one or more computer systems 800.

The computer system 800 includes one or more processors 802, like a special purpose or a general-purpose digital signal processor. The processor 802 is connected to a communication infrastructure 804, like a bus or a network. The computer system 800 includes a main memory 806, e.g., a random-access memory, RAM, and a secondary memory 808, e.g., a hard disk drive and/or a removable storage drive. The secondary memory 808 may allow computer programs or other instructions to be loaded into the computer system 800. The computer system 800 may further include a communications interface 810 to allow software and data to be transferred between computer system 800 and external devices. The communication may be in the from electronic, electromagnetic, optical, or other signals capable of being handled by a communications interface. The communication may use a wire or a cable, fiber optics, a phone line, a cellular phone link, an RF link and other communications channels 812.

The terms "computer program medium" and "computer readable medium" are used to generally refer to tangible storage media such as removable storage units or a hard disk installed in a hard disk drive. These computer program products are means for providing software to the computer system 800. The computer programs, also referred to as computer control logic, are stored in main memory 806 and/or secondary memory 808. Computer programs may also be received via the communications interface 810. The computer program, when executed, enables the computer system 800 to implement the present invention. In particular, the computer program, when executed, enables processor 802 to implement the processes of the present invention, such as any of the methods described herein. Accordingly, such a computer program may represent a controller of the computer system 800. Where the disclosure is implemented using software, the software may be stored in a computer program product and loaded into computer system 800 using a removable storage drive, an interface, like communications interface 810.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] 3GPP TS38.300 NR and NG-RAN Overall Description; Stage 2 (Release 16)
[2] 3GPP TS 24.501 Non-Access-Stratum (NAS) protocol for 5G System (5GS); Stage 3
[3] WO2018127505A1, "Access control for network slices of a wireless communication system"
[4] 3GPP TS23.003, "Numbering, addressing and identification"
[5] US20180368179A1—Differentiated random-access in new radio"
[6] 3GPP TS38.321 NR Medium Access Control (MAC) protocol specification

The invention claimed is:

1. A user device, UE, for a wireless communication network, the UE comprising:

one or more antennas or an antenna array having a plurality of antennas, a signal processor, and a transceiver, wherein the transceiver is connectable to two or more of a plurality of network slices of the wireless communication network, wherein a slice specific random access channel, RACH, resource configuration is associated with one or more of the plurality of slices, wherein, responsive to a first RACH event associated with a first slice, the signal processor is configured to determine whether there is an ongoing RACH procedure triggered by a second RACH event associated with a second slice, and wherein, in case of the ongoing RACH procedure, the signal processor is configured to perform at least one of the following:

prohibiting an additional RACH procedure triggered by the first RACH event associated with the first slice, suspending the additional RACH procedure for a certain time, stopping the ongoing RACH procedure and start the additional RACH procedure, modifying the ongoing RACH procedure, and modifying the ongoing RACH procedure to start the additional RACH procedure.

2. The user device, UE, of claim 1, wherein the slice specific RACH resource configuration specifies one or more resource configurations and one or more parameters for a RACH procedure, including at least one of the following:

a physical random-access channel, PRACH, preamble, e.g., comprising a preamble format, a preamble sequence, a sequence length, a subcarrier spacing used for the preamble, a cyclic prefix, a guard time length, a beam index, a trigger to switch beams, resources used for the PRACH, e.g., time and/or frequency and/or spatial resources, one or more parameters for determining one or more root sequences and cyclic shifts of the root sequences in the PRACH preamble sequence, an index to a logical root sequence table a cyclic shift, $N_{CS}$, and a set type, e.g., unrestricted, restricted set A, or restricted set B.

3. The user device, UE, of claim 1, wherein the signal processor is configured to abort any additional RACH procedure in case there is an ongoing RACH procedure so that, at any point in time, there is only a single ongoing RACH procedure.

4. The user device, UE, of claim 1, wherein the signal processor is configured to suspend the additional RACH procedure until the ongoing RACH procedure is completed.

5. The user device, UE, of claim 4, wherein the signal processor is configured to store information related to the additional RACH procedure to be used when starting the additional RACH procedure on the second slice, once the ongoing RACH procedure on the first slice is completed.

6. The user device, UE, of claim 5, wherein, responsive to the ongoing RACH procedure having failed for a predefined number of times, the signal processor is configured to stop or defer the ongoing RACH procedure, and to start the additional RACH procedure.

7. The user device, UE, of claim 1, wherein the signal processor is configured to prohibit or suspend the additional RACH procedure in case at least any one of:

parallel RACH procedures using different slice specific RACH resource configurations are not allowed, e.g., by a certain standard specification, by the defined UE capabilities parallel RACH procedures using different slice specific RACH resource configurations are disabled, e.g., for a certain cell, a certain UE, a certain service type, a certain priority level, a certain slice, or a certain RACH trigger, the ongoing RACH procedure has a higher priority than the additional RACH procedure, the additional RACH procedure uses a different configuration when compared to the ongoing RACH procedure, e.g., a different numerology, a different subcarrier spacing, a different frequency band or a bandwidth part, and the additional RACH procedure is sent to a different Base Station, BS, or Distributed Unit, DU, than the ongoing RACH procedure.

8. The user device, UE, of claim 1, wherein the signal processor is configured to suspend the additional RACH procedure once the ongoing RACH procedure is partly completed.

9. The user device, UE, of claim 8, wherein the signal processor is configured to start the additional RACH procedure such that there are no parallel uplink transmissions associated with the ongoing RACH procedure and the additional RACH procedure.

10. The user device, UE, of claim 8, wherein the signal processor is configured to start the additional RACH procedure responsive to a certain event associated with the ongoing RACH procedure, the certain event comprising one or more of:

the UE sending a RRC Connection Request Message 3 for the ongoing RACH procedure in an uplink, the UE receiving a RACH Response, RAR, Message 2 for the ongoing RACH procedure in a downlink, the UE sending a RACH Preamble Message 1 for the ongoing RACH procedure in the uplink, and the UE receiving an RRC connection reconfiguration message in the downlink.

11. The user device, UE, of claim 1, wherein the signal processor is configured to stop the ongoing RACH procedure and start the additional RACH procedure during the whole ongoing RACH procedure or until a certain stage of the ongoing RACH procedure, and/or responsive to one or more pre-emption criteria being fulfilled.

12. The user device, UE, of claim 11, wherein the one or more pre-emption criteria comprise one or more of the following:

certain parameters in the RRC RACH resource configuration, like a relative slice priority, or a QoS flow or a logical channel priority, an event that triggered the RACH procedure, like a PDCCH order, or a handover, or a CHO, or an RRC re-establishment, a type of user plane message pending for transmission, e.g., to which logical channel, or QoS flow, or PDN session, or slice identity the message belongs to, a QoS attribute of a user plane message pending for transmission, like priority, or latency or reliability of the logical channel or data flow the message belongs to, a type of message pending for transmission, e.g., prioritization of an RRC control plane message transmitted over a Signaling Radio Bearer over a user plane message transmitted over a of Data Radio Bearer, and an entity that triggered the RACH procedure, e.g., prioritization of a UE triggered RACH procedure over a base station triggered RACH procedure or SL-UE triggered RACH procedure, like a group lead UE, or an RSU.

13. The user device of claim 1, wherein, to modify the ongoing RACH procedure, the signal processor is configured to modify a certain message, e.g. Msg3, transmitted by the transceiver during the ongoing RACH procedure by incorporating into the certain message, in addition to an indication of the first slice, an indication of the second slice so as to allow a base station to provide in response to the certain message parameters for a configuration of the first and second slices.

14. The user device of claim 1, wherein, to modify the ongoing RACH procedure to start the additional RACH procedure, the signal processor is configured to modify a certain message, e.g. Msg3, transmitted by the transceiver during the ongoing RACH procedure by replacing an indication of the first slice with an indication of the second slice so as to allow a base station to provide in response to the certain message parameters for a configuration of the second slice.

15. The user device, UE, of claim 1, wherein the additional RACH procedure and the ongoing RACH procedure are triggered at the same time or are triggered within a certain time window.

16. The user device, UE, of claim 1, wherein the signal processor is configured or pre-configured to support two or more parallel ongoing RACH procedures, the ongoing RACH procedures being associated with different slices.

17. The user device, UE, of claim 16, wherein the signal processor is only permitted to perform two or more PRACH procedures for different slices, if the slice is configured to one or more of use of a different BWP, and operate on a different carrier frequency with a frequency gap of delta x between a first radio frequency, e.g. operating on FR1, and a second radio frequency, e.g. operating on FR2.

18. A wireless communication system, comprising one or more user devices, UEs, for a wireless communication network, wherein the UE is connectable to two or more of a plurality of network slices of the wireless communication network, wherein a slice specific random access channel, RACH, resource configuration is associated with one or more of the plurality of slices, wherein, responsive to a first RACH event associated with a first slice, the UE is to determine whether there is an ongoing RACH procedure triggered by a second RACH event associated with a second slice, and

73 wherein, in case of an ongoing RACH procedure, the UE is to prohibit an additional RACH procedure triggered by the first RACH event associated with the first slice, and/or suspend the additional RACH procedure for a certain time, and/or stop the ongoing RACH procedure and start the additional RACH procedure, and/or modify the ongoing RACH procedure, and/or modify the ongoing RACH procedure to start the additional RACH procedure, and/or one or more base stations, BSs, for a wireless communication network, wherein the BS is to support one or more of a plurality of slices of the wireless communication network, wherein a slice specific random access channel, RACH, configuration is associated with one or more of the plurality of slices, wherein the BS is to configure one or more user devices, UEs, to enable or to disable parallel ongoing RACH procedures.

19. The wireless communication network of claim 18, wherein, the wireless communication network provides the plurality of network slices, and a radio access network of the wireless communication network, RAN, comprises a cloud-RAN, C-RAN, the C-RAN comprising a plurality of slice specific distributed units, DUs, and one or more central units, CUs, shared by some or all of the slices.

20. A method for operating a user device, UE, for a wireless communication network, wherein the UE is connectable to two or more of a plurality of network slices of the wireless communication network, wherein a slice specific random access channel, RACH, resource configuration is associated with one or more of the plurality of slices, the method comprising:

responsive to a first RACH event associated with a first slice, determining whether there is an ongoing RACH procedure triggered by a second RACH event associated with a second slice, and in case of an ongoing RACH procedure, prohibiting an additional RACH procedure triggered by the first RACH event associated with the first slice, and/or suspending the additional RACH procedure for a certain time, and/or stopping the ongoing RACH procedure and start the additional RACH procedure, and/or modifying the ongoing RACH procedure, and/or modifying the ongoing RACH procedure to start the additional RACH procedure.

* * * * *